(12) United States Patent
Yamamoto et al.

(10) Patent No.: US 8,359,322 B2
(45) Date of Patent: Jan. 22, 2013

(54) INFORMATION-PROCESSING APPARATUS, METHOD, SYSTEM, AND COMPUTER READABLE MEDIUM AND METHOD FOR AUTOMATICALLY RECORDING OR RECOMMENDING CONTENT

(75) Inventors: Noriyuki Yamamoto, Kanagawa (JP); Mitsuhiro Miyazaki, Kanagawa (JP); Mari Saito, Kanagawa (JP); Hiroyuki Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 1303 days.

(21) Appl. No.: 10/538,944

(22) PCT Filed: Dec. 12, 2003

(86) PCT No.: PCT/JP03/15925
§ 371 (c)(1),
(2), (4) Date: Apr. 14, 2006

(87) PCT Pub. No.: WO2004/054245
PCT Pub. Date: Jun. 24, 2004

(65) Prior Publication Data
US 2006/0248091 A1    Nov. 2, 2006

(30) Foreign Application Priority Data

Dec. 12, 2002  (JP) ................... 2002-361275
Dec. 12, 2002  (JP) ................... 2002-361276

(51) Int. Cl.
*G06F 7/00*     (2006.01)
*G06F 17/30*    (2006.01)

(52) U.S. Cl. .................................. 707/758; 725/39

(58) Field of Classification Search ............ 725/39; 707/758
See application file for complete search history.

(56) References Cited

U.S. PATENT DOCUMENTS
6,457,010 B1 * 9/2002 Eldering et al. .................. 1/1
(Continued)

FOREIGN PATENT DOCUMENTS
EP     1107595     * 6/2001
(Continued)

OTHER PUBLICATIONS

Supplementary European Search Report issued Sep. 22, 2010 in European Application No. 03778858.5-1241 / 1571835 PCT/JP0315925.

*Primary Examiner* — Robert Beausoliel, Jr.
*Assistant Examiner* — Michael Pham
(74) *Attorney, Agent, or Firm* — Oblon, Spivak, McClelland, Maier & Neustadt, L.L.P.

(57) ABSTRACT

The present invention allows a program vector representing attributes of a program to be generated as follows. At a step S11, EPG data is received. At a step S12, meta data necessary for generation of a program vector PP is extracted from the EPG data. At a step S13, a morphological analysis is carried out on contents and title included in the meta data to disassemble the contents and the title into words. At a step S14, items included in the meta data are subjected to a vector creation process to generate the program vector PP. At a step S15, an effect vector is extracted on the basis of a genre of a program associated with the meta data. At a step S16, the extracted effect vector is associated with the generated program vector PP and the processing is ended. The present invention can be applied to a distribution server for distributing contents.

19 Claims, 40 Drawing Sheets

U.S. PATENT DOCUMENTS

| | | | |
|---|---|---|---|
| 7,213,256 B1* | 5/2007 | Kikinis | 725/53 |
| 7,308,464 B2* | 12/2007 | Nowitz et al. | 1/1 |
| 7,444,660 B2* | 10/2008 | Dudkiewicz | 725/45 |
| 2001/0039656 A1* | 11/2001 | Nakamura et al. | 725/9 |
| 2001/0042250 A1 | 11/2001 | Ishii | |
| 2001/0049822 A1* | 12/2001 | Yoshida et al. | 725/34 |
| 2002/0083451 A1* | 6/2002 | Gill et al. | 725/46 |
| 2002/0085024 A1* | 7/2002 | White et al. | 345/738 |
| 2002/0152224 A1* | 10/2002 | Roth et al. | 707/104.1 |
| 2003/0066068 A1* | 4/2003 | Gutta et al. | 725/9 |
| 2003/0115589 A1* | 6/2003 | D'Souza et al. | 725/10 |
| 2004/0019907 A1* | 1/2004 | Li et al. | 725/46 |
| 2004/0083490 A1* | 4/2004 | Hane | 725/46 |

FOREIGN PATENT DOCUMENTS

| | | |
|---|---|---|
| GB | 2 340 638 A | 2/2000 |
| JP | 9-191454 | 7/1997 |
| JP | 9-288683 | 11/1997 |
| JP | 10-162025 | 6/1998 |
| JP | 2001-128102 | 5/2001 |
| JP | 2001-160955 | 6/2001 |
| JP | 2002-142160 | 5/2002 |
| WO | 01/69921 | 9/2001 |
| WO | WO0169921 * | 9/2001 |

* cited by examiner

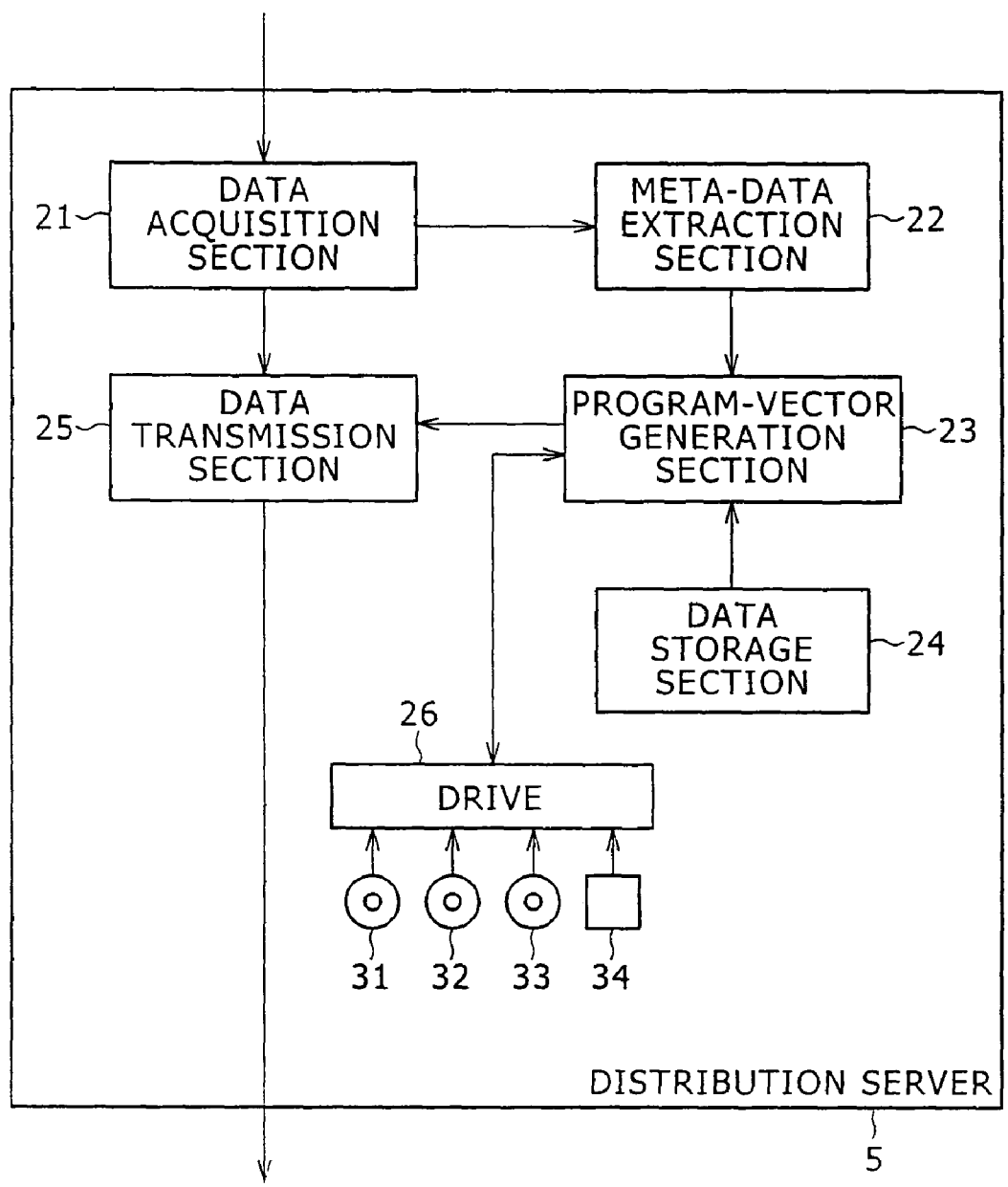

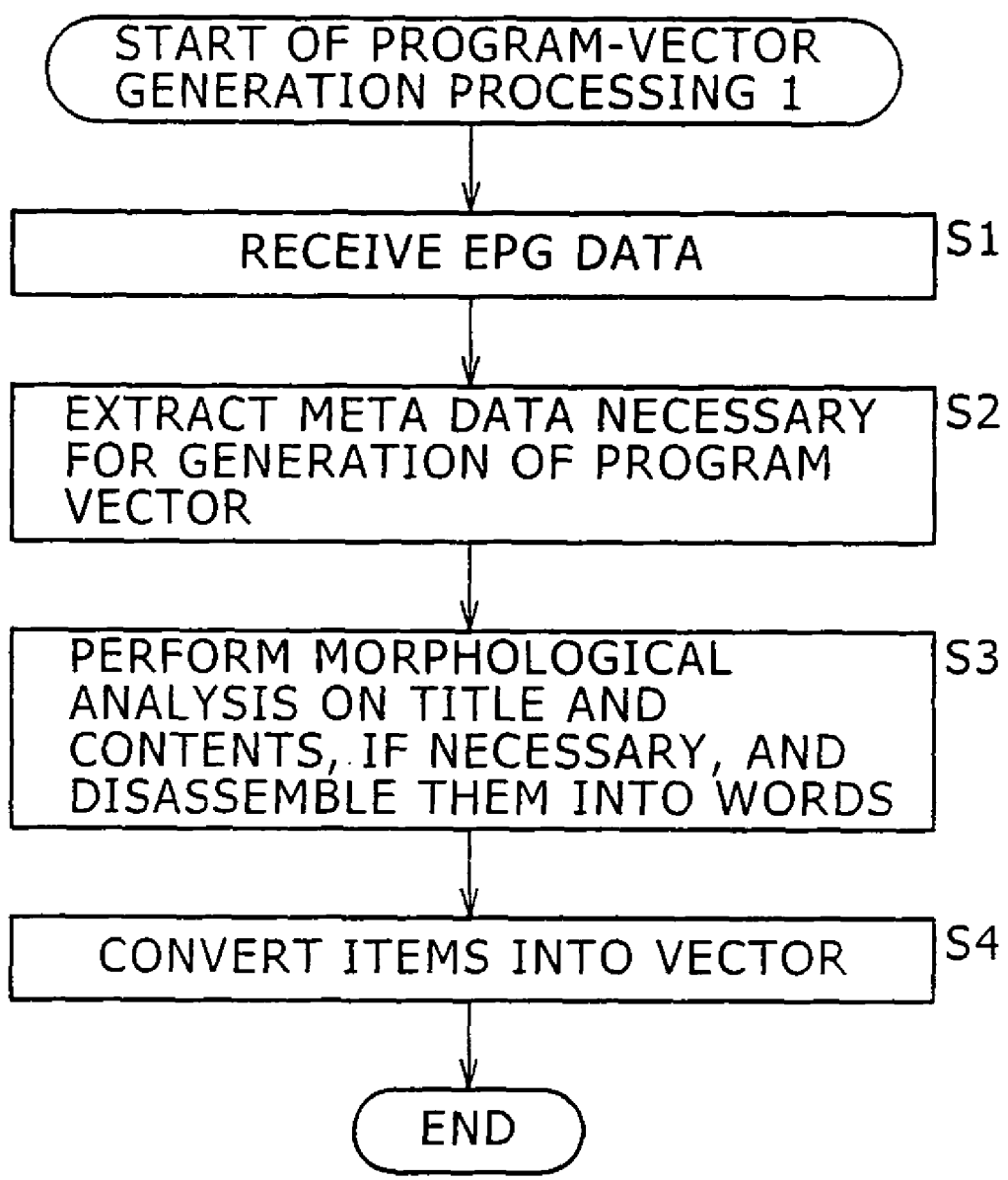

FIG. 4

MOVIE: JAPANESE FILM 'TOUKAIDOU MITSUYA GHOST STORY'
WED/AUG/14 AT 22:43 AND WED/AUG/15 AT 00:00, WOWO
THE YEAR OF 1959 (SEIHOU) AND THE ORIGINAL HAS LENGTH OF 74 MINUTES
DIRECTOR: NOBUO NAKAGAWA
SCRIPTWRITER: SHOICHI OHNUKI AND YOSHIHIRO ISHIDA
CAMERAMAN: SHOJI NISHIMOTO
MUSIC: CHUTA WATANABE
STARRING: KATSUMI WAKASUGI, SHIGERU AMAMI, TOSHIHIKO EMI,
    RYUUJIROU NAKAMURA AND NORIKO NISHIZAWA
COMMENTS: '59 PRODUCTION OF SEIHOU
    MASTERPIECE OF HORROR SHOW OF JAPANESE FILM, DEPICTING
    THE WORLD OF THE FAMOUS MITSUYA GHOST-STORY TO FULLNESS
    OF FORMAL BEAUTY

FIG. 5

| PROGRAM VECTOR | PP = (Tm, Gm, Hm, Sm, Pm, Am, Km) |
|---|---|

T: TITLE  Tm = {title 1, title 2, title 3,...}
G: GENRE  Gm = {DRAMA, VARIETY, SPORT, MOVIE, MUSIC, CHILD PROGRAM/EDUCATION, GENERAL CULTURE/DOCUMENTARY,NEWS/REPORT, OTHERS}
H: TIME BAND(HOUR)  Hm = {MORNING, DAYTIME, EVENING, PRIME-TIME, LATE AT NIGHT}
S: BROADCASTING STATION  Sm = {NNK GENERAL, NNK EDUCATIONAL, ASIAN TELEVISION, TTS,BUJI, TELENICHI, (TV STATION)  TOUTO, FIRST NNK SATELLITE, SECOND NNK SATELLITE, WOWO}
P: PERFORMER (PERSON)  Pm = {person A, person B, ...,}
A: SCRIPTWRITER/  Am = {person a, person b, ...,}
   AUTHOR/PRODUCER
   (AUTHOR)
K: CONTENTS (KEYWORD)  Km = {kw1, kw2, ...,}

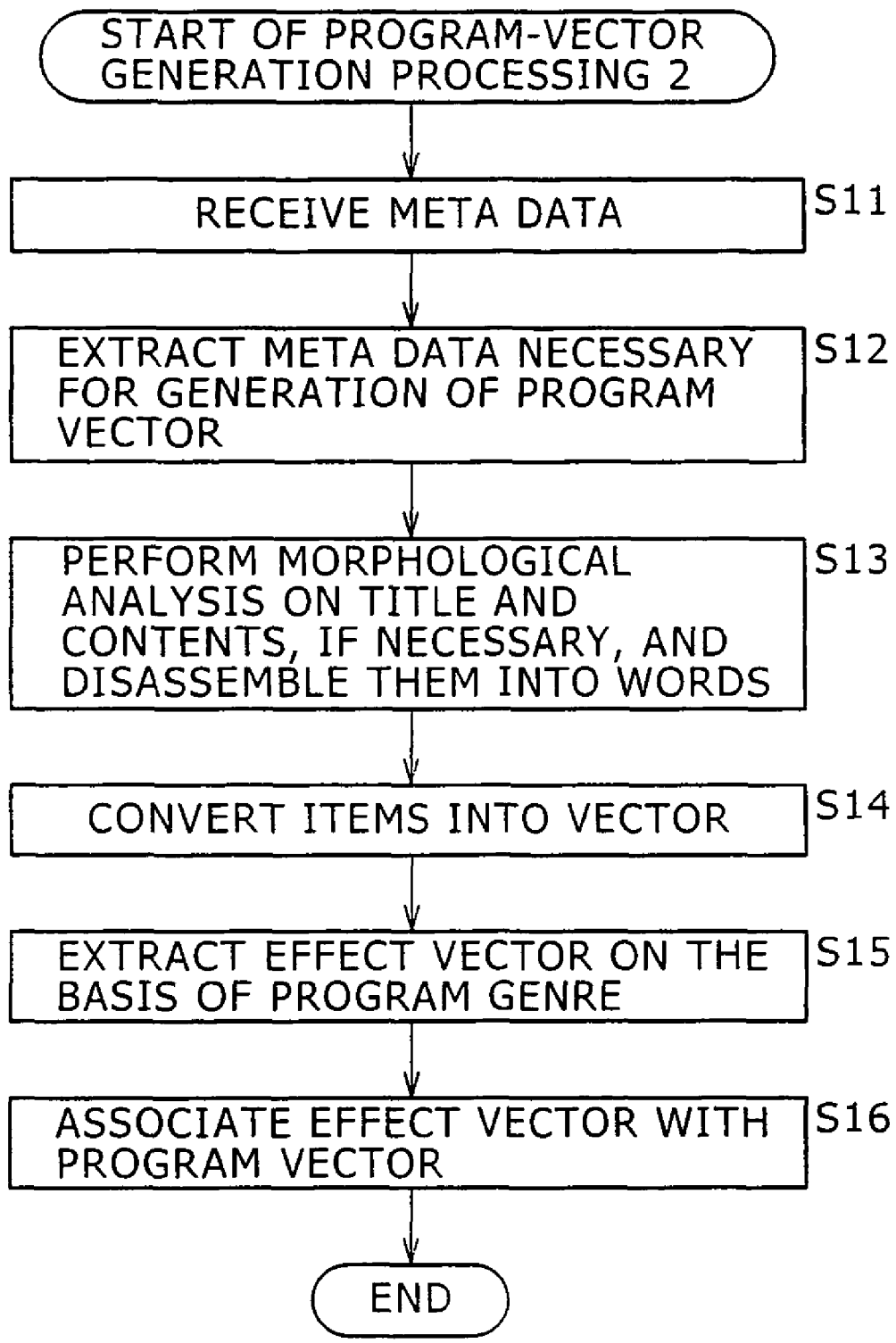

FIG. 15

| POSITIVE-HISTORY VECTOR | UP= (Tup, Gup, Pup, Aup, Kup) |
|---|---|

TITLE:  Tup= {(title1-12), (title2-3),..,}
GENRE:  Gup= {(DRAMA-25), (VARIETY-34), (SPORT-42), (MOVIE-37), (MUSIC-73),
              (CHILD PROGRAM/EDUCATION-120),
              (GENERAL CULTURE/DOCUMENTARY-3),
              (NEWS/REPORT-5), (OTHERS-23)}

PERFORMER:  Pup= {(person A-10), (person B-43), ···,}
SCRIPTWRITER/
AUTHOR/PRODUCER:  Aup= {person a-8, person b-2, ···,}
CONTENTS (KEYWORD):  Kup= {(kw1-32), (kw2-73), ···,}

INFORMATION-PROCESSING APPARATUS, METHOD, SYSTEM, AND COMPUTER READABLE MEDIUM AND METHOD FOR AUTOMATICALLY RECORDING OR RECOMMENDING CONTENT

TECHNICAL FIELD

The present invention relates to an information-processing apparatus, information-processing method, information-processing system, recording medium and computer-program. More particularly, the present invention relates to an information-processing apparatus provided for users viewing typically programs and streaming data of television broadcasts and radio broadcasts as apparatus each proper for applications such as automatic recording and recommendation of programs and also relates to an information-processing method adopted by the apparatus, an information-processing system employing the apparatus, a computer-program implementing the method as well as a recording medium used for recording the computer-program.

BACKGROUND ART

Conventionally, in order to recommend a program in the television and radio broadcasting to the user, for example, a program matching information preferred by the user is selected by using program information (or program meta data) such as an EPG (Electronic Program Guide). A method to recommend a program to the user varies in dependence on a method to acquire data preferred by the user. An example of the method to recommend a program to the user is an initial-interest catalog method whereby, first of all, information on interests of the user is initially cataloged in advance and then used as a basis for recommending a program to the user. Another example of the method to recommend a program to the user is a viewing-history utilization method to recommend a program to the user by using a history of programs viewed by the user in the past. A further example of the method to recommend a program to the user is a collaborative filtering method to recommend a program to the user by using viewing histories of other users.

In the initial-interest catalog method, first of all, the user is requested to catalog information such as a category of favorite programs, a preferred genre and the names of favorite talents in advance. Examples of the favorite-programs category are a drama and a variety program. Examples of the preferred genre are a mystery and a comedy. Then, the cataloged information is used as a keyword for recognizing program meta data matching the interest of the user. Finally, the name of a program to be recommended to the user is acquired.

In the viewing-history utilization method, every time the user views a program, the meta data of the viewed program is stored and, as past meta data has been stored to a certain degree, the stored meta data is analyzed to obtain information such as a category of favorite programs, a preferred genre and the names of favorite talents. Then, the obtained information is used as a keyword for recognizing program meta data matching the favorite of the user. Finally, the name of a program to be recommended to the user is acquired.

In an apparatus such as a recording apparatus employing an HDD (Hard Disk Drive), for example, information on favorites is acquired not only on the basis of a viewing history, but also in some cases on the basis of information on a history of recording reservations or a history of user operations such as recording operations. In such cases, it is possible to distinguish a program accidentally viewed by the user from a program intentionally viewed by the user as a program of interest to the user so that information reflecting better favorites of the user can be acquired. A program accidentally viewed by the user is a program viewed by the user as a program presented by a television receiver (or a radio) in a turned-on state not set by the user because the user has a particular interest in the program and views the program.

In the collaborative filtering method, given a first user, first of all, an operation is carried out to search for a second user with a viewing/operation history matching the viewing/operation history of the first user and the viewing/operation history of the second user is acquired. Then, a program is selected among programs viewed by the second user as a program not viewed yet by the first user and recommended to the first user.

In addition, as disclosed in Japanese Patent Laid-open No. 2001-160955, for example, there has been proposed a technology whereby an n-dimensional attribute vector is added in advance to a broadcast program as attributes of the program. Then, a selection vector is compared with the attribute vector to select a program to be recorded or a program to be reproduced. The selection vector is a vector generated from data initially recorded by the user and average values of attributes represented by attribute vectors of programs reproduced by the user or programs with reserved recording.

If a program is selected by adoption of the initial-interest catalog method, however, the selected program represents only a specific interest, which was owned by the user at the time the user initially cataloged information. In addition, in order to record details of the information, the user needs to carry out complicated information-cataloging operations. Thus, in order to simplify the operations to catalog the information to be recorded in the initial setting process, the number of pieces of information to be recorded needs to be reduced. In consequence, only a program selected on the basis of rough information recorded by the user can be recommended. As a result, the degree of precision to select a program matching the favorite of the user is low.

In the other methods such as the viewing-history utilization method, on the other hand, a recommended program is selected by simply using a sum or average value of pieces of meta data, which have been collected on the basis of a viewing history of the user. Thus, if the history is not stored to a certain degree in this case, it is not possible to recommend a program correctly matching the favorite of the user. In addition, in the case of the viewing-history utilization method, correlations among pieces of meta data are insensitive, making sufficient personalization impossible. On the top of that, if histories are piled up, in some cases, biases may be developed in weights due to history items overlapping each other with ease and history items each having an element spreading with ease as a history. History items overlapping each other with ease are items easily detected as a favorite of the user. An example of the history items overlapping each other with ease is a genre. On the other hand, a history item having an element spreading with ease as a history is an item difficult to detect as a favorite of the user. An example of the history item having an element spreading with ease as a history is a performer.

To put it concretely, let us assume for example that the user is a fan of commentator A. Thus, the user enjoys viewing a live coverage of a baseball game by team B with comments made by commentator A. In this case, pieces of information of "a live coverage of a baseball game", which is a genre, overlap each other with ease as a history. That is to say, the information of "a live coverage of a baseball game" is detected easily as a favorite of the user. However, pieces of information of "commentator A", which is a performer, hardly overlap each other. That is to say, information of "commentator A" is hardly detected as a favorite of the user. Thus, there is a case in which a live coverage of a baseball game by team B with comments made by another commentator is recommended while a variety program in which commentator A performs is not recommended.

In addition, as disclosed in Japanese Patent Laid-open No. 2001-160955, an attribute vector is added in advance to a broadcast program. Then, a selection vector is compared with the attribute vector to select a program to be recorded or a program to be reproduced. The selection vector is a vector generated from data initially recorded by the user and average values of attributes represented by attribute vectors of programs reproduced by the user or programs with reserved recording. Also in this case, since an operation history of the user is used, in some cases, biases may be developed in weights due to history items overlapping each other with ease and history items each having an element, such as a performer, spreading with ease as a history.

Let us assume for example that the user enjoys dramas and only variety programs of comedian A who does not perform in a drama. In addition, let us assume that the user views such variety programs and dramas at a ratio of 2:8. In a selection vector generated for such a user, pieces of information of "performer B" performing frequently in dramas overlap each other as a history rather than comedian A who hardly performs in a drama in spite of the fact that performer B is not specially a favorite star of the user. Thus, a documentary program in which "performer B" performing frequently in dramas performs is recommended, taking precedence of variety programs having comedian A as a performer.

In addition, an item of importance to selection of a program varies from user to user. For example, a performer is of importance to a certain user while the substance of a program is of importance to another user. Nevertheless, since all items are operated in the same way, a favorite unique to a user may not be reflected in a recommended program in some cases.

On the top of that, since what is utilized in the collaborative filtering method is the favorite of another user, it is difficult to extract information representing the favorite of each user in detail.

DISCLOSURE OF INVENTION

Addressing the problems described above, inventors of the present invention have thought of a capability of selecting a program matching a favorite of the user.

In order to solve the problems described above, according to the present invention, there is provided a first information-processing apparatus for generating attribute information of a content on the basis of information on the content, including:

acquisition means for acquiring the information on the content;

attribute-information generation means for generating the attribute information including a plurality of items on the basis of information acquired by the acquisition means as the information on the content; and first storage means for storing first weight information for the items of the attribute information generated by the attribute-information generation means, wherein the first weight information prescribes a degree of contribution given by each of a plurality of the items to computation of a degree of similarity between the attribute information and predetermined favorite information of the user.

Preferably, the information-processing apparatus further includes transmission means for transmitting the attribute information generated by the attribute-information generation means.

Preferably, the transmission means extracts a piece of first weight information matching a condition of a content from pieces of first weight information stored in the first storage means and transmits the extracted piece of first weight information by associating the extracted piece of first weight information with the attribute information generated by the attribute-information generation means.

Preferably, the condition of a content is the genre of the content.

Preferably, the information-processing apparatus further includes extraction means for extracting predetermined information from information acquired by the acquisition means as the information on the content, wherein the attribute-information generation means converts the predetermined information extracted by the extraction means into a vector for each plurality of the items in order to generate the attribute information.

Preferably, the attribute-information generation means selects information expressed in terms of words from the information on the content as an object of an analysis and generates the attribute information on the basis of a result of the analysis.

Preferably, the information-processing apparatus further includes: second storage means for storing information including a plurality of the items as the predetermined favorite information of the user; and recommendation-information generation means for generating recommendation information revealing a content matching a favorite of the user by computing a degree of similarity between the favorite information stored in the second storage means and the attribute information generated by the attribute-information generation means for each of the items.

Preferably, the recommendation-information generation means generates recommendation information through comparison of the attribute information with the favorite information by using the first weight information stored in the first storage means.

Preferably, the information-processing apparatus further includes:

operation-history acquisition means for acquiring a history of operations carried out by the user;

favorite-information generation means for generating favorite information of the user on the basis of a history acquired by the operation-history acquisition means as the history of operations carried out by the user; and weight-information generation means for generating second weight information on the basis of the favorite information generated by the favorite-information generation means, wherein:

the second weight information prescribes a degree of contribution given by each of a plurality of the items to computation of a degree of similarity between the attribute information and the favorite information of the user;

the recommendation-information generation means generates recommendation information through comparison of the attribute information with the favorite information by using the second weight information generated by the weight-information generation means.

According to the present invention, there is provided a first information-processing method for an information-processing apparatus which generates attribute information of a content on the basis of information on the content, the information-processing method including:

an acquisition step of acquiring the information on the content;

an attribute-information generation step of generating the attribute information including a plurality of items on the basis of information acquired in a process carried out at the acquisition step as the information on the content;

an extraction step of extracting weight information prescribing a degree of contribution given by each of a plurality of the items to computation of a degree of similarity between the attribute information and predetermined favorite information of the user on the basis of information acquired in the process carried out at the acquisition step as the information on the content and on the basis of a condition owned by the content; and an association step of associating the weight information extracted in a process carried out at the extraction step with the attribute information generated in a process carried out at the attribute-information generation step.

According to the present invention, there is provided a first recording medium for storing a computer-program to be executed by a computer to carry out processing for generating attribute information of a content on the basis of information on the content, the computer-program including:

an acquisition step of acquiring the information on the content;

an attribute-information generation step of generating the attribute information including a plurality of items on the basis of information acquired in a process carried out at the acquisition step as the information on the content;

an extraction step of extracting weight information prescribing a degree of contribution given by each of a plurality of the items to computation of a degree of similarity between the attribute information and predetermined favorite information of the user on the basis of information acquired in the process carried out at the acquisition step as the information on the content and on the basis of a condition owned by the content; and an association step of associating the weight information extracted in a process carried out at the extraction step with the attribute information generated in a process carried out at the attribute-information generation step.

According to the present invention, there is provided a first computer-program to be executed by a computer to carry out processing for generating attribute information of a content on the basis of information on the content, the computer-program including:

an acquisition step of acquiring the information on the content;

an attribute-information generation step of generating the attribute information including a plurality of items on the basis of information acquired in a process carried out at the acquisition step as the information on the content;

an extraction step of extracting weight information prescribing a degree of contribution given by each of a plurality of the items to computation of a degree of similarity between the attribute information and predetermined favorite information of the user on the basis of information acquired in the process carried out at the acquisition step as the information on the content and on the basis of a condition owned by the content; and an association step of associating the weight information extracted in a process carried out at the extraction step with the attribute information generated in a process carried out at the attribute-information generation step.

As described above, information on a content is acquired and attribute information including a plurality of items is generated on the basis of the acquired information on the content. Then, the attribute information is associated with weight information prescribing a degree of contribution given by each of a plurality of aforementioned items to computation of a degree of similarity between the attribute information and predetermined favorite information of the user on the basis of the information on the content and on the basis of a condition owned by the content.

According to the present invention, there is provided a second information-processing apparatus for carrying out processing to select a content matching a favorite of the user, including:

acquisition means for acquiring information including a plurality of items to serve as attribute information of the content;

storage means for storing information including a plurality of the items to serve as favorite information of the user; and recommendation-information generation means for generating recommendation information revealing a content matching a favorite of the user by computing a degree of similarity between information stored in the storage means as the favorite information of the user and the attribute information acquired by the acquisition means through application of predetermined weight information, wherein the weight information prescribes a degree of contribution given by each of a plurality of the items to computation of the degree of similarity between the attribute information and the favorite information of the user.

Preferably, the acquisition means acquires also the weight information besides the attribute information of the content and the recommendation-information generation means generates the recommendation information by comparison of the attribute information of the content with the favorite information by using the weight information.

Preferably, the information-processing apparatus further includes:

operation-history acquisition means for acquiring a history of operations carried out by the user;

favorite-information generation means for generating favorite information of the user on the basis of an operation history acquired by the operation-history acquisition means as the history of operations carried out by the user; and weight-information generation means for generating the weight information on the basis of the favorite information generated by the favorite-information generation means, wherein the recommendation-information generation means generates the recommendation information through comparison of the favorite information with the attribute information by using the weight information generated by the weight-information generation means.

Preferably, the weight information is information revealing a favorite preferred by the user as a characteristic favorite, which is used for selecting a specific piece among pieces of the attribute information of the content, rather than a generally preferred favorite.

Preferably, the weight information is information revealing an item of importance to the user among items composing the attribute information of the content.

Preferably, the weight information is information revealing an item indicating a content liked by the user among items composing the attribute information of the content.

Preferably, the weight information is information revealing an item indicating a content disliked by the user among items composing the attribute information of the content.

Preferably, the information-processing apparatus further includes operation input means for receiving an operation input from the user, wherein the weight information is set in accordance with an operation input entered by the user to the operation input means.

According to the present invention, there is provided a second information-processing method for an information-processing apparatus which carries out processing to select a content matching a favorite of the user, the information-processing method including:

an acquisition step of acquiring information of setting weight information prescribing a degree of contribution to computation of a degree of similarity between information composed of a plurality of items to serve as attribute information associated with the content and information composed of a plurality of items to serve as predetermined favorite information associated with the user where the contribution is contribution given by each of a plurality of the items;

a computation step of computing a degree of similarity between the attribute information and the favorite information on the basis of information acquired in a process carried out at the acquisition step as the information of setting the weight information; and a recommendation-information generation step of generating recommendation information revealing a content matching a favorite of the user through use of a computation result obtained in a process carried out at the computation step.

According to the present invention, there is provided a second recording medium for storing a computer-program to be executed by a computer to carry out processing to select a content matching a favorite of the user, the computer-program including:

an acquisition step of acquiring information of setting weight information prescribing a degree of contribution to computation of a degree of similarity between information composed of a plurality of items to serve as attribute information associated with the content and information composed of a plurality of items to serve as predetermined favorite information associated with the user where the contribution is contribution given by each of a plurality of the items;

a computation step of computing a degree of similarity between the attribute information and the favorite information on the basis of information acquired in a process carried out at the acquisition step as the information of setting the weight information; and a recommendation-information generation step of generating recommendation information revealing a content matching a favorite of the user through use of a computation result obtained in a process carried out at the computation step.

According to the present invention, there is provided a second computer-program to be executed by a computer to carry out processing to select a content matching a favorite of the user, the computer-program including:

an acquisition step of acquiring information of setting weight information prescribing a degree of contribution to computation of a degree of similarity between information composed of a plurality of items to serve as attribute information associated with the content and information composed of a plurality of items to serve as predetermined favorite information associated with the user where the contribution is contribution given by each of a plurality of the items;

a computation step of computing a degree of similarity between the attribute information and the favorite information on the basis of information acquired in a process carried out at the acquisition step as the information of setting the weight information; and a recommendation-information generation step of generating recommendation information revealing a content matching a favorite of the user through use of a computation result obtained in a process carried out at the computation step.

As described above, in order to generate the recommendation information revealing a content matching a favorite of the user, a degree of similarity between the information including a plurality of items to serve as the attribute information of the content and the information including a plurality of items to serve as the predetermined favorite information of the user is computed by using the weight information prescribing a degree of contribution given by each of a plurality of aforementioned items to the computation.

According to the present invention, there is provided an information-processing system including a first information-processing apparatus for generating attribute information of a content on the basis of information on the content and a second information-processing apparatus for carrying out processing to select the content matching a favorite of the user on the basis of information received from the first information-processing apparatus as the attribute information of the content, the first information-processing apparatus including:
first acquisition means for acquiring the information on the content;
attribute-information generation means for generating the attribute information including a plurality of items on the basis of information acquired by the first acquisition means as the information on the content;
first storage means for storing first weight information for items of the attribute information generated by the attribute-information generation means; and
transmission means for extracting a piece of the first weight information matching a condition owned by the content from pieces of the first weight information stored in the first storage means, associating the extracted first weight information with the attribute information generated by the attribute-information generation means and transmitting the first weight information and the attribute information, the second information-processing apparatus including:
second acquisition means for acquiring information including a plurality of items as the attribute information of the content and the first weight information;
second storage means for storing information including a plurality of the items to serve as favorite information of the user; and
recommendation-information generation means for generating recommendation information revealing a content matching the favorite of the user by computing a degree of similarity between information stored in the second storage means as the favorite information of the user and the attribute information acquired by the second acquisition means through application of at least either the first weight information or second weight information different from the first weight information,
wherein the first weight information and the second weight information each prescribe a degree of contribution given by each of a plurality of the items to computation of the degree of similarity between the attribute information and the favorite information of the user.

As described above, in the first information-processing apparatus, the information on a content is acquired and the attribute information including a plurality of items is generated on the basis of the information on the content. Then, first weight information for items of the attribute information is stored. Subsequently, a piece of first weight information matching a condition owned by the content is extracted from the stored pieces of first weight information and associated with the attribute information. Finally, the first weight information and the attribute information, which are associated with each other, are transmitted to the second information-processing apparatus. In the second information-processing apparatus, on the other hand, the information including a plurality of items to serve as the attribute information of the content and the first weight information are received from the first information-processing apparatus whereas information including a plurality of aforementioned items to serve as favorite information of the user is stored. Then, recommendation information revealing a content matching a favorite of the user is generated by computing a degree of similarity between the stored favorite information of the user and the attribute information through application of at least either the first weight information or second weight information different from the first weight information. In addition, the first weight information and the second weight information each prescribe a degree of contribution given by each of a plurality of aforementioned items to computation of the degree of similarity between the attribute information and the favorite information of the user.

According to the present invention, there is provided a third information-processing apparatus for carrying out processing to select a content matching a favorite of the user, including:

acquisition means for acquiring attribute information of the content; and bias-information generation means for generating, on the basis of first information showing the favorite of the user and second information showing a generally preferred favorite, third information revealing a bias of the favorite of the user as a bias with respect to the generally preferred favorite.

Preferably, the attribute information, the first information and the third information each include a plurality of items; and selection means further provided in the information-processing apparatus selects a content matching the favorite of the user by computation of a degree of similarity between the attribute information and the first information for each of the items through use of the third information.

Preferably, the first information and the second information each include a plurality of items; and as the third information, the bias-information generation means generates information revealing the items each having a low degree of similarity between the first information and the second information.

Preferably, the information-processing apparatus further includes: operation-history acquisition means for acquiring a history of operations carried out by the user; and favorite-information generation means for generating the first information on the basis of a history acquired by the operation-history acquisition means as the history of operations carried out by the user.

Preferably, the bias-information generation means generates the third information by:

counting the number of contents, which the user selects from those pertaining to a predetermined group and views, for each of predetermined items to result in a first value and using the first value as the first information;

counting the number of all the contents pertaining to the predetermined group for each of the predetermined items to result in a second value and using the second value as the second information; and normalizing the first value through use of the second value to result in the third information.

Preferably, the predetermined group of contents is a set of contents broadcasted or distributed during a predetermined period of time.

Preferably, the bias-information generation means generates the third information by:

taking each of sets each consisting of contents as one of a plurality of the predetermined groups of contents where the sets are broadcasted or distributed during different periods of times;

computing a plurality of the first and second values for the predetermined groups of contents; and normalizing each of the first values through use of the second values computed for the same group of contents as the first value as the second value corresponding to the first value to result in the third information.

Preferably, each of the predetermined groups of contents is a set of contents broadcasted or distributed during a predetermined period of time.

Preferably, the first information is the attribute information associated with the content as information revealing an item indicating that the content is a favorite of the user.

Preferably, the first information is the attribute information associated with the content as information revealing an item indicating that the content is disliked by the user.

According to the present invention, there is provided a third information-processing method for an information-processing apparatus which carries out processing to select a content matching a favorite of the user, the information-processing method including:

a first acquisition step of acquiring first information showing the favorite of the user;

a second acquisition step of acquiring second information showing a generally preferred favorite; and a bias-information generation step of generating third information revealing a bias of the favorite of the user as a bias with respect to the generally preferred favorite on the basis of the first information acquired in a process carried out at the first acquisition step and the second information acquired in a process carried out at the second acquisition step.

According to the present invention, there is provided a third recording medium for storing a computer-program to be executed by a computer to carry out processing to select a content matching a favorite of the user, the computer-program including:

a first acquisition step of acquiring first information showing the favorite of the user;

a second acquisition step of acquiring second information showing a generally preferred favorite; and a bias-information generation step of generating third information revealing a bias of the favorite of the user as a bias with respect to the generally preferred favorite on the basis of the first information acquired in a process carried out at the first acquisition step and the second information acquired in a process carried out at the second acquisition step.

According to the present invention, there is provided a third computer-program to be executed by a computer to carry out processing to select a content matching a favorite of the user, the computer-program including:

a first acquisition step of acquiring first information showing the favorite of the user;

a second acquisition step of acquiring second information showing a generally preferred favorite; and a bias-information generation step of generating third information revealing a bias of the favorite of the user as a bias with respect to the generally preferred favorite on the basis of the first information acquired in a process carried out at the first acquisition step and the second information acquired in a process carried out at the second acquisition step.

As described above, the third information revealing a bias of the favorite of the user as a bias with respect to the generally preferred favorite is generated on the basis of the first information representing the favorite of the user and the second information representing the generally preferred favorite.

BRIEF DESCRIPTION OF DRAWINGS

FIG. 2 is a block diagram showing the configuration of a distribution server shown in FIG. 1;

FIG. 3 shows a flowchart referred to in explanation of program-vector generation processing 1;

FIG. 4 is an explanatory diagram referred to in description of EPG data;

FIG. 5 is an explanatory diagram referred to in description of a program vector;

FIG. 6 shows a flowchart referred to in explanation of program-vector generation processing 2;

FIG. 15 is an explanatory diagram referred to in description of a positive-history vector;

BEST MODE FOR CARRYING OUT THE INVENTION

Figure 1:
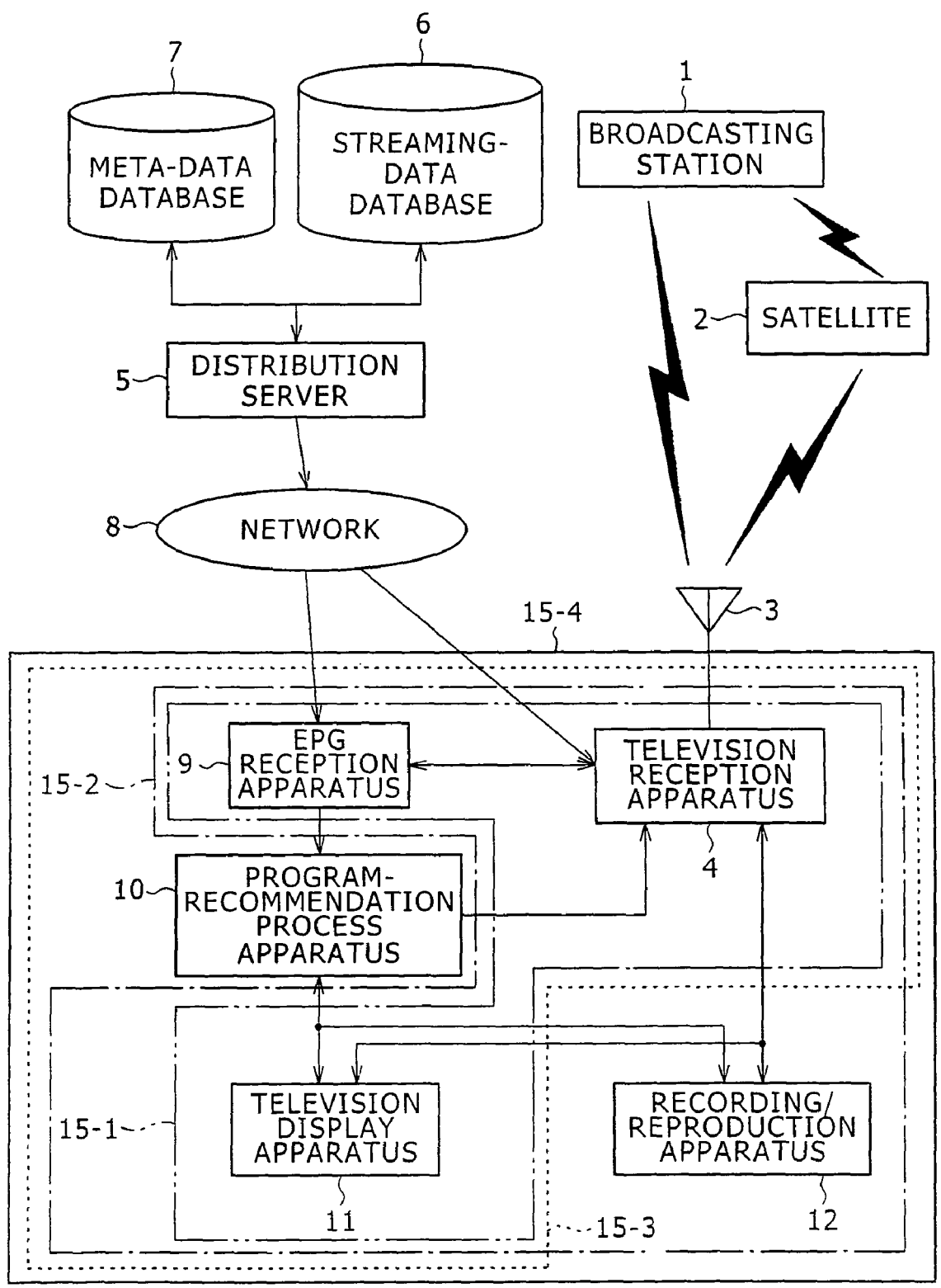
FIG. 1 is an explanatory diagram referred to in description for distribution of television program broadcasts and stream data.

An embodiment of the present invention is explained by referring to diagrams as follows.

First of all, television-program broadcasting and distribution of stream data are described by referring to FIG. 1 as follows.

A broadcasting station 1 transmits a program broadcast as a ground wave or transmits a program broadcast as a satellite wave by way of a satellite 2. FIG. 1 shows only one broadcasting station 1. It is needless to say, however, that a plurality of broadcasting stations may exist. An antenna 3 employed in a television (TV) reception apparatus 4 receives a program broadcast transmitted as a ground wave or a satellite wave. A broadcast signal may include an EPG (Electronic Program Guide) if necessary.

A distribution server 5 reads out streaming data from a streaming-data database 6 and transmits the streaming data to the TV reception apparatus 4 by way of a network 8 including the Internet and other sub-networks. The distribution server 5 also reads out an EPG or meta data including information more detailed than an EPG from a meta-data database 7. An EPG is information on programs broadcasted from the broadcasting station 1. The distribution server 5 then generates a program vector PP for every program and transmits the program vectors PP to an EPG reception apparatus 9 along with the EPG data by way of the network 8.

If the amount of information included in an EPG superposed on a general broadcast signal of a program is sufficiently large enough for processing to be described later, for the processing, the same data as the EPG superposed on a general broadcast signal can be used. If the amount of information included in an EPG superposed on a general broadcast signal cannot be said to be sufficiently large enough for the processing to be described later, on the other hand, for the processing, meta data can be used in addition to the EPG superposed on a general broadcast signal or used as standalone data. Since the amount of information included in an EPG superposed on a general broadcast signal is not sufficiently large enough for the processing, in this embodiment, information including meta data is used for the processing and such information is referred to as EPG data.

The EPG reception apparatus 9 supplies EPG data received from the distribution server 5 to the TV reception apparatus 4. In addition, the EPG reception apparatus 9 supplies program vectors PP received along with the EPG data to a program-recommendation process apparatus 10.

The TV reception apparatus 4 having a tuner selects a broadcast signal received by the antenna 3 as a ground or satellite wave on the basis of a control signal received from a TV display apparatus 11 having an operation section or a recording/reproduction apparatus 12 also having an operation section as a signal indicating a channel selected by the user, and receives the selected broadcast signal. The TV reception apparatus 4 also receives streaming data from transmitted by the distribution server 5 by the way of the network 8. In addition, the TV reception apparatus 4 receives EPG data from the EPG reception apparatus 9, and supplies the data to the TV display apparatus 11 or the recording/reproduction apparatus 12. It is to be noted that, if the received wave includes an EPG, the TV reception apparatus 4 separates the EPG from a program signal included in the wave, supplying the EPG and the program signal to the TV display apparatus 11 or the recording/reproduction apparatus 12.

A program-recommendation process apparatus 10 acquires program vectors PP from the EPG reception apparatus 9 and acquires an operation log from the TV display apparatus 11 as well as the recording/reproduction apparatus 12. The program-recommendation process apparatus 10 then generates recommendation information for recommending a program matching a favorite of the user on the basis of the program vectors PP and the operation log or on the basis of an input operation carried out by the user, and supplies the recommendation information to the TV display apparatus 11 and the recording/reproduction apparatus 12.

On the basis of an operation input entered by the user, the TV display apparatus 11 displays a broadcast signal received from the TV reception apparatus 4 or a reproduced signal received from the recording/reproduction apparatus 12. In addition, on the basis of recommendation information received from the program-recommendation process apparatus 10, the TV display apparatus 11 automatically sets a channel and displays information on a recommended program. The TV display apparatus 11 also supplies an operation log serving as a history of operations carried out by the user to the program-recommendation process apparatus 10.

On the basis of an operation input entered by the user, the recording/reproduction apparatus 12 records a broadcast signal received from the TV reception apparatus 4 onto a mounted recording medium or an embedded recording medium such as a hard disk. In addition, on the basis of recommendation information received from the program-recommendation process apparatus 10, the recording/reproduction apparatus 12 automatically records a broadcast signal received from the TV reception apparatus 4 onto the mounted recording medium or the embedded recording medium. On the other hand, the recording/reproduction apparatus 12 also reproduces a program from the mounted recording medium or the embedded recording medium and supplies the reproduced program to the TV display apparatus 11 for displaying the program. On the top of that, the recording/reproduction apparatus 12 also supplies an operation log serving as a history of operations carried out by the user to the program-recommendation process apparatus 10.

In the above description, the EPG reception apparatus 9, the TV reception apparatus 4, the program-recommendation process apparatus 10, the TV display apparatus 11 and the recording/reproduction apparatus 12 have been explained as different apparatus. However, these apparatus do not have to be designed individually. For example, it is needless to say that the EPG reception apparatus 9, the TV reception apparatus 4 and the TV display apparatus 11 can be integrated into a single configuration of a TV receiver 15-1 having an embedded tuner function. In addition, the recording/reproduction apparatus 12 can be integrated with the TV receiver 15-1 to form a TV receiver 15-2 having a recording function. It is needless to say that the recording/reproduction apparatus 12 may be the so-called hard-disk recorder including a hard disk having a large storage capacity. Moreover, the program-recommendation process apparatus 10 can be integrated with the TV receiver 15-1 having an embedded tuner function to form a TV receiver 15-3 or the program-recommendation process apparatus 10 can be integrated with the TV receiver 15-2 having a recording function to form a TV receiver 15-4.

FIG. 2 is a block diagram showing the configuration of the distribution server 5.

A data acquisition section 21 acquires data from the meta-data database 7 or the streaming-data database 6 and supplies the acquired data to a data transmission section 25. In addition, the data acquisition section 21 supplies EPG data to a meta-data extraction section 22. Moreover, the data acquisition section 21 carries out processing to collect EPG data stored in the meta-data database 7 into groups in accordance with the substance of the EPG data.

The meta-data extraction section 22 extracts meta data necessary for generation of a program vector PP from EPG data received from the data acquisition section 21 and supplies the extracted data to a program-vector generation section 23. The program-vector generation section 23 generates a program vector PP on the basis of meta data and, if necessary, associates the program vector PP with a program-side effect vector EfPP stored in a data storage section 24 before supplying the program vector PP and the program-side effect vector EfPP to the data transmission section 25.

The data storage section 24 is used, if necessary, for storing program-side effect vectors EfPP, which are each information data necessary for generation of a program vector PP.

From the standpoints of the production and broadcasting sides devising a measure as to how to raise the viewing rate, for example, a general culture program is provided with a characteristic emphasizing a strong genre or contents factor, a variety program or the like is provided with a characteristic emphasizing a strong performer factor and a drama program is provided with a characteristic emphasizing strong performer and scriptwriter factors. In order to correctly grasp features of a program, it is necessary to utilize these characteristics. That is to say, the genre of a program determines which components composing a program vector PP of the program are important in a matching process carried out in order to recommend a program matching a favorite of the user. In other words, such important components vary from genre to genre.

That is to say, if the genre of a program is "general culture/documentary," the important item is not performer, but the contents and title of the program. If the genre of a program is "variety," on the other hand, the important item is performer. If the genre of a program is "drama," the important item is performer and scriptwriter. When the important item is used in generating of a program vector PP, a program effective vector is set as a vector prescribing the degree of contribution by each item in a matching process for every genre and stored in the data storage section 24.

The data transmission section 25 transmits information to the EPG reception apparatus 9 or the TV reception apparatus 4 by way of the network 8. The transmitted information includes EPG data and streaming data, which are supplied by the data acquisition section 21, as well as a program vector PP and a program effect vector EfPP, which are supplied by the program-vector generation section 23.

If necessary, a drive 26 is connected to the program-vector generation section 23. If necessary, a magnetic disk 31, an optical disk 32, a magneto-optical disk 33 or a semiconductor memory 34 is mounted on the drive 26 so that data can be exchanged between the drive 26 and the magnetic disk 31, the optical disk 32, the magneto-optical disk 33 or the semiconductor memory 34.

Next, program-vector generation processing 1 carried out by the distribution server 5 is explained by referring to a flowchart shown in FIG. 3.

First of all, at a step S1, the data acquisition section 21 acquires EPG data including meta data from the meta-data database 7.

Then, at a step S2, the meta-data extraction section 22 receives the EPG data from the data acquisition section 21 and extracts meta data required for generating a program vector PP from the EPG data. Subsequently, the meta-data extraction section 22 supplies the extracted meta data to the program-vector generation section 23.

FIG. 4 is a diagram showing typical meta data. The meta data includes "Movie: Japanese film" as the genre of the program and "Toukaidou Mitsuya Ghost-story" as the title of the movie. The meta data also includes a broadcasted date, a distributor, broadcasting date, the name of a broadcasting station and broadcasting time. In addition, the meta data also includes the name of the director, the name of the scriptwriter, the name of the cameraman, the name of a person in charge of music and the names of the performer in addition to comments describing contents of the program as comments on the movie.

Then, at the next step S3, the program-vector generation section 23 carries out a morphological analysis on pieces of information included in the meta data such as the title and the contents, if necessary, and disassembles them into words. To put it concretely, the program-vector generation section 23 disassembles the movie name included in the meta data as the title into 3 words, i.e., "Tokaidou", "Mitsuya" and "ghost-story". As shown in FIG. 4, the meta data includes information saying: "59 production of Seihou, Masterpiece of horror show of Japanese film, depicting the world of the famous Mitsuya ghost-story to fullness of formal beauty." In this case, the program-vector generation section 23 extracts words included in this comment as information on the contents. The extracted words are "Seihou", "formal", "beauty", "fullness", "famous", "Mitsuya", "ghost-story", "world", "depicting", "Japanese film", "horror" and "masterpiece".

Then, at the next step S4, the program-vector generation section 23 converts items included in the meta data into a vector referred to as a program vector PP. Finally, the execution of the processing is ended. The generated program vector PP is supplied to the data transmission section 25, which then transmits the program vector PP to the EPG reception apparatus 9 by way of the network 8. The program vector PP having the items may have a format including all detailed-item components aligned to form 1 array. As an alternative, items are grouped into large items, which are then converted into a program vector PP.

FIG. 5 is a diagram showing program vector PP={Tm, Gm, Pm, Am, Km} obtained as a result of application of vector conversion to 7 large items, i.e., title, genre, time band, broadcasting station, performer, scriptwriter/author/producer and contents. The contents of each of the large items are described as follows: Title Tm={title1, title2, . . . }, Genre Gm={Drama, Variety, Sport, Movie, Music, Child program/Education, General culture/Documentary, News/Report, Others}, Time band (Hour) Hm={Morning, Daytime, Evening, Prime-time, Late at night}, Broadcasting station (TV station) Sm={NNK General, NNK Educational, Asian Television, TTS, Buji, Telenichi, Touto, First NNK Satellite, Second NNK Satellite, WOWO}, Performer (person) Pm={person A, person B, . . . }, Scriptwriter/author/producer Am={person a, person b, . . . }, Contents (Keyword) Km={kw1, kw2, . . . }.

Since the genre, the broadcasting station and the time band of the 7 large items each have a clearly identifiable type, detailed items of each of these large items can be represented by a numerical vector. Let us take the broadcasting station as an example. As described above, the broadcasting station is Sm={NNK General, NNK Educational, Asian Television, TTS, Buji, Telenichi, Touto, First NNK Satellite, Second NNK Satellite, WOWO}. If the broadcasting station of the program is WOWO, for example, the broadcasting station vector can be expressed by a broadcasting station Sm={0, 0, 0, 0, 0, 0, 0, 0, 0, 1}. As for the genre, the large item is Gm={Drama, Variety, Sport, Movie, Music, Child program/Education, General culture/Documentary, News/Report, Others}. If the genre of the program is the general culture/documentary, the genre vector can be expressed by a genre Gm={0, 0, 0, 0, 0, 0, 1, 0, 0}.

On the other hand, the large items of title, performer, scriptwriter/author/producer and contents cannot each be represented by a numerical vector. In this case, each of the large items is expressed by a vector comprising appearance frequencies as vector components. An appearance frequency associated with a word in a sentence represented by the vector is a frequency at which the word appears in the sentence. For example, the large item of title is the title Tm={Toukaidou-1, Mitsuya-1, ghost-story-1} in which each component is a pair of a word and a number representing the frequency of the word. In this example, the component of Toukaidou-1 implies that the word Toukaidou appears once in the sentence represented by the vector.

The program vector PP is generated as described above and then transmitted to the EPG reception apparatus 9. To put it concretely, a program vector PP generated from program meta data explained earlier by referring to FIG. 4 is a program vector PP={Title Tm={Toukaidou-1, Mitsuya-1, ghost-story-1}, Genre Gm={0, 0, 0, 1, 0, 0, 0, 0, 0}, Time band Hm={0, 0, 0, 0, 1}, Broadcasting station Sm={0, 0, 0, 0, 0, 0, 0, 0, 0, 1), Performer Pm={Katsumi wakasugi-1, Shigeru Amami-1, Toshihiko Emi-1, Ryuujirou Nakamura-1 and Noriko Nishizawa-1}, Scriptwriter/author/producer Am={Nobuo Nakagawa-1, Shoichi Ohnuki-1, Yoshihiro Ishida-1, Shoji Nishimoto-1, Chuta Watanabe-1}, Contents Km={Seihou-1, formal-1, beauty-1, fullness-1, famous-1, Mitsuya-1, ghost-story-1, world-1, depicting-1, Japanese film-1, horror-1 and masterpiece-1}}

The program vector PP is transmitted to the EPG reception apparatus 9.

In the program vector PP generated as described above, for example, main components of the performer vector Pm can be particularly weighted. By the same token, the director of the scriptwriter/author/producer vector Am can be particularly weighted. For example, the performer vector can be expressed by Pm={Katsumi Wakasugi-3, Shigeru Amami-2, Toshihiko Emi-1, Ryuujirou Nakamura-1 and Noriko Nishizawa-1} and the scriptwriter/author/producer vector can be expressed by Am={Nobuo Nakagawa-3, Shoichi Ohnuki-1, Yoshihiro Ishida-1, Shoji Nishimoto-1, Chuta Watanabe-1}.

In addition, as described above, the genre of a program determines which components composing a program vector PP of the program are important in a matching process carried out in order to recommend a program matching a favorite of the user or, in other words, such important components vary from genre to genre. A program-side effect vector EfPP reveals which components are important for each genre. If the program-side effect vector EfPP is stored in the data storage section 24, the program-side effect vector EfPP can also be transmitted by being associated with the program vector PP. The program-side effect vector EfPP is set for a set of large items represented by the program vector PP.

Let us assume for example that the genre of a program in the program vector PP={Title Tm, Genre Gm, Time band Hm, Broadcasting station Sm, Performer Pm, Scriptwriter/author/producer Am, Contents Km} is the general culture/documentary. In this case, important items are the title and the contents. Thus, the program-side effect vector EfPP is set at a value of {3, 1, 1, 1, 1, 1, 3} where the number of 3 is the weight. If the genre of a program is a variety, on the other hand, the important item is performer. In this case, the program-side effect vector EfPP is set at a value of {1, 1, 1, 1, 5, 1, 1} where the number of 5 is the weight. If the genre of a program is a drama, the important item is performer and the scriptwriter. In this case, the program-side effect vector EfPP is set at a value of {1, 1, 1, 1, 2, 3, 1} where the number of 2 is the weight for the performer and the number of 3 is the weight for the scriptwriter.

By referring to a flowchart shown in FIG. 6, the following description explains program-vector generation processing 2 for a case in which a program-side effect vector EfPP is transmitted by being associated with a program vector PP.

Processes carried out at steps S11 to S14 are the same as the processes carried out at respectively the steps S1 to S4 of the flowchart explained earlier by referring to FIG. 3. At these steps, as described earlier, EPG data is acquired from the meta-data database 7 and meta data necessary for generation of a program vector PP is extracted from the EPG data. Then, if necessary, a morphological analysis is carried out on information included in the meta data to disassemble the information into words. Examples of the information included in the meta data are a title and contents. Subsequently, items included in the meta data are converted into a program vector PP.

Then, at the next step S15, the program-vector generation section 23 extracts an effect vector from effect vector information stored in the data storage section 24 on the basis of the genre of the program associated with the received meta data. If the genre of the program is the variety, for example, an effect vector EfPP={1, 1, 1, 1, 5, 1, 1} placing a weight of 5 on the performer is extracted from the data storage section 24.

Then, at the next step S16, the program-vector generation section 23 associates the effect vector EfPP extracted in the process carried out at the step S15 with the program vector PP generated in the process carried out at the step S14. Finally, the execution of the processing is ended.

By carrying out the processing described above, a program vector PP is generated and associated with a program-side effect vector EfPP obtained on the basis of the genre of the program as a program-side effect vector EfPP placing weights on important items of the program vector PP. Then, the program vector PP and the program-side effect vector EfPP are transmitted to the EPG reception apparatus 9 by way of the network 8.

A program vector PP is generated as described above. By grouping programs in accordance with the attributes of the programs, however, a program vector PP can be created in little processing but with a high degree of accuracy.

The processing of grouping programs is carried out typically to create a group consisting of programs having the same genre such as a serial drama as programs broadcasted in the same week or a group consisting of programs presenting the same performer in a program organization unit such as 13 weeks. As a concrete example of the processing of grouping programs, the following description explains grouping processing 1 of grouping programs of a serial drama by referring to a flowchart shown in FIG. 7.

First of all, at a step S31, the data acquisition section 21 extracts programs matching a predetermined grouping condition from EPG data stored in the meta-data database 7. As an example of the predetermined grouping condition, the condition requires that programs to be extracted have the same title, the same broadcasting station, the same broadcasting time on all weekdays or the same broadcasting time on the same days of the weeks.

Then, at the next step S32, the data acquisition section 21 puts the extracted programs in a group and attaches a group ID to EPG data of the programs.

Subsequently, at the next step S33, the meta-data extraction section 22 extracts meta data necessary for generation of a program vector PP of a first broadcast representing a program recognized as a part of a serial drama, that is, the first program of programs identified by the same group ID.

Then, at the next step S34, the program-vector generation processing explained earlier by referring to a flowchart shown in FIG. 3 or 6 is carried out.

Subsequently, at the next step S35, the program-vector generation section 23 fixes and sets the generated program vector PP of the first broadcast as a program vector PP identified by the group ID. Finally, the execution of the processing is ended.

By carrying out the processing described above, programs of a serial drama are put in a group having the same program vector PP. In addition, the ID of the group and the program vector PP may be associated with each other and stored in the data storage section 24.

In particular, in the EPG data of a serial drama, in many cases, the first contents are a description of all programs and subsequent contents are each a description of the related program only and not a description of all the programs. In addition, meta-data portions other than program descriptions remain the same for each program. Thus, by generating a program vector PP through use of EPG data for the first program, it is possible not only to reduce the number of times the program-vector generation processing is carried out, but also to generate a program vector PP matching characteristics of the program with a high degree of accuracy.

Figure 7:
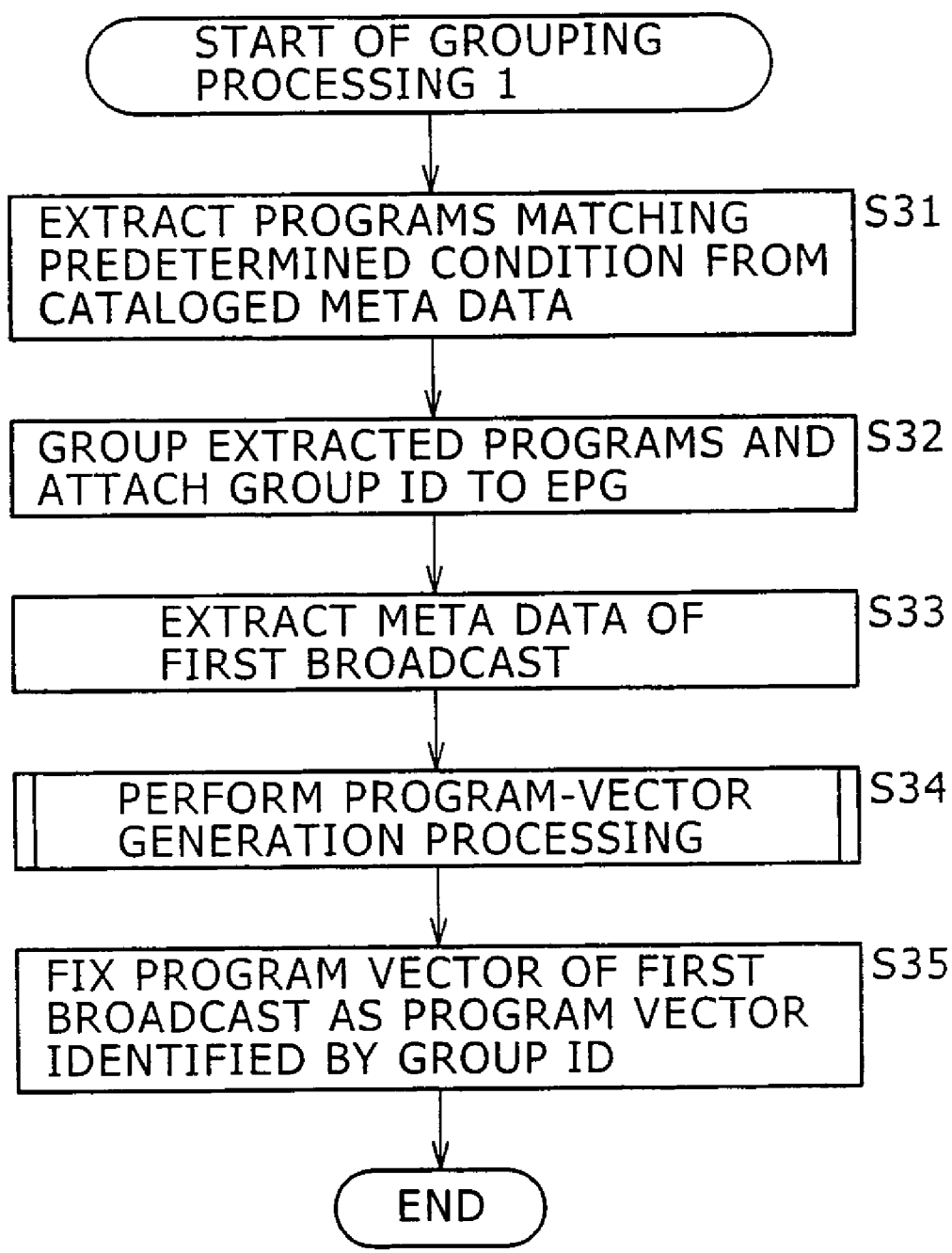
FIG. 7 shows a flowchart referred to in explanation of grouping processing 1.

FIG. 7 shows a flowchart representing processing to add a common ID to EPG data of a serial drama. If the EPG data already includes information for identifying the serial drama, the process carried out at the step S31 can be eliminated. In this case, a common ID is added to EPG data of a serial drama by referring to the information already included in the EPG data as information for identifying the serial drama.

Figure 8:
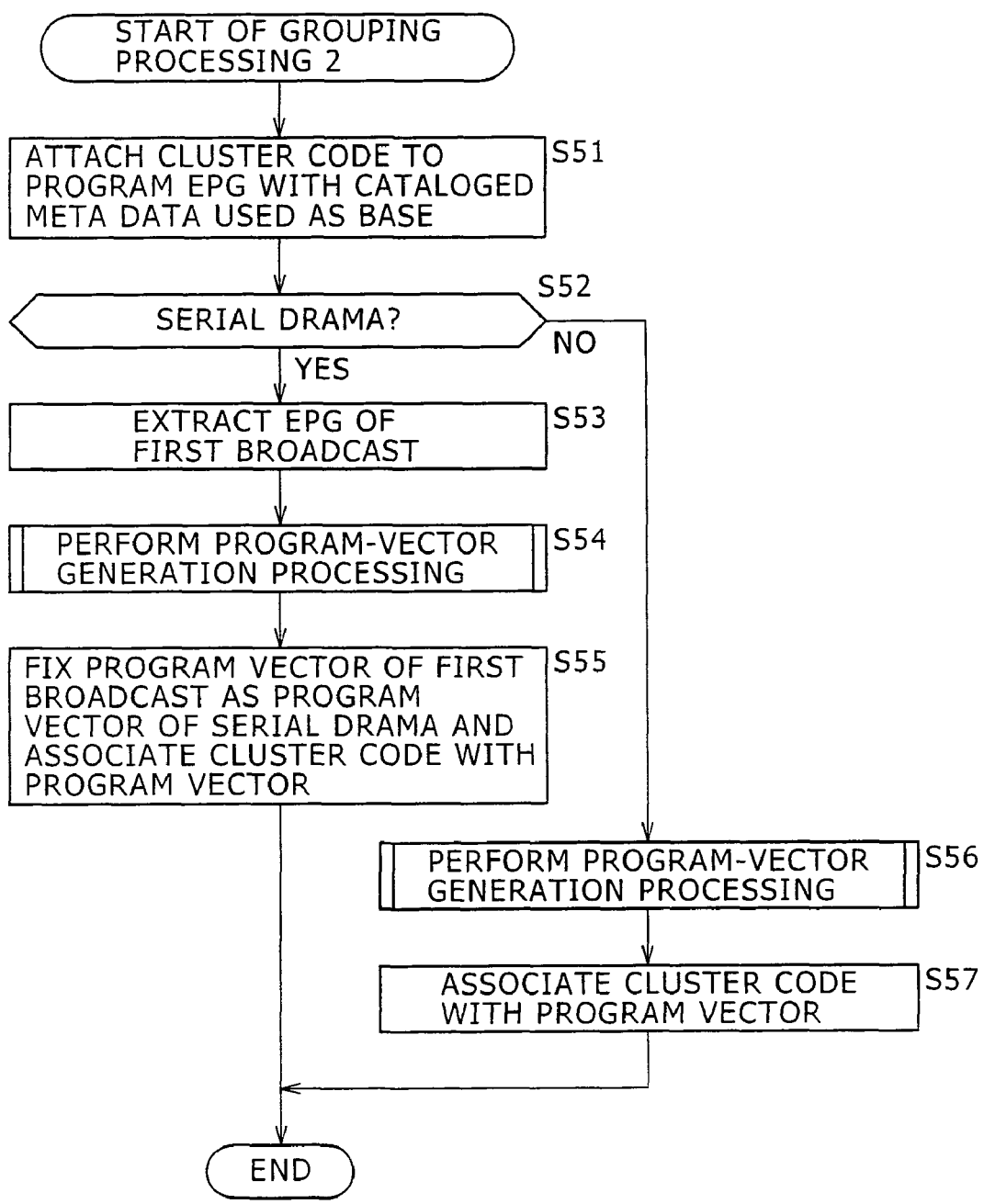
FIG. 8 shows a flowchart referred to in explanation of grouping processing 2.

By referring to a flowchart of FIG. 8, the following description explains grouping processing 2 capable of grouping programs also for elements other than a serial drama. Grouping based on a genre and performer is explained as follows.

First of all, a step S51, the data acquisition section 21 refers to EPG data stored in the meta-data database 7 and adds a cluster code corresponding to meta data of a program to the EPG data of the program.

Let us assume for example that programs matching a condition for a serial drama are extracted. Typically, the condition for a serial drama requires that programs to be extracted have the same title, the same broadcasting station, the same broadcasting time on all the weekdays or the same broadcasting time on the same days of the weeks. For the group of extracted programs recognized as programs of a serial drama, a first cluster code corresponding to the serial drama has a least significant digit typically determined on the basis of the broadcasting time of the serial drama as follows. If the broadcasting time of the programs composing the serial drama is the same time on all the weekdays, the least significant digit of the first cluster code is for example a code of 1. If the broadcasting time of the programs composing the serial drama is the same time on the same days of the weeks, on the other hand, the least significant digit of the first cluster code is for example a code of 2. If the broadcasting time of the programs composing the serial drama is a time other than those corresponding to the codes of 1 and 2, such as on alternating weeks or days, the least significant digit of the first cluster code is for example a code of 3. For programs other than a serial drama, the least significant digit of the first cluster code is for example 0.

Then, data of genres in the meta data recorded in the meta-data database 7 is referred to in order to determine the second digit from the least significant digit in a second cluster code corresponding to the genre. The second digit from the least significant digit in the second cluster code is set for example at a code of 20, a code of 30 and so on in dependence on the genre. The second digit from the least significant digit in a second cluster code is the so-called tens place.

Finally, data of performer in the meta data recorded in the meta-data database 7 is referred to in order to determine the third digit from the least significant digit in a third cluster code corresponding to the performer and digits of orders higher than the third digit. The third digit from the least significant digit in the third cluster code and digits of orders higher than the third digit are set for example at a code of 2300, a code of 800 or other code in dependence on the performer. The third digit from the least significant digit in a third cluster code is the so-called hundreds place and digits of orders higher than the third digit are thus digits of orders higher than the hundreds place.

The cluster code added to the EPG of a program is the sum of the first to third cluster codes described above.

Then, at the next step S52, the data acquisition section 21 determines whether or not the EPG is an EPG of a serial drama by examining the first digit of the cluster code assigned to the EPG to see if the first digit is 0 or not.

If the determination result produced in the process carried out at the step S52 indicates that the programs are programs of a serial drama, the flow of the processing goes on to steps S53 and S54 to carry out the same processes as respectively the steps S33 and S34 of the flowchart explained earlier by referring to FIG. 7. That is to say, the EPG of the first broadcast is extracted and the program-vector generation processing explained earlier by referring to the flowchart shown in FIG. 3 or 6 is carried out.

Then, at the next step S55, the program-vector generation section 23 fixes the program vector PP of the first broadcast as the program vector PP of the serial drama and associates the generated cluster code with the program vector PP. Finally, the execution of the processing is ended.

If the determination result produced in the process carried out at the step S52 indicates that the programs are not programs of a serial drama, on the other hand, the flow of the processing goes on to a step S56 at which the program-vector generation processing explained earlier by referring to the flowchart shown in FIG. 3 or 6 is carried out.

Then, at the next step S57, the program-vector generation section 23 associates the generated cluster code with the program vector PP. Finally, the execution of the processing is ended.

By carrying out the processing described above, program vectors PP can be grouped not only by serial drama but also by genre and performer. In addition, a cluster code identifying a group can be associated with the program vector PP for the group.

In the distribution server 5 explained earlier by referring to FIG. 2, a program vector PP is generated as explained above by referring to FIGS. 3 to 8. Thus, a program vector PP can always be generated as a vector corresponding to new terminologies, new genres or the like. The generated program vector PP and its EPG data are transmitted to the EPG reception apparatus 9 by way of the network 8 and supplied to the program-recommendation process apparatus 10.

In addition, the grouping processing may include a morphological analysis to be carried out on a title to disassemble the title into words and assign a group ID to the words.

Figure 9:
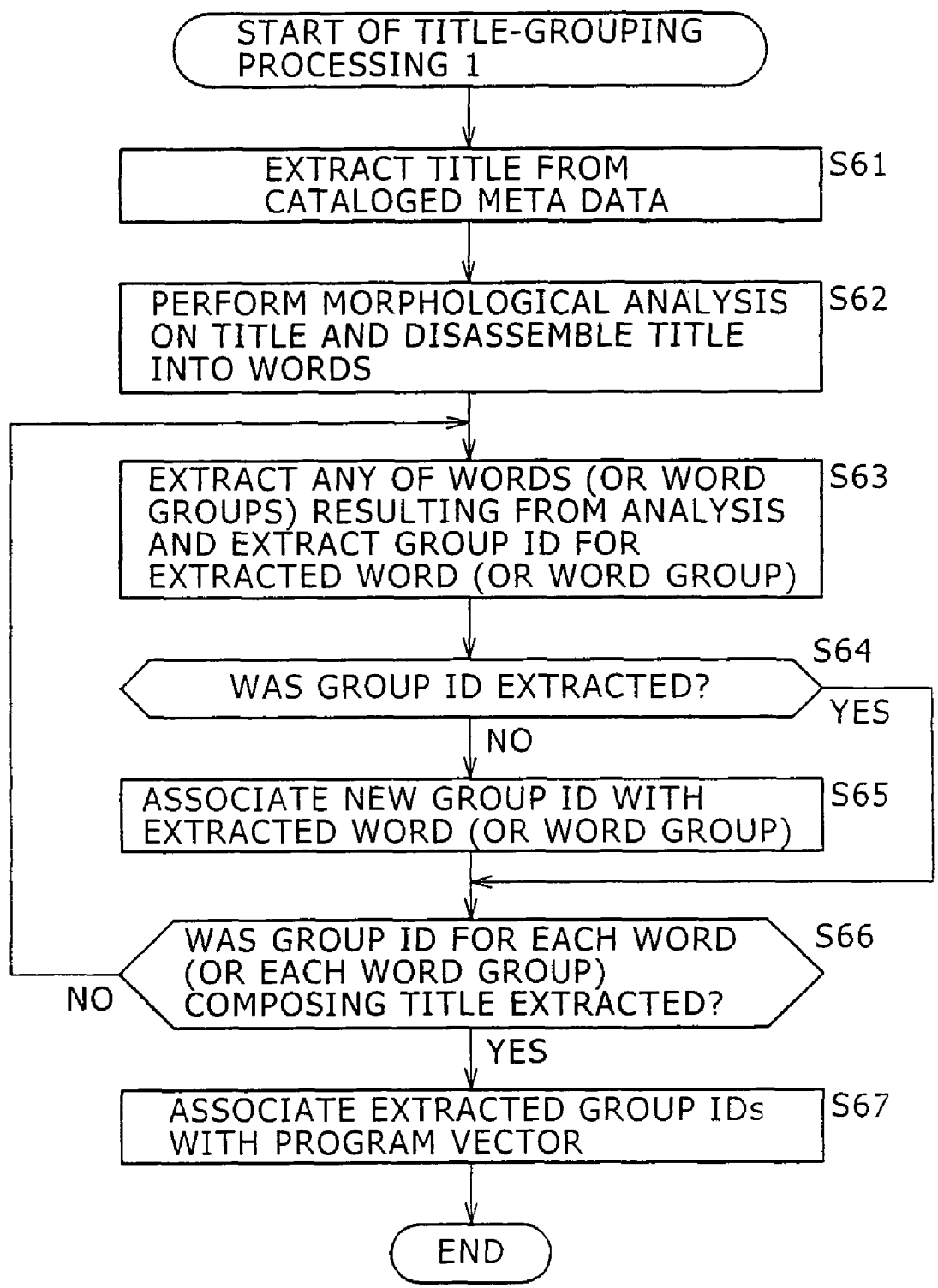
FIG. 9 shows a flowchart referred to in explanation of title-grouping processing 1.

Next, title-grouping processing 1 is explained by referring to a flowchart shown in FIG. 9.

First of all, at a step S61, the data acquisition section 21 extracts a title from cataloged meta data resulting from reference to EPG data stored in the meta-data database 7 and submits the title to the program-vector generation section 23.

Then, at the next step S62, the program-vector generation section 23 performs a morphological analysis on the title and disassembles the title into words. To put it concretely, let us assume that the movie title included in the meta data is "Toukaidou Mitsuya Ghost-story". In this case, the title is disassembled into the following 3 words/phrases: "Tokaidou", "Mitsuya" and "Ghost-story".

Subsequently, at the next step S63, the program-vector generation section 23 extracts a word (or a phrase including a plurality of words) from the words (or the phrases) obtained as a result of the analysis and extracts a group ID for the extracted word (or phrase) from the data storage section 24.

A phrase including a plurality of words is a group of words. This group of words is created by combining the words obtained as a result of the morphological analysis. Let us assume that the 3 words/phrases obtained as a result of the morphological analysis are "Tokaidou", "Mitsuya" and "Ghost-story". In this case, the group of words can be "Tokaidou Mitsuya", "Tokaidou Ghost-story" or "Mitsuya Ghost-story".

Then, at the next step S64, the program-vector generation section 23 determines whether or not the corresponding group ID has been extracted from the data storage section 24.

If the determination result produced in the process carried out at the step S64 indicates that the corresponding group ID was not extracted from the data storage section 24, the flow of the processing goes on to a step S65 at which the program-vector generation section 23 associates a new group ID with the extracted word (or the extracted phrase/word group including a plurality of words). This is because no corresponding group ID has been stored in the data storage section 24 and associated with the extracted word (or the extracted phrase/word group including a plurality of words). Then, the program-vector generation section 23 stores the word (or the phrase/word group including a plurality of words) in the data storage section 24 along with the associated group ID in the data storage section 24.

If the determination result produced in the process carried out at the step S64 indicates that the corresponding group ID has been extracted from the data storage section 24, on the other hand, the flow of the processing goes on to a step S66. The flow of the processing also goes on to the step S66 after completing the process carried out at the step S65. At the step S66, the program-vector generation section 23 determines whether or not a group ID has been extracted for each of the words (or each of the word groups) composing the title.

If the determination result produced in the process carried out at the step S66 indicates that a group ID has not been extracted for each of the words (or each of the word groups) composing the title, the flow of the processing goes back to the step S63 to again carry out the processes of the step S63 and the subsequent steps.

If the determination result produced in the process carried out at the step S66 indicates that a group ID has been extracted for each of the words (or each of the word groups) composing the title, on the other hand, the flow of the processing goes on to the step S67 at which the program-vector generation section 23 associates the extracted group IDs with the program vector PP. Finally, the execution of the processing is ended.

By carrying out the processing described above, group IDs for words (or word groups) composing a title are associated with a program vector PP corresponding to the title. The data transmission section 25 then transmits the group ID and the title to the TV reception apparatus 4 or the EPG reception apparatus 9 by way of the network 8.

In addition, programs having similar titles can be included in the same group. For example, a serial drama with a title of "Ginpachi, Second-Grade A Class Teacher" can be put in the same group as a special program with a title of "Ginpachi Special, Second-Grade A Class Teacher" by computing a degree of similarity between the program titles appearing in a predetermined period such as 2 weeks, 1 month or half a year through comparison of program-title words obtained as a result of morphological analyses carried out on the words composing the program titles. The serial drama and the special program are put in the same group only if the computed degree of similarity is at least equal to a predetermined value.

Figure 10:
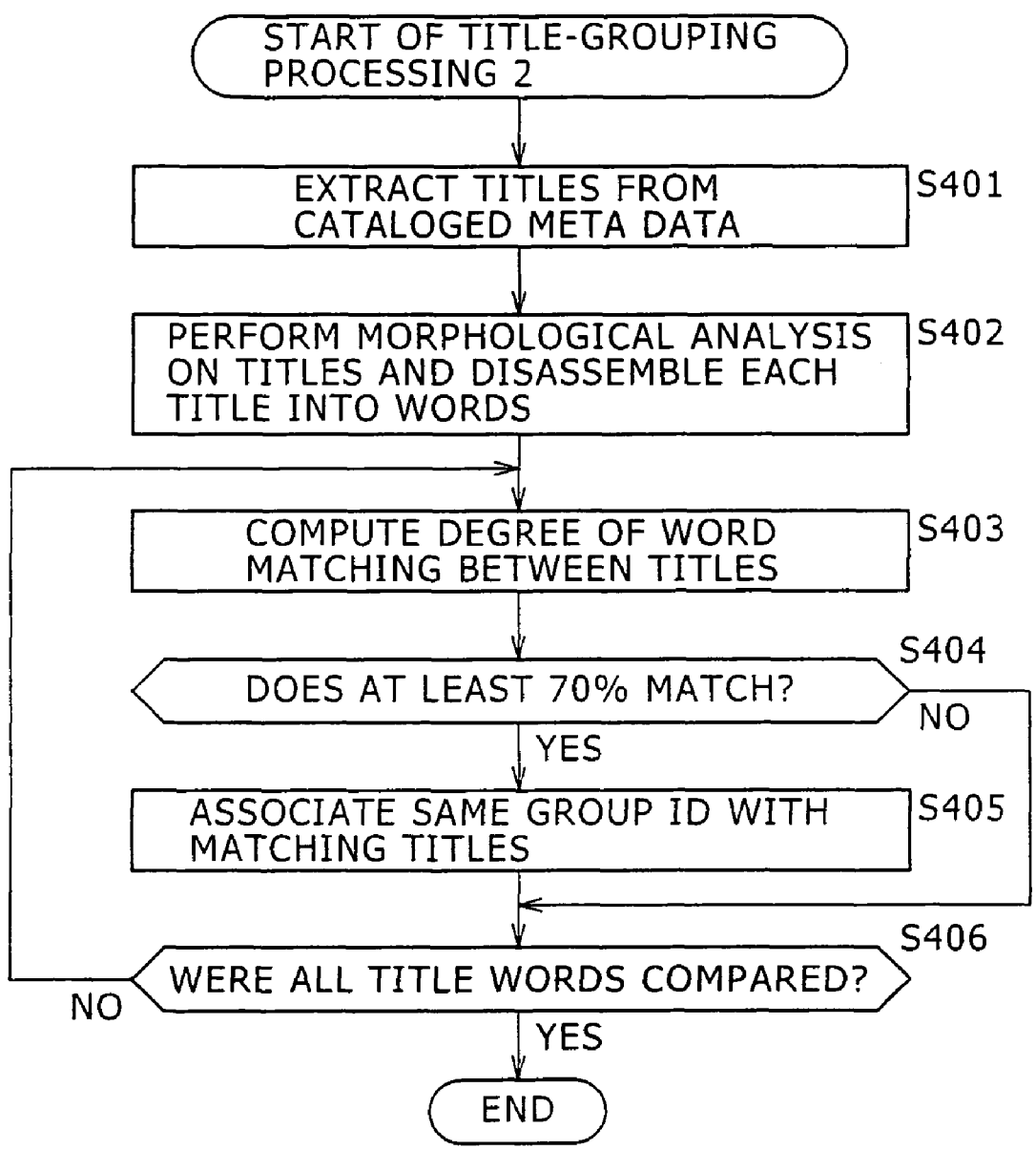
FIG. 10 shows a flowchart referred to in explanation of title-grouping processing 2.

By referring to a flowchart shown in FIG. 10, the following description explains title-grouping processing 2 for grouping titles on the basis of a degree of matching between words composing one of the titles and words composing the other title.

Processes carried out at steps S401 and S402 are the same as the processes carried out respectively at the steps S61 and S62 of the flowchart of explained earlier by referring to FIG. 9. That is to say, the data acquisition section 21 extracts titles from cataloged meta data resulting from reference to EPG data stored in the meta-data database 7 and submits the titles to the program-vector generation section 23. Then, the program-vector generation section 23 performs a morphological analysis on each of the titles and disassembles each of the titles into words.

Subsequently, at the next step S403, the program-vector generation section 23 computes the degree of matching between words resulting from the morphological analyses as words of the titles. That is to say, the program-vector generation section 23 finds a matching rate representing a rate at which words of one of the titles match words of the other title.

To put it concretely, let us assume the title of "Ginpachi, Second-Grade A Class Teacher" and the title of "Ginpachi Special, Second-Grade A Class Teacher" as examples. The of "Ginpachi, Second-Grade A Class Teacher" is disassembled into the following words: "Ginpachi", "Second", "Grade", "A", "Class", and "Teacher". On the other hand, the title of "Ginpachi Special, Second-Grade A Class Teacher" is disassembled into the following words: "Ginpachi", "Special", "Second", "Grade", "A", "Class", and "Teacher". Then, the words of "Ginpachi", "Second", "Grade", "A", "Class", and "Teacher" as well as the words of "Ginpachi", "Special", "Second", "Grade", "A", "Class", and "Teacher" are subjected to morphological analyses to produce a matching rate of 6/7 or 85.7%.

Subsequently, at the next step S404, the program-vector generation section 23 determines whether or not the matching rate of the words is at least equal to a predetermined value such as 70%. It is needless to say that the threshold value of the matching rate can be a value other than 70%.

If the determination result produced in the process carried out at the step S404 indicates that the matching rate of the words is at least equal to a predetermined value such as 70%, the flow of the processing goes on to a step S405 at which the program-vector generation section 23 associates the same group ID with these programs. Then, the program-vector generation section 23 stores the matching words or the matching word groups along with the group ID in the data storage section 24.

If the determination result produced in the process carried out at the step S404 indicates that the matching rate of the words is smaller than the predetermined value such as 70%, on the other hand, the flow of the processing goes on to a step S406. The flow of the processing also goes on to the step S406 after the process carried out at the step S405 is completed. At the step S406, the program-vector generation section 23 determines whether or not all words of one of the titles have been compared with all words of the other title.

If the determination result produced in the process carried out at the step S406 indicates that all words of one of the titles have not been compared with all words of the other title, the flow of the processing goes back to the step S403 to again carry out the process of this step and the processes of the subsequent steps.

If the determination result produced in the process carried out at the step S406 indicates that all words of one of the titles have been compared with all words of the other title, on the other hand, the execution of the processing is ended.

By carrying out the processing described above, a group ID based on the matching rate of words composing titles is associated with a program vector PP for a program having the title. Then, the data transmission section 25 transmits the group IDs and the title to the TV reception apparatus 4 or the EPG reception apparatus 9 by way of the network 8. Thus, programs having similar titles can be put in the same group. Examples of the programs having similar titles are a serial drama and a special program as described above.

In addition, by creating a group based on the matching rate of words composing titles, programs having the same title can be detected as programs of the same group in spite of the fact that, for example, an EPG or meta data includes symbol appearance differences caused by half-size and full-size numbers, half-size and full-size characters or lowercase and uppercase characters.

Furthermore, besides the matching rate of words, for example, a broadcasting station, a program genre or a broadcasting start time can be added to the grouping condition. Let us take a news program having a title of "News" as an example. Since the title has only few words including "News", it is feared that news programs of different broadcasting stations and different forms are detected as programs pertaining to the same group in the processing explained above by referring to the flowchart shown in FIG. 10. Thus, in order to solve this problem, only programs broadcasted by the same broadcasting station as programs satisfying the matching rate of words may be put in the same group.

Figure 11:
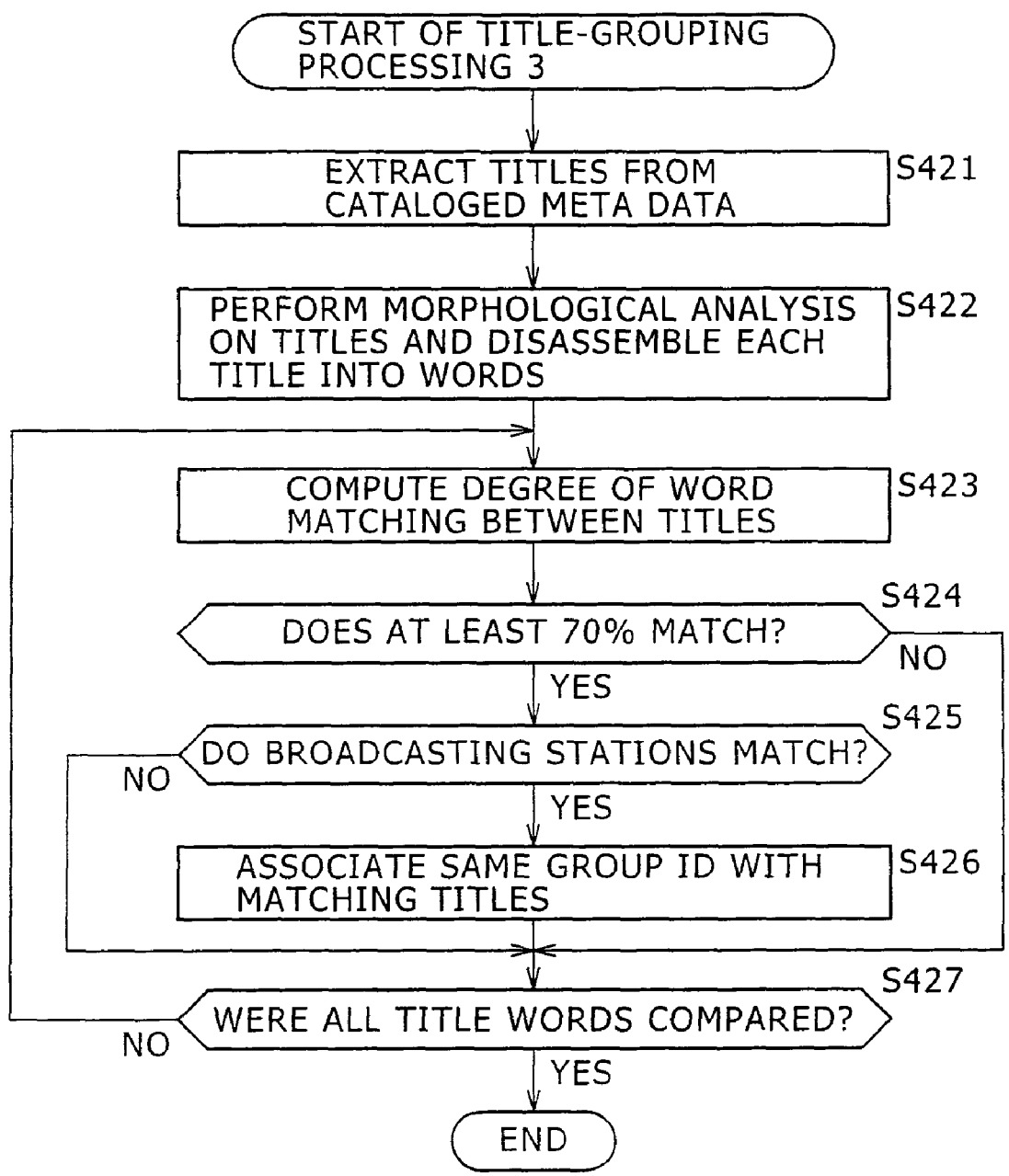
FIG. 11 shows a flowchart referred to in explanation of title-grouping processing 3.

By referring to a flowchart shown in FIG. 11, the following description explains title-grouping processing 3 for grouping titles on the basis of an additional condition requiring the same broadcasting station besides a degree of matching between words composing one of the titles and words composing the other title.

Processes carried out at steps S421 to S424 are the same as the processes carried out at respectively the steps S401 to S404 of the flowchart explained above by referring to FIG. 10. That is to say, the data acquisition section 21 extracts titles from cataloged meta data resulting from reference to EPG data stored in the meta-data database 7 and submits the titles to the program-vector generation section 23. Then, the program-vector generation section 23 performs a morphological analysis on each of the titles and disassembles each of the titles into words. Subsequently, the program-vector generation section 23 computes the degree of matching between words resulting from the morphological analyses as words of the titles. That is to say, the program-vector generation section 23 finds a matching rate representing a rate at which words of one of the titles match words of the other title. Subsequently, the program-vector generation section 23 determines whether or not the matching rate of the words is at least equal to a predetermined value such as 70%.

If the determination result produced in the process carried out at the step S424 indicates that the matching rate of the words is at least equal to a predetermined value such as 70%, the flow of the processing goes on to a step S425 at which the program-vector generation section 23 determines whether or not the programs having the titles are broadcasted by the same broadcasting station.

If the determination result produced in the process carried out at the step S425 indicates that the programs having the titles are broadcasted by the same broadcasting station, the flow of the processing goes on to a step S426 at which the program-vector generation section 23 associates the programs with the same group ID. Then, the program-vector generation section 23 stores the matching words or the matching word groups along with the group ID and the broadcasting station in the data storage section 24.

If the determination result produced in the process carried out at the step S424 indicates that the matching rate of the words is smaller than the predetermined value such as 70% or the determination result produced in the process carried out at the step S425 indicates that the programs having the titles are not broadcasted by the same broadcasting station, on the other hand, the flow of the processing goes on to a step S427. The flow of the processing also goes on to the step S427 after the process carried out at the step S426 is completed. At the step S427, the program-vector generation section 23 determines whether or not all words of one of the titles have been compared with all words of the other title.

If the determination result produced in the process carried out at the step S427 indicates that all words of one of the titles have not been compared with all words of the other title, the flow of the processing goes back to the step S423 to again carry out the process of this step and the processes of the subsequent steps.

If the determination result produced in the process carried out at the step S427 indicates that all words of one of the titles have been compared with all words of the other title, on the other hand, the execution of the processing is ended.

By carrying out the processing described above, a group ID based on the matching rate of words composing titles and based on the fact that the programs having the titles are broadcasted by the same broadcasting station is associated with a program vector for a program having the title. Then, the data transmission section 25 transmits the group IDs and the title to the TV reception apparatus 4 or the EPG reception apparatus 9 by way of the network 8. Thus, in the processing to put programs having similar titles in the same group, programs broadcasted by different broadcasting stations are prevented from being put in the same group. Examples of the programs provided with similar titles but broadcasted by different broadcasting stations are news programs as described above.

In the processing explained above by referring to the flowchart shown in FIG. 11, an additional condition requires that the programs shall be programs broadcasted by the same broadcasting station besides the condition requiring that the matching rate of words composing the titles shall be at least equal to a predetermined value. It is to be noted, however, that besides the broadcasting station, for example, the broadcasting time band and the genre can of course be included as a condition for grouping titles of programs in addition to the condition requiring that the matching rate of words composing the titles shall be at least equal to a predetermined value.

In addition, even if the broadcasting start time of a serial drama or an across-the-board program is delayed due to a sport live coverage or a special program, programs can be grouped by determining whether or not the broadcasting start times of the programs are within a predetermined time range such as 1 hour as a condition for putting the programs in the same group in addition to the condition requiring that the matching rate of words composing the titles of the programs shall be at least equal to a predetermined value.

Figure 12:
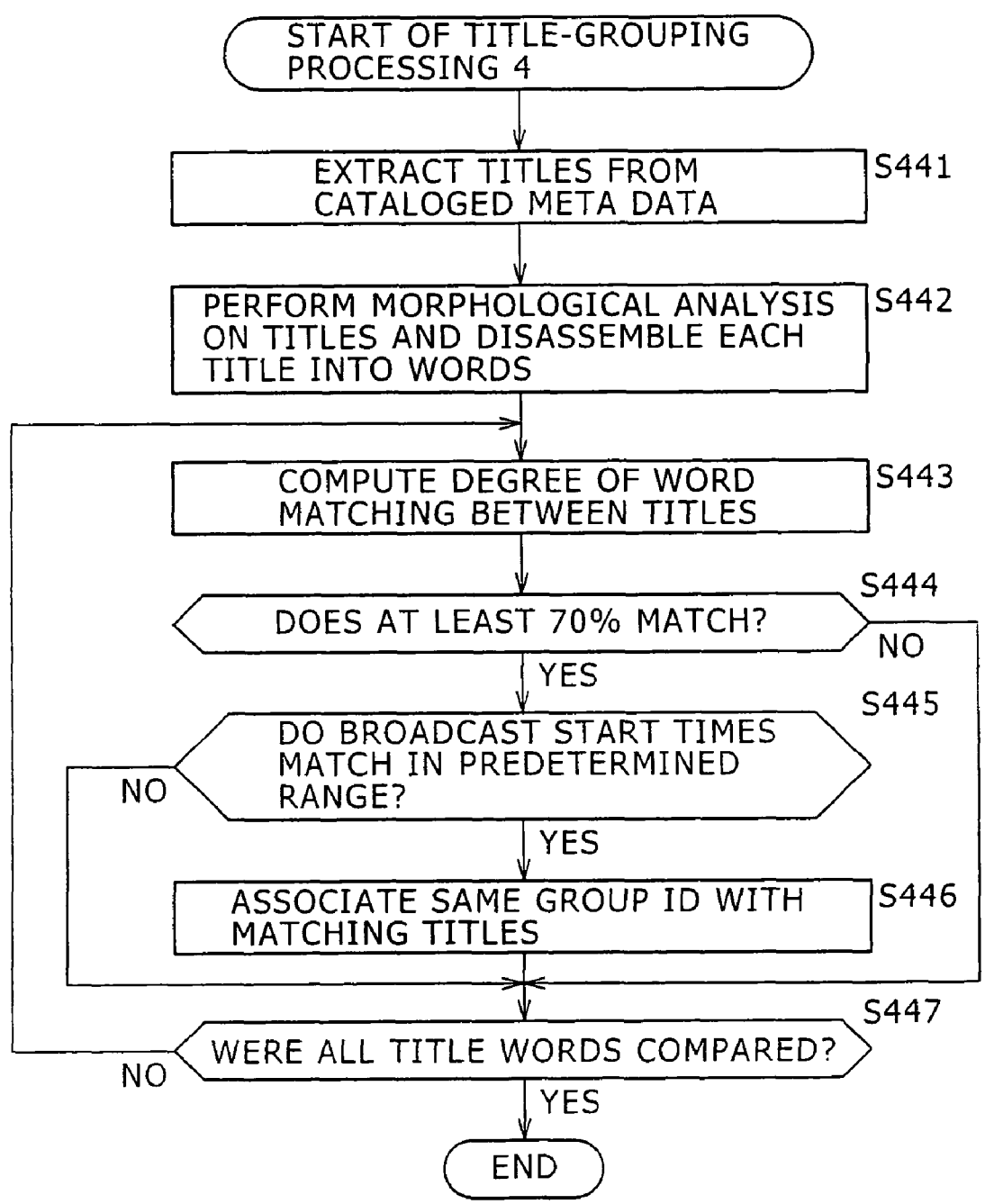
FIG. 12 shows a flowchart referred to in explanation of title-grouping processing 4.

By referring to a flowchart shown in FIG. 12, the following description explains title-grouping processing 4 for grouping titles of programs on the basis of a result of determination as to whether or not the broadcasting start times of the programs are within a predetermined time range besides a degree of matching between words composing one of the titles of the programs and words composing the other title.

Processes carried out at steps S441 to S444 are the same as the processes carried out at respectively the steps S401 to S404 of the flowchart explained above by referring to FIG. 10. That is to say, the data acquisition section 21 extracts titles from cataloged meta data resulting from reference to EPG data stored in the meta-data database 7 and submits the titles to the program-vector generation section 23. Then, the program-vector generation section 23 performs a morphological analysis on each of the titles and disassembles each of the titles into words. Subsequently, the program-vector generation section 23 computes the degree of matching between words resulting from the morphological analyses as words of the titles. That is to say, the program-vector generation section 23 finds a matching rate representing a rate at which words of one of the titles match words of the other title. Subsequently, the program-vector generation section 23 determines whether or not the matching rate of the words is at least equal to a predetermined value such as 70%.

If the determination result produced in the process carried out at the step S444 indicates that the matching rate of the words is at least equal to a predetermined value such as 70%, the flow of the processing goes on to a step S445 at which the program-vector generation section 23 determines whether or not the broadcasting start times of the programs having the titles are shifted from each other within a predetermined time range such as 1 hour.

If the determination result produced in the process carried out at the step S445 indicates that the broadcasting start times of the programs having the titles are shifted from each other within a predetermined time range, the flow of the processing goes on to a step S446 at which the program-vector generation section 23 associates the programs with the same group ID. Then, the program-vector generation section 23 stores the matching words or the matching word groups along with the group ID and the range of the broadcasting start times in the data storage section 24.

If the determination result produced in the process carried out at the step S444 indicates that the matching rate of the words is smaller than the predetermined value such as 70% or the determination result produced in the process carried out at the step S445 indicates that the broadcasting start times of the programs having the titles are shifted from each other not within a predetermined time range, on the other hand, the flow of the processing goes on to a step S447. The flow of the processing also goes on to the step S447 after the process carried out at the step S446 is completed. At the step S447, the program-vector generation section 23 determines whether or not all words of one of the titles have been compared with all words of the other title.

If the determination result produced in the process carried out at the step S447 indicates that all words of one of the titles have not been compared with all words of the other title, the flow of the processing goes back to the step S443 to again carry out the process of this step and the processes of the subsequent steps.

If the determination result produced in the process carried out at the step S447 indicates that all words of one of the titles have been compared with all words of the other title, on the other hand, the execution of the processing is ended.

By carrying out the processing described above, a group ID based on the matching rate of words composing titles and based on the fact that the broadcasting start times of programs having the titles are shifted from each other within a predetermined time range is associated with a program vector for a program having the title. Then, the data transmission section 25 transmits the group IDs and the title to the TV reception apparatus 4 or the EPG reception apparatus 9 by way of the network 8. Thus, in the processing to put programs having similar titles in the same group on the basis of a result of determination as to whether or not the broadcasting start times of the programs are within a predetermined time range besides a degree of matching between words composing one of the titles of the programs and words composing the other title, programs having broadcasting start times shifted from each other within a predetermined time range are detected as programs pertaining to the same group. It is thus possible to prevent programs having broadcasting start times shifted from each other by a special program or the like within a predetermined time range from being undetected as programs pertaining to the same group.

Figure 13:
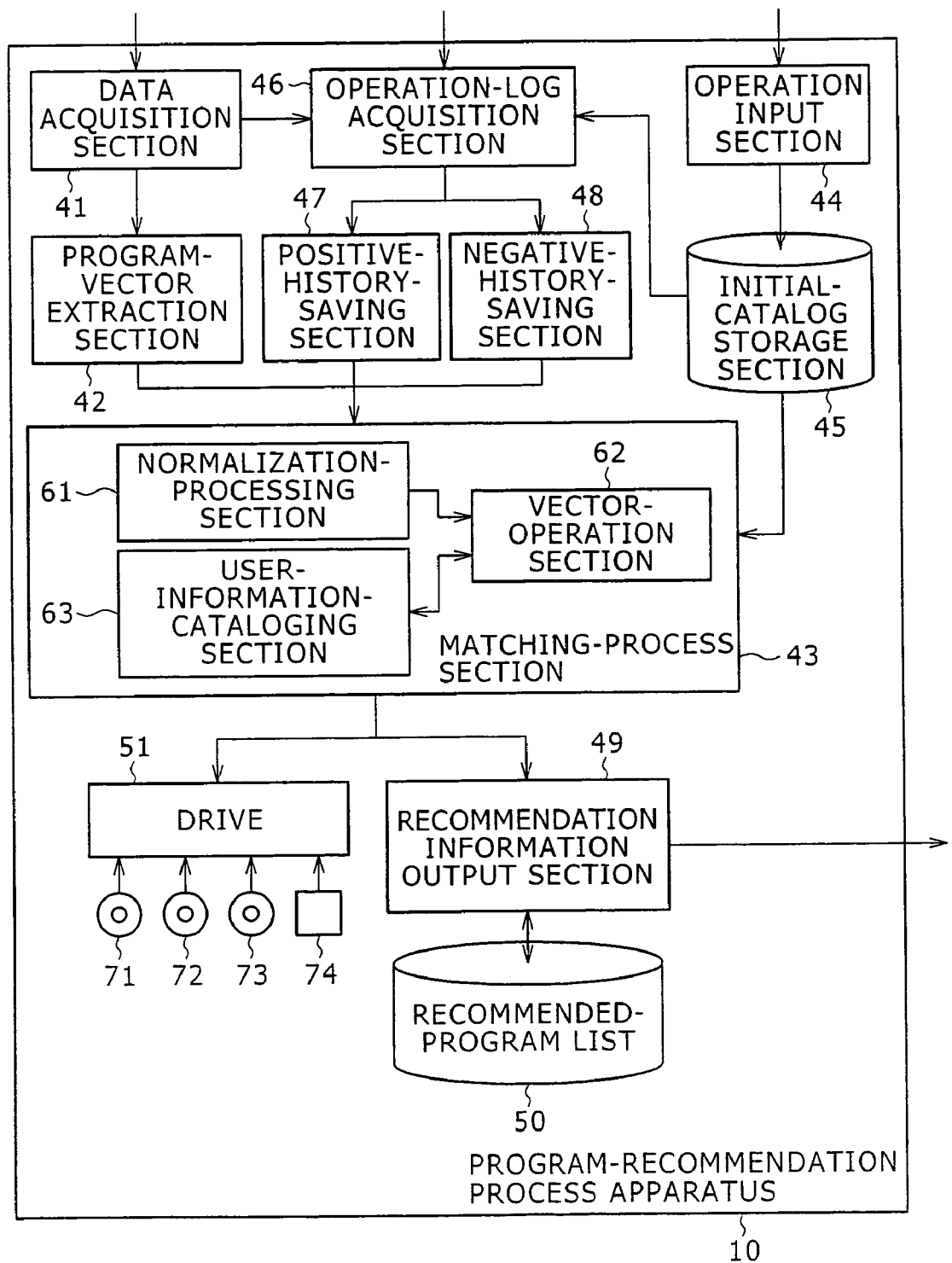
FIG. 13 is a block diagram showing the configuration of a program-recommendation process apparatus shown in FIG. 1.

FIG. 13 is a block diagram showing the configuration of the program-recommendation process apparatus 10.

A data acquisition section 41 is a component for receiving program vectors PP from the distribution server 5 and program-side effect vectors EfPP transmitted along with the program vectors PP. A program-vector extraction section 42 is a component for extracting a program vector PP necessary for the matching process or necessary for creation of a user model from the program vectors PP received by the distribution server 5. If necessary, the program-vector extraction section 42 supplies the extracted program to the matching-process section 43 along with the program-side effect vector EfPP corresponding to the extracted program vector PP.

An operation input section 44 typically includes input devices such as a keyboard, a touch pad and a mouse. The operation input section 44 is a component for receiving initially cataloged information entered by the user as well as an input topic for generating a user model and supplying the information and the input topic to an initial-catalog storage section 45. The initial-catalog storage section 45 is a component for cataloging the initially cataloged information received from the operation input section 44 and the topic also received from the operation input section 44 as a topic used for generating a user model. If necessary, the initial-catalog storage section 45 supplies the initially cataloged information and the topic to an operation-log acquisition section 46 or the matching-process section 43. The data stored in the initial-catalog storage section 45 is updated from time to time on the basis of operations entered by the user via the operation input section 44. The initially cataloged information typically includes information revealing programs disliked by the user as well as information revealing programs liked by the user. Examples of the information revealing programs disliked by the user are a disliked genre, a disliked keyword and a disliked performer. On the other hand, examples of the information revealing programs preferred by the user are a favorite genre, a favorite keyword and a favorite performer.

An operation-log acquisition section 46 is a component for acquiring an operation log from the TV display apparatus 11 or the recording/reproduction apparatus 12 and classifying information of the operation log into a positive history and a negative history. If necessary, the operation-log acquisition section 46 refers to information stored in the initial-catalog storage section 45 to extract program vectors PP corresponding to the positive and negative histories from program vectors PP acquired by the data acquisition section 41, supplying the positive and negative histories corresponding to the extracted program vectors PP to a positive-history-saving section 47 and a negative-history-saving section 48 respectively. The positive-history-saving section 47 saves an event of the positive history supplied thereto and generates a positive-history vector UP. By the same token, the negative-history-saving section 48 saves an event of the negative history supplied thereto and generates a negative-history vector MUP. The generated positive-history vector UP and the generated negative-history vector MUP are supplied to the matching-process section 43.

The positive history cited above is information for extracting a program, which the user wants to view eagerly or, in other words, a program considered to be a favorite one. When the user views and records a program or, to be more specific, when the user accepts a program proposed to the user from a list of recommended programs in processing to be described later, and views as well as records the accepted program, meta data of the program is stored in the positive-history-saving section 47 as well impressive meta data. The positive-history-saving section 47 finds a sum of positive histories for each detailed item or each large item to generate a positive-history vector UP.

On the other hand, the negative history cited above is information for excluding an undesirable program from recommended ones. The undesirable program is a program that the user hardly wants to view. When the user does not view and record an undesirable program, meta data of the program is stored in the negative-history-saving section 48 as unimpressive meta data. Examples of an undesirable program are a program corresponding to a disliked item specified in the initially recorded information, a program deleted without being viewed after recording and a program proposed to the user from a list of recommended programs in processing to be described later but not accepted by the user. Let us assume that the user specifies sport as a disliked item in the initially recorded information. In this case, genre Gmup={0, 0, 5, 0, 0, 0, 0, 0, 0} including a weight of 5 for the sport as a negative impression is saved in the negative-history-saving section 48 as additional information. By the same token, the negative-history-saving section 48 finds a sum of negative histories for each detailed item or each large item to generate a negative-history vector MUP.

The matching-process section 43 authenticates matching between a program vector PP extracted from the program-vector extraction section 42 and a positive-history vector UP received from the positive-history-saving section 47 or between the program vector PP and a negative-history vector MUP received from the negative-history-saving section 48.

A program vector PP, a positive-history vector UP and a negative-history vector MUP can each be a vector having a format including all detailed-item components aligned to form 1 array. In this case, since information such as a title or a keyword has a plurality of words, in the vector, each word has a weight equal to an item such as the genre. In order to solve this problem, a normalization-processing section 61 employed in the matching-process section 43 normalizes a title used as an item composed of words and the words composing the title by dividing the frequency of each word by the number of words composing the title for each program. Let us assume title Tm={Toukaidou-1, Mitsuya-1, ghost-story-1} as an example. In this case, the title is normalized into Tm={Toukaidou:0.33, Mitsuya:0.33, ghost-story:0.33}. In this way, for a title used as an item composed of words and the words composing the title, a sum of normalized frequencies for the words composing the title is used as a weight and since the sum is 1, no problem is raised in the matching process.

A vector-operation section 62 is a component for carrying out a matching process for determining matching between a program vector PP and a positive-history vector UP as well as between a program vector PP and a negative-history vector MUP.

If the program vector PP, the positive-history vector UP and the negative-history vector MUP are each a vector having a format including all detailed-item components aligned to form 1 array, the vector-operation section 62 finds a degree of similarity SimUP between the program vector PP and the positive-history vector UP as well as a degree of similarity SimMUP between the program vector PP and the negative-history vector MUP. The degree of similarity SimUP and the degree of similarity SimMUP are each expressed in terms of a cosine distance $\cos \theta$. $\cos \theta u$ representing the degree of similarity SimUP is computed in accordance with Eq. (1) given below whereas $\cos \theta m$ representing the degree of similarity SimMUP is computed in accordance with Eq. (2) also given below. As is obvious from Eqs. (1) and (2), a cosine distance is computed by dividing as an inner product of the 2 vectors by a product of absolute values of the vectors.

$$\mathrm{Sim}UP = \cos \theta u = UP \cdot PP / |UP| \times |PP| \quad (1)$$

$$\mathrm{Sim}MUP = \cos \theta m = MUP \cdot PP / |MUP| \times |PP| \quad (2)$$

In above Eqs. (1) and (2), notations PP, UP and MUP denote the program vector PP, the positive-history vector UP and the negative-history vector MUP respectively. In addition, notation "·" denotes an operator for finding an inner product of vectors on both sides of the operator. On the other hand, notation "×" denotes an operator for finding a scalar product of absolute values of vectors on both sides of the operator.

In addition, if the program vector PP, the positive-history vector UP and the negative-history vector MUP are each a vector obtained as a result of a victorization process carried out for every large item, the vector-operation section 62 may find a degree of similarity between the program vector PP and the positive-history vector UP as well as a degree of similarity between the program vector PP and the negative-history vector MUP for every large item and compute a sum of the degrees of similarity found for all large items as each of the degree of similarity SimUP and the degree of similarity SimMUP.

Let us assume for example that, for a title disassembled into words and used as a large item, the supplied positive-history vector UP represents a title of Tup={school-1, ghost-story-1, toilet-1} whereas the supplied program vector PP represents a title of Tm={Toukaidou-1, Mitsuya-1, ghost-story-1}. Also let us assume that the length of a unit vector is 1. In this case, the length (the absolute value) of a vector is a square root of the sum of squares of components, and a positive cosine distance representing the degree of similarity between the two titles is computed in accordance with Eq. (3) as follows:

$$\cos \theta t = 1 \cdot 1 / \sqrt{3} \times \sqrt{3} = 1/3 \quad (3)$$

In Eq. (3), notation "·" denotes an operator for finding an inner product of vectors on both sides of the operator whereas notation "×" denotes an operator for finding a scalar product of absolute values of vectors on both sides of the operator.

By the same token, a negative cosine distance representing the degree of similarity between two titles represented by the program vector PP and the negative-history vector MUP can be found for the titles each serving as a large item in a way similar to Eq. (3).

Now, let us assume for example that the positive-history vector UP is compound positive-history vector UP={Title Tup, Genre Gup, Performer Pup, Scriptwriter/author/producer Aup, Contents (keyword) Kup} and the negative-history vector MUP is compound negative-history vector MUP={Title Tmup, Genre Gmup, Performer Pmup, Scriptwriter/author/producer Amup, Contents (keyword) Kmup}. In this case, for each of the title, the genre, the performer, the scriptwriter/author/producer and the contents, which each serve as a large item, a positive cosine distance and a negative cosine distance are found in the same way in accordance with Eq. (3). Since a positive cosine distance and a negative cosine distance are found for every large item, the degree of similarity SimUP and the degree of similarity SimMUP are each computed in accordance with Eq. (4) as follows:

$$\mathrm{Sim} = \cos \theta_t + \cos \theta_g + \cos \theta_p + \cos \theta_a + \cos \theta_k \quad (4)$$

In the above equation, $\cos \theta_t$ is a cosine distance between the program vector PP and the positive-history vector UP or between the program vector PP and the negative-history vector MUP for the title large item. $\cos \theta_g$ is a cosine distance between the program vector PP and the positive-history vector UP or between the program vector PP and the negative-history vector MUP for the genre large item. $\cos \theta_p$ is a cosine distance between the program vector PP and the positive-history vector UP or between the program vector PP and the negative-history vector MUP for the performer large item. $\cos \theta_a$ is a cosine distance between the program vector PP and the positive-history vector UP or between the program vector PP and the negative-history vector MUP for the scriptwriter/author/producer large item. $\cos \theta_k$ is a cosine distance between the program vector PP and the positive-history vector UP or between the program vector PP and the negative-history vector MUP for the contents (keyword) large item.

If the degree of similarity SimUP and the degree of similarity SimMUP are each computed as a sum of cosine distances found for all large items as is obvious from the above equation, biases in weights between items are eliminated. Thus, the above computation adopts the same principle as the normalization described earlier. As a result, unlike the program vector PP, the positive-history vector UP and the negative-history vector MUP each having a format including all detailed-item components aligned to form 1 array, the normalization processing to be carried out by the normalization-processing section 61 can be omitted.

That is to say, if the program vector PP, the positive-history vector UP and the negative-history vector MUP each having a format including all detailed-item components aligned to form 1 array are used without carrying out the normalization processing, in items such as the title and the contents, as the number of history events increases, the number of different words rises but the frequency of each of the different words hardly increases in comparison with items having components prone to overlapping. Examples of the items having components prone to overlapping are the broadcasting station and the genre.

For this reason, if the degree of similarity SimUP and the degree of similarity SimMUP are each computed as a sum of cosine distances found for all components, the effect of each of typically the items each having components prone to overlapping becomes greater. Examples of the item having components prone to overlapping as is the broadcasting station and genre items as described above. Let us assume for example that the user is a fan of commentator A and the user thus enjoys viewing "a live coverage of a baseball game by team B with comments made by commentator A". In this case, information of "a live coverage of a baseball game" serving as a genre item is prone to overlapping as a history. On the other hand, information of "commentator A" serving as a performer item hardly overlaps as a history. Thus, in some cases, a live coverage of a baseball game by team B with comments made by another commentator is recommended but a variety program presenting commentator A is not.

If the normalization processing is carried out or the degree of similarity SimUP and the degree of similarity SimMUP are each computed as a sum of cosine distances found for all large items, a variety program in which commentator A participates can be recommended without being affected by the magnitude of a history frequency. It is thus possible to reflect a favorite of the user in a recommended program with a high degree of accuracy.

In addition, the vector-operation section 62 is also capable of applying weights on the basis of a program-side effect vector EfPP transmitted along with a program vector PP and initially cataloged information stored in the initial-catalog storage section 45 by the user or on the basis of a user-side effect vector EfUP generated and cataloged in a user-information-cataloging section 63 as will be described later or a user-side negative-effect vector EfMUP to be described later in order to compute the degree of similarity SimUP and the degree of similarity SimMUP.

Then, on the basis of the degree of similarity SimUP computed by adoption of a method like the one described above, the vector-operation section 62 further computes the degree of similarity SimMUP to the negative-history vector MUP for a predetermined number of programs each having a high degree of similarity SimUp to the positive-history vector UP starting with a program having the highest-degree of similarity. Typically, the predetermined number of such programs is set at 10. Then, the vector-operation section 62 finds differences (SimUp−SimMUP) and determines a predetermined number of programs each having a large difference (SimUp−SimMUP), starting with a program having the largest difference (SimUp−SimMUP). Finally, the vector-operation section 62 supplies each of the determined programs to the recommendation information output section 49 as a recommended program. Typically, the predetermined number of programs each determined as a recommended program is set at 3.

In addition, if program vectors PP have been grouped, the vector-operation section 62 catalogs a group recommended at the first priority in a user-information-cataloging section 63 on the basis of information on recommended programs and recommends each of programs for the group recommended at the first priority as a program group recommended at the first priority.

On the top of that, the vector-operation section 62 is capable of carrying out a filtering process on program vectors PP by using a topic stored in the initial-catalog storage section 45 to generate a user-model vector and cataloging the generated user-model vector in the user-information-cataloging section 63 so as to perform a matching process. A user model will be described later in detail.

On the basis of information received from the initial-catalog storage section 45 as information initially cataloged by the user in the initial-catalog storage section 45, a positive-history vector UP received from the positive-history-saving section 47 or a negative-history vector MUP received from the negative-history-saving section 48, the user-information-cataloging section 63 generates a user-side effect vector EfUP and a user-side negative-effect vector EfMUP, saving the user-side effect vector EfUP and the user-side negative-effect vector EfMUP. A user-side effect vector EfUP for a program vector PP is a vector placing weights on components of the program vector PP. The weighted components of the program vector PP are each a large item of importance to selection of a program to be recommended to the user. Only weighted items of the program vector PP are used in selection of a program. As an alternative, a user-side effect vector EfUP is a vector revealing favorites of the user for each item. On the other hand, a user-side negative-effect vector EfMUP for a program vector PP is a vector placing weights on components of the program vector PP. However, the weighted components of the program vector PP are each a large item of no importance to selection of a program to be recommended to the user. Only unweighted items of the program vector PP are used in selection of a program. As an alternative, a user-side negative-effect vector EfMUP is a vector revealing dislikes of the user for each item.

In other words, the user-side effect vector EfUP of a program vector PP is a vector prescribing how much contribution each item of the user-side effect vector EfUP contributes has to matching in a matching process between the program vector PP and a positive-history vector UP. On the other hand, the user-side negative-effect vector EfMUP of a program vector PP is a vector prescribing how much contribution each item of the user-side negative-effect vector EfMUP contributes has to mismatching in a matching process between the program vector PP and a negative-history vector MUP.

The user-side effect vector EfUP and the user-side negative-effect vector EfMUP can be each set by the user or set at a value determined in advance. As an alternative, the user-side effect vector EfUP and the user-side negative-effect vector EfMUP can also be generated on the basis of information cataloged initially by the user in the initial-catalog storage section 45.

To put it concretely, let us assume that a user-side effect vector EfUP for a program vector PP is information showing weights on components of the program vector PP and the weighted components of the program vector PP are each a large item of importance to selection of a program to be recommended to the user. In this case, if the genre is a component of importance to the user, for program vector PP={Title Tm, Genre Gm, Time band Hm, Broadcasting station Sm, Performer Pm, Scriptwriter/author/producer Am, Contents Km}, the user-side effect vector EfUP is set at a typical value of {1, 5, 1, 1, 1, 1, 1}. If the performer and the genre are each a component of importance to the user, on the other hand, the user-side effect vector EfUP is set at a typical value of {1, 3, 1, 1, 5, 1, 1}.

Let us assume that the user-side effect vector EfUP is a vector revealing favorites of the user for each item and the genre large item is Gm={Drama, Variety, Sport, Movie, Music, Child program/Education, General culture/Documentary, News/Report, Others}. In this case, if the general culture/documentary is a program genre preferred by the user, the user-side effect vector EfUP is set at typical genre Gm={0, 0, 0, 0, 0, 0, 5, 0, 0}.

In addition, the user-side effect vector EfUP and the user-side negative-effect vector EfMUP can be each generated on the basis of a positive-history vector UP or a negative-history vector MUP or by counting the number of programs viewed by the user during a fixed period. On the top of that, the user-side effect vector EfUP and the user-side negative-effect vector EfMUP can also be each generated for every genre. Methods for generating the user-side effect vector EfUP and the user-side negative-effect vector EfMUP are explained by referring to flowcharts shown in FIGS. 22 to 27.

Furthermore, if necessary, the user-information-cataloging section 63 saves information generated in processes carried out by the vector-operation section 62. The information generated in processes carried out by the vector-operation section 62 includes a group recommended at the first priority and a user-model vector.

The matching-process section 43 described above is also capable of determining a recommended program on the basis of only for example a positive history by selecting the recommended program from those each having a program vector PP with a high degree of similarity to a positive-history vector UP without carrying out a process to exclude programs considered to be programs disliked by the user. The programs each having a program vector PP with a high degree of similarity to a positive-history vector UP are each a program that the user wants to view eagerly. On the other hand, the programs considered to be programs disliked by the user are each a program that the user is reluctant to view.

A recommendation information output section 49 catalogs information on a recommended program supplied by the matching-process section 43 on a recommended-program list 50 and supplies the information to the TV display apparatus 11 or the recording/reproduction apparatus 12. The recommended-program list 50 has a configuration removable from the program-recommendation process apparatus 10 and is used for storing information of a recommended program supplied by the recommendation information output section 49. By keeping information on a recommended program in the recommended-program list 50, on the basis of history information stored so far, processing such as a process to recommend a program and an automatic recording process can be carried out even if, for example, a different TV reception apparatus 4, a different TV display apparatus 11 or a different recording/reproduction apparatus 12 is used.

In addition, if necessary, the matching-process section 43 is also connected to a drive 51. A magnetic disk 71, an optical disk 72, a magneto-optical disk 73 or a semiconductor memory 74 is mounted on the drive 51. If necessary, the drive 51 exchanges data with the magnetic disk 71, the optical disk 72, the magneto-optical disk 73 or the semiconductor memory 74.

Figure 14:
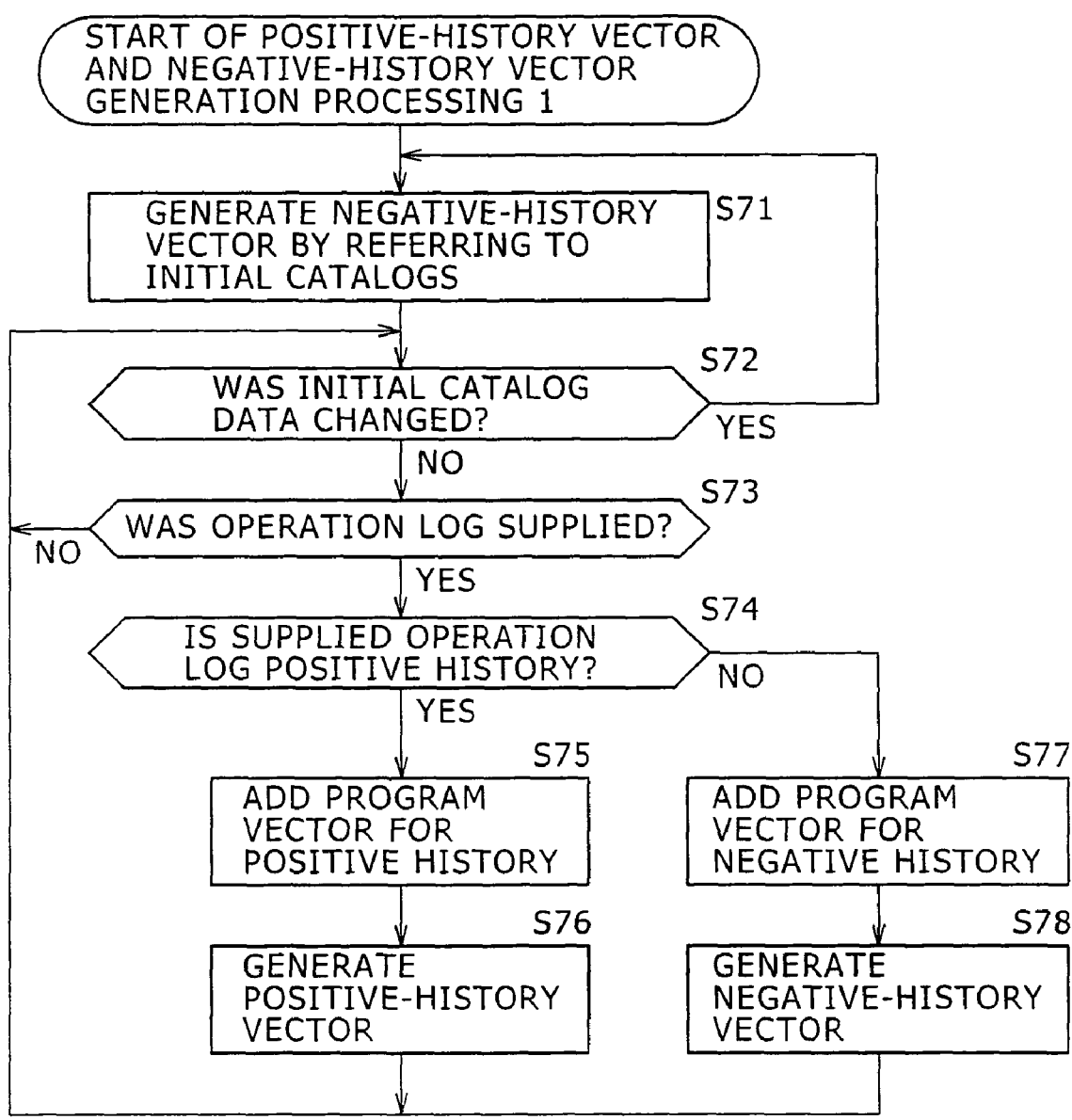
FIG. 14 shows a flowchart referred to in explanation of positive-history vector and negative-history vector generation processing 1.

Positive-history vector and negative-history vector generation processing 1 carried out by the program-recommendation process apparatus 10 to generate positive-history and negative-history vectors is explained by referring to a flowchart shown in FIG. 14 as follows.

First of all, at a step S71, the operation-log acquisition section 46 supplies initially cataloged data read out from the initial-catalog storage section 45 to the negative-history-saving section 48, which then generates a negative-history vector MUP by referring to the initially cataloged data.

Then, at the next step S72, the operation-log acquisition section 46 determines whether or not the initially cataloged data stored in the initial-catalog storage section 45 has been changed. If the determination result produced in the process carried out at the step S72 indicates that the initially cataloged data has been changed, the flow of the processing goes back to the step S71 at which the operation-log acquisition section 46 again carries out the processes of the steps S71 and S72.

If the determination result produced in the process carried out at the step S72 indicates that the initially cataloged data has not been changed, on the other hand, the flow of the processing goes on to a step S73 at which the operation-log acquisition section 46 determines whether or not an operation log has been supplied from the TV display apparatus 11 or the recording/reproduction apparatus 12. If the determination result produced in the process carried out at the step S73 indicates that an operation log has not been supplied from the TV display apparatus 11 or the recording/reproduction apparatus 12, the flow of the processing goes back to the step S72 at which the operation-log acquisition section 46 again carries out the processes of the steps S72 and S73.

If the determination result produced in the process carried out at the step S73 indicates that an operation log has been supplied from the TV display apparatus 11 or the recording/reproduction apparatus 12, on the other hand, the flow of the processing goes on to a step S74 at which the operation-log acquisition section 46 determines whether or not the supplied operation log is a positive history. If the operation log is a recording operation, for example, the program vector PP of a program involved in the operation is a positive-history program vector. If the operation log is an operation to erase recorded data not reproduced yet, on the other hand, the program vector PP of a program involved in the operation is a negative-history program vector.

If the determination result produced in the process carried out at the step S74 indicates that the supplied operation log is a positive history, the flow of the processing goes on to a step S75 at which the operation-log acquisition section 46 extracts the program vector PP of a program involved in the operation log determined to be a positive history from the data acquisition section 41 and supplies the program vector PP to the positive-history-saving section 47. The positive-history-saving section 47 keeps the program vector PP as an additional positive history.

Then, at the next step S76, the positive-history-saving section 47 finds the sum of positive-history program vectors PP for detailed items or for large items to generate a positive-history vector UP. After the process carried out at the step S76 is completed, the flow of the processing goes back to the step S72 to repeat the processes of the step and the subsequent steps.

If the determination result produced in the process carried out at the step S74 indicates that the supplied operation log is not a positive history, that is, if the determination result produced in the process carried out at the step S74 indicates that the supplied operation log is a negative history, on the other hand, the flow of the processing goes on to a step S77 at which the operation-log acquisition section 46 extracts the program vector PP of a program involved in the operation log determined to be a negative history from the data acquisition section 41 and supplies the program vector PP to the negative-history-saving section 48. The negative-history-saving section 48 keeps the program vector PP as an additional positive history.

Then, at the next step S78, the negative-history-saving section 48 finds the sum of negative-history program vectors PP for detailed items or for large items to generate a negative-history vector MUP. After the process carried out at the step S78 is completed, the flow of the processing goes back to the step S72 to repeat the processes of the step and the subsequent steps.

Typically, large items are expressed by a compound positive-history vector UP={Title Tup, Genre Gup, Performer Pup, Scriptwriter/author/producer Aup, Contents (keyword) Kup} and, in each of the large items, detailed items are prescribed. In this case, in each positive-history vector UP expressing a large item, a number representing a vector sum is appended to each of detailed items composing the large item. As shown in FIG. 15, for example, a positive-history vector UP expressing the genre large item is Genre Gup={(Drama-25), (Variety-34), (Sport-42), (Movie-37), (Music-73), (Child program/Education-120), (General culture/Documentary-3), (News/Report-5), (Others-23)} in which a number representing a sum of positive histories is appended to each of detailed items composing the large item.

A vector representing a large item such as the title large item may be expressed in terms of words. For example, a positive-history vector UP expressing the title large item is title Tup={(title1-12), (title2-3), . . . }, in which a number representing a sum of positive histories is appended to each of words composing the large item. Much like the positive-history vector UP, in a negative-history vector MUP, a number representing a sum is appended to each item.

In each of the compound positive-history vector UP shown in FIG. 15 (and, of course, the compound negative-history vector MUP not shown in the figure), the large items serving as the components of the vector are the title, the genre, the performer, the scriptwriter/author/producer and the contents (keyword). The number of large items in this case is smaller than the number of large items composing the program vector PP explained earlier by referring to FIG. 5. It is needless to say, however, that the compound positive-history vector UP and the compound negative-history vector MUP may have the same large items as the program vector PP.

In the processing explained earlier by referring to the flowchart shown in FIG. 14, a negative-history vector MUP is generated on the basis of the initially cataloged data before an operation log is entered. However, information for selecting a favorite program of the user can also be cataloged at the time the data is initially cataloged so that a positive-history vector UP can also be generated before an operation log is entered. In addition, a positive-history vector UP or a negative-history vector MUP can be generated not on the basis of the initially cataloged data, but on the basis of only an operation log.

In this way, a positive-history vector UP and a negative-history vector MUP can be generated and saved independently so that it is possible to carry out a matching process to identify a favorite of the user with a high degree of precision.

It is to be noted that, at that time, a positive history and a negative history can be found with a higher degree of precision. In the processing explained earlier by referring to the flowchart shown in FIG. 14, for example, a positive-history vector UP is generated as a sum of program vectors PP corresponding to positive histories for all items. By the same token, a negative-history vector MUP is generated as a sum of program vectors PP corresponding to negative histories for all items. However, a positive-history vector UP for a genre can also be generated as a sum of program vectors PP corresponding to positive histories for the genre. By the same token, a negative-history vector MUP for a genre can also be generated as a sum of program vectors PP corresponding to negative histories for the genre.

In dependence on the genre of broadcasted programs, there are frequent cases in which only a certain performer not particularly liked by a user appears in the programs so that a favorite of the user may not be reflected correctly in a recommended program. To put it concretely, let us assume a user enjoying a drama and only a variety program presenting comedian A, who does not perform in dramas, as a variety-program performer. Let us also assume that, for such a user, the ratio of the number of times to view variety programs to the number of times to view dramas is for example 2:8. In this case, if positive histories of performer are accumulated without taking the genre into consideration, performer B appearing frequently in dramas has a high point in a positive-history vector UP in comparison with comedian A in some cases in spite of the fact that performer B is not an actor liked by the user. For such cases, a documentary program presenting performer B appearing frequently in dramas is recommended rather than a variety program presenting comedian A. In order to solve this problem, positive histories are accumulated for every genre and a positive-history vector PP is generated for every genre on the basis of the accumulated positive histories. By the same token, negative histories are accumulated for every genre and a negative-history vector MUP is generated for every genre on the basis of the accumulated negative histories.

Let us assume for example that the user is a fan of commentator A and the user thus enjoys viewing "a live coverage of a baseball game by team B with comments made by commentator A". In this case, information of sport serving as a genre item is prone to overlapping as a history. On the other hand, information of "commentator A" serving as a performer item hardly overlaps as a history. Thus, in some cases, a live coverage of a baseball game by team B with comments made another commentator is recommended but a variety program presenting commentator A is not. In order to solve this problem, positive histories are accumulated for every performer and a positive-history vector UP is generated for every performer on the basis of the accumulated positive histories. By the same token, negative histories are accumulated for every performer and a negative-history vector MUP is generated for every performer on the basis of the accumulated negative histories.

By accumulating histories for every specific element as described above, a favorite of the user can be reflected in a recommended program with a higher degree of precision without losing what is truly liked by the user.

Thus, the matching-process section 43 is capable of authenticating matching between a positive-history vector UP and a supplied program vector PP and matching between a negative-history vector MUP and the supplied program vector PP and, hence, capable of generating information on a recommended program correctly reflecting a favorite of the user.

Figure 16:
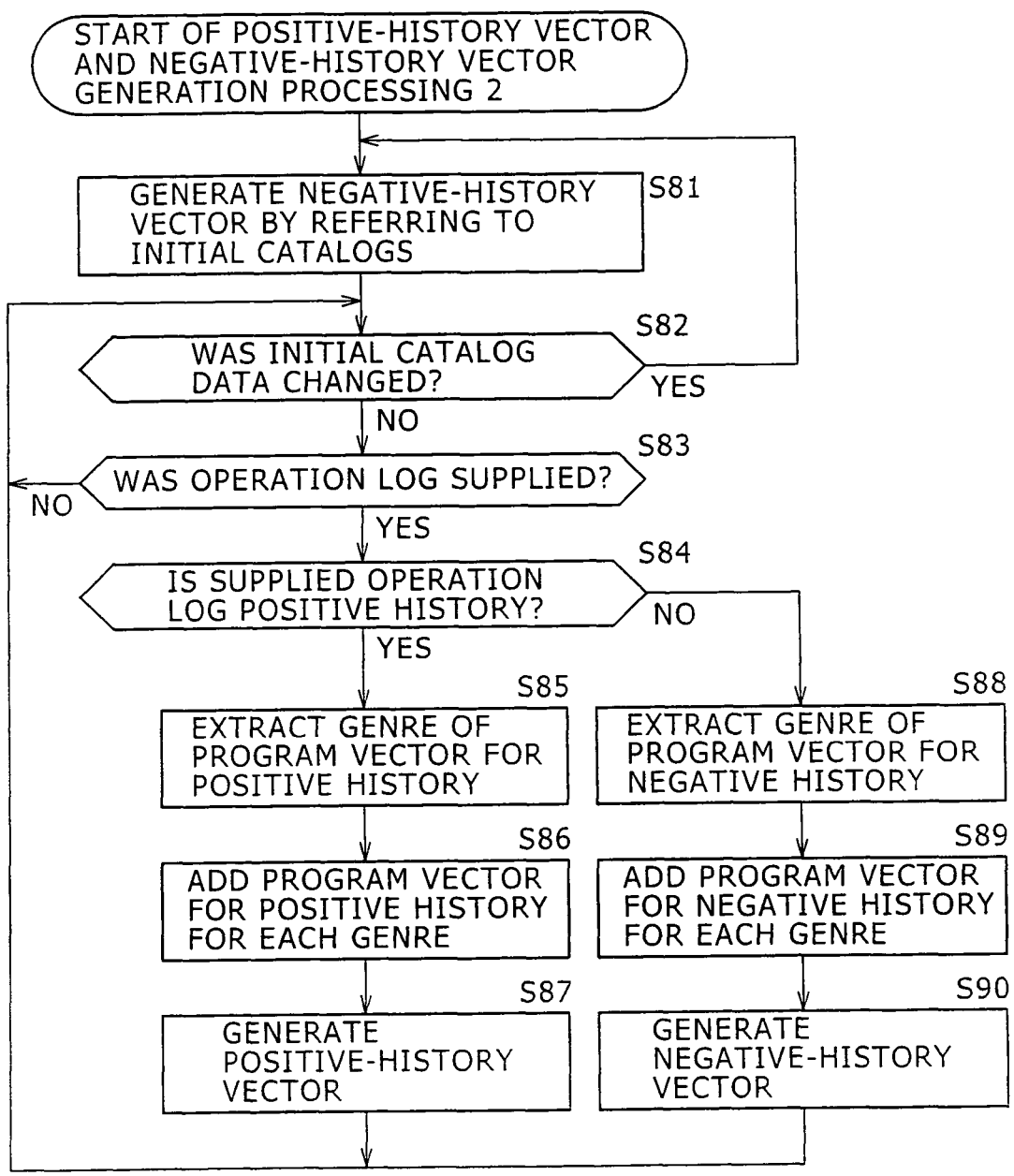
FIG. 16 shows a flowchart referred to in explanation of positive-history vector and negative-history vector generation processing 2.

By referring to a flowchart shown in FIG. 16, positive-history vector and negative-history vector generation processing 2 carried out to generate a positive-history vector UP and a negative-history vector MUP on the basis of histories accumulated for every genre.

Processes carried out at steps S81 to S84 are the same as the processes carried out at respectively the steps S71 to S74 of the flowchart explained above by referring to FIG. 14. That is to say, the operation-log acquisition section 46 supplies initially cataloged data to the negative-history-saving section 48, which then generates a negative-history vector MUP by referring to the initially cataloged data. Subsequently, the operation-log acquisition section 46 determines whether or not the initially cataloged data has been changed.

If the initially cataloged data has not been changed, the operation-log acquisition section 46 determines whether or not an operation log has been supplied.

If an operation log has been supplied, the flow of the processing goes on to the step S84 to determine whether or not the operation log is a positive history. If the operation log is a positive history, the flow of the processing goes on to a step S85 at which the operation-log acquisition section 46 acquires a program vector PP corresponding to a program involved in the operation log determined to be a positive history from the data acquisition section 41 and supplies the acquired program vector PP to the positive-history-saving section 47. The positive-history-saving section 47 then extracts the genre of the program vector PP.

Then, at the next step S86, the positive-history-saving section 47 keeps the program vector PP acquired from the data acquisition section 41 as an additional positive history for the extracted genre.

Subsequently, at the next S87, the positive-history-saving section 47 finds a sum of program vectors PP of positive histories with respect to all detailed items or all large items for the genre associated with the additionally kept program vector PP in order to generate a positive-history vector UP for the genre. After the process carried out at the step S87 is completed, the flow of the processing goes back to the step S82 to again carry out the processes of this step and the subsequent steps.

If the determination result produced in the process carried out at the step S84 indicates that the operation log is a negative history, on the other hand, the flow of the processing goes on to a step S88 at which the operation-log acquisition section 46 acquires a program vector PP corresponding to a program involved in the operation log determined to be a negative history from the data acquisition section 41 and supplies the acquired program vector PP to the negative-history-saving section 48. The negative-history-saving section 48 then extracts the genre of the program vector PP.

Then, at the next step S89, the negative-history-saving section 48 keeps the program vector PP acquired from the data acquisition section 41 as an additional negative history for the extracted genre.

Subsequently, at the next S90, the negative-history-saving section 48 finds a sum of program vectors PP of negative histories with respect to all detailed items or all large items for the genre associated with the additionally kept program vector PP in order to generate a negative-history vector MUP for the genre. After the process carried out at the step S90 is completed, the flow of the processing goes back to the step S82 to again carry out the processes of this step and the subsequent steps.

By carrying out the processing described above, a positive-history vector UP and a negative-history vector MUP are generated for every genre. Thus, a favorite of the user can be reflected in the positive-history vector UP and the negative-history vector MUP with a higher degree of precision without losing what is truly liked by the user. As a result, it is possible to generate information on a recommended program correctly reflecting a favorite of the user.

Figure 17:
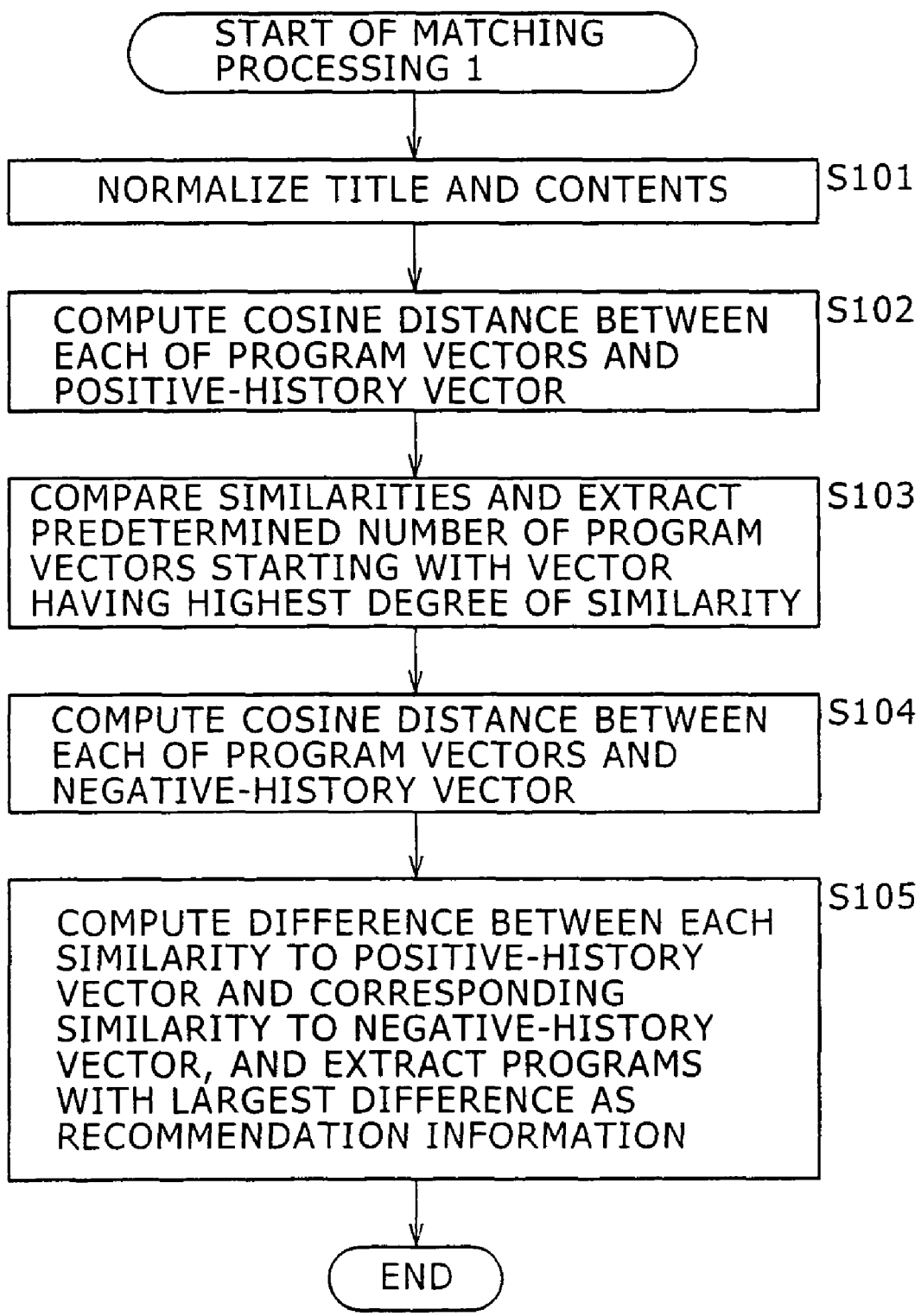
FIG. 17 shows a flowchart referred to in explanation of matching processing 1.

By referring to a flowchart shown in FIG. 17, the following description explains matching processing 1 carried out to identify matching programs for a case in which the program vector PP, the positive-history vector UP and the negative-history vector MUP each have a format including all detailed-item components aligned to form 1 array.

First of all, at a step S101, the program-vector extraction section 42 obtains program vectors PP of a plurality of programs such as programs broadcasted in a predetermined time band from the data acquisition section 41, and supplies the program vectors PP to the normalization-processing section 61 employed in the matching-process section 43. The normalization-processing section 61 normalizes components included in each of the received program vectors PP and components included in a positive-history vector UP obtained from the positive-history-saving section 47 as components each representing a word composing a title and contents. Then, the normalization-processing section 61 supplies results of the normalization to the vector-operation section 62.

To put it concretely, let us assume that the received program vector PP represents for example a title of Tm={Toukaidou-1, Mitsuya-1, ghost-story-1}. In this case, the normalization-processing section 61 normalizes the program vector PP into a title of Tm={Toukaidou-0.33, Mitsuya-0.33, ghost-story-0.33}. By carrying a normalization process in this way, for each program, the sum of weights applied to words serving as items composing the title of the program can be made equal to 1.

Then, at the next step S102, the vector-operation section 62 employed in the matching-process section 43 computes a degree of similarity SimUP as a cosine distance between each of the program vectors PP and the positive-history vector UP by using Eq. (1) given earlier.

Subsequently, at the next step S103, the vector-operation section 62 examines the degrees of similarity SimUP, which have each been computed in the process carried out at the step S102 as a cosine distance between each of the program vectors PP and the positive-history vector UP, by comparing the degrees of similarity SimUP with each other, extracting a predetermined number of short-distance program vectors PP starting with a vector having a highest degree of similarity SimUP to the positive-history vector UP. For example, the vector-operation section 62 extracts 10 program vectors PP.

Then, at the next step S104, the vector-operation section 62 computes a degree of similarity SimMUP as a cosine distance between each of the program vectors PP extracted in the process carried out at the step S103 and the negative-history vector MUP obtained from the negative-history-saving section 48 by using Eq. (2) given earlier.

Subsequently, at the next step S105, the vector-operation section 62 computes a difference between the degree of similarity SimUP and the corresponding degree of similarity SimMUP, extracting program vectors PP (or EPG data) for a predetermined number of most similar programs starting with a program having the largest difference as recommendation information, and supplies the recommendation information to the recommendation information output section 49. As described earlier, the degree of similarity SimUP is a cosine distance between a program vector PP and a positive-history vector UP. By the same token, the degree of similarity SimMUP is a cosine distance between a program vector PP and a negative-history vector MUP. For example, the vector-operation section 62 extracts the program vector PP (or the EPG data) of the program having the largest difference. The recommendation information is then cataloged in the recommended-program list 50 as well as output to the television display apparatus 11 and the recording/reproduction apparatus 12. Finally, the execution of the processing represented by this flowchart is ended.

By carrying out the processing described above, in the case of a program vector PP, a positive-history vector UP and a negative-history vector MUP each having a format including all detailed-item components aligned to form 1 array, a recommended program matching a favorite of the user can be determined on the basis of the degree of similarity SimUP between a program vector PP and a positive-history vector UP as well as the degree of similarity SimMUP between the program vector PP and a negative-history vector MUP.

Figure 18:
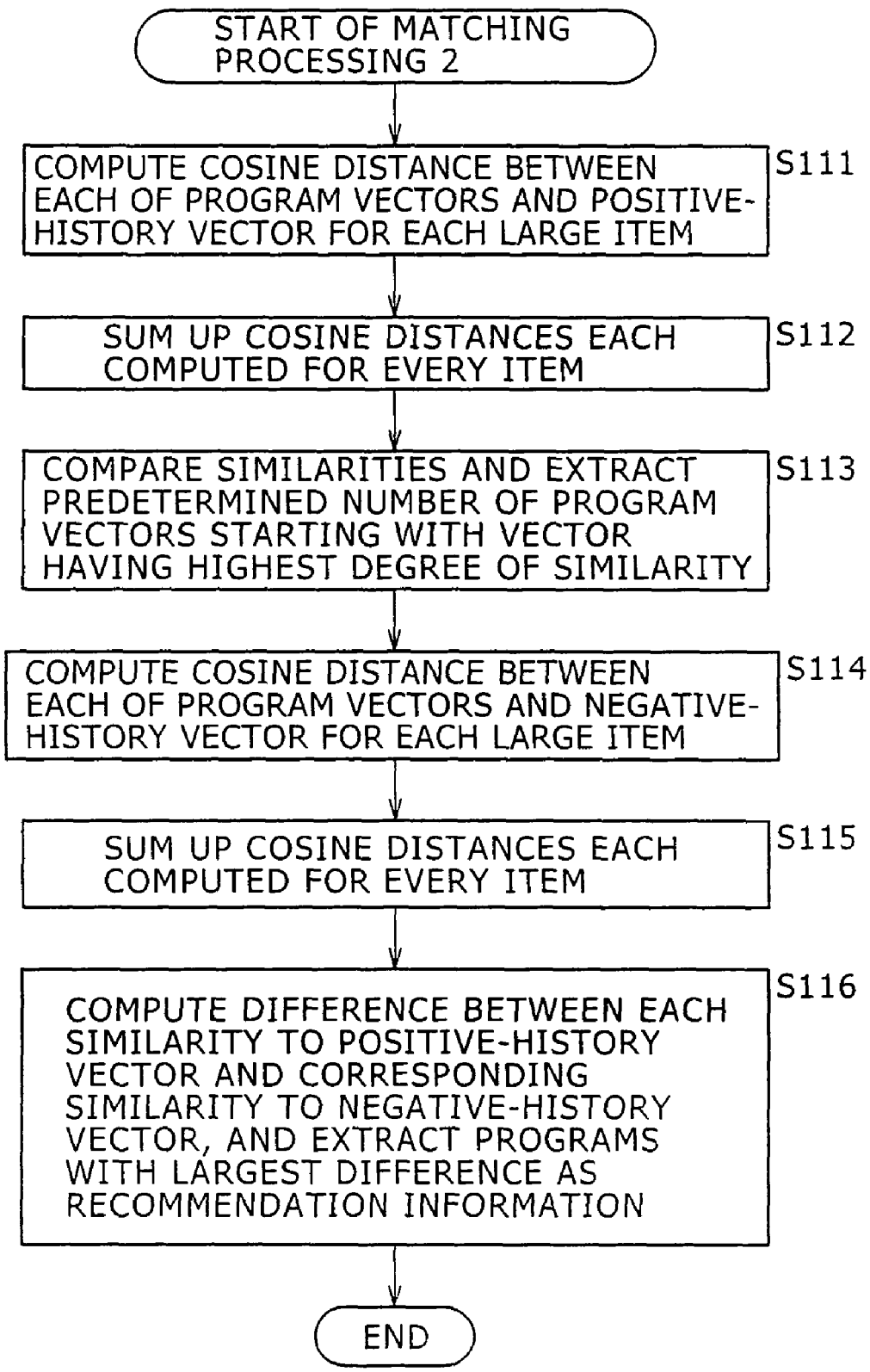
FIG. 18 shows a flowchart referred to in explanation of matching processing 2.

By referring to a flowchart shown in FIG. 18, the following description explains matching processing 2 in which, instead of normalizing words each serving as a component of a vector, a cosine distance is computed for each large item and a sum of the computed cosine distances is found as the degree of similarity SimUP or the degree of similarity SimMUP to be used for determining a recommended program.

First of all, at a step S111, the program-vector extraction section 42 extracts program vectors PP of a plurality of programs from the data acquisition section 41 and supplies the program vectors PP to the vector-operation section 62 employed in the matching-process section 43. An example of the programs is programs broadcasted during a predetermined period of time. Then, the vector-operation section 62 computes a cosine distance between each of the program vectors PP and a positive-history vector UP read out from the positive-history-saving section 47 for each of large items composing a compound positive-history vector UP cited before.

Then, at the next step S112, in accordance with Eq. (4) given earlier, the vector-operation section 62 computes a sum of cosine distances each computed in the process carried out at the step S111 for every item to find the degree of similarity SimUP.

Subsequently, at the next step S113, the vector-operation section 62 examines the degrees of similarity SimUP found in the process carried out at the step S112 by comparing the degrees of similarity SimUP with each other. Each of the degrees of similarity SimUP represents a sum of cosine distances between a program vector PP and positive-history vectors UP. The vector-operation section 62 then extracts a predetermined number of short-distance program vectors PP starting with a vector having the highest degree of similarity SimUP. The predetermined number of extracted program vectors PP is typically 10.

Then, at the next step S114, the vector-operation section 62 computes a cosine distance between each of the program vectors PP extracted in the process carried out at the step S113 and a negative-history vector MUP read out from the negative-history-saving section 48 for each of large items composing a compound negative-history vector MUP cited before.

Subsequently, at the next S115, in accordance with Eq. (4) given earlier, the vector-operation section 62 computes a sum of cosine distances each computed in the process carried out at the step S114 for every item to find the degree of similarity SimMUP.

Then, at the next step S116, the vector-operation section 62 computes a difference between the degree of similarity SimUP and the corresponding degree of similarity SimMUP, extracting program vectors PP (or EPG data) for a predetermined number of most similar programs starting with a program having the largest difference as recommendation information, and supplies the recommendation information to the recommendation information output section 49. As described earlier, the degree of similarity SimUP is a cosine distance between a program vector PP and a positive-history vector UP. By the same token, the degree of similarity SimMUP is a cosine distance between a program vector PP and a negative-history vector MUP. For example, the vector-operation section 62 extracts the program vectors PP (or the EPG data) of 3 programs having largest differences. The recommendation information is then cataloged in the recommended-program list 50 as well as output to the television display apparatus 11 and the recording/reproduction apparatus 12. Finally, the execution of the processing represented by this flowchart is ended.

By carrying out the matching processing described above, instead of normalizing words each serving as a component of a vector, a cosine distance is computed for each large item and a sum of the computed cosine distances is found as the degree of similarity SimUP or the degree of similarity SimMUP to be used for determining recommended programs. Thus, it is possible to determine a recommended program matching a favorite of the user on the basis of the degrees of similarity between program vectors PP and positive-history vectors UP and the degrees of similarity between program vectors PP and negative-history vectors MUP without being affected by biases due to history overlapping between detailed elements pertaining to different large items.

In matching processing 1 explained earlier by referring to the flowchart shown in FIG. 17 and matching processing 2 explained earlier by referring to the flowchart shown in FIG. 18, programs considered to be programs most disliked by the user as indicated by a negative history are excluded from programs most preferred by the user as indicated by highest degrees of similarity to a positive-history vector UP. However, recommended programs can also be determined by using for example a positive history only.

In addition, in a process to select a program, a user may in some cases has determined items, which are weighted and not weighted, by for example, much liking news and report programs, preferring a genre to performer or thinking that contents are important without caring about performer. In other words, the user has certain important and unimportant items for selecting a program.

Thus, matching processing 1 and matching processing 2 may use the program-side effect vector EfPP, the user-side effect vector EfUP and the user-side negative-vector EfMP, which have been described before. In addition, the user may be allowed to determine whether or not to use the program-side effect vector EfPP, the user-side effect vector EfUP and the user-side negative-vector EfMUP.

Figure 19:
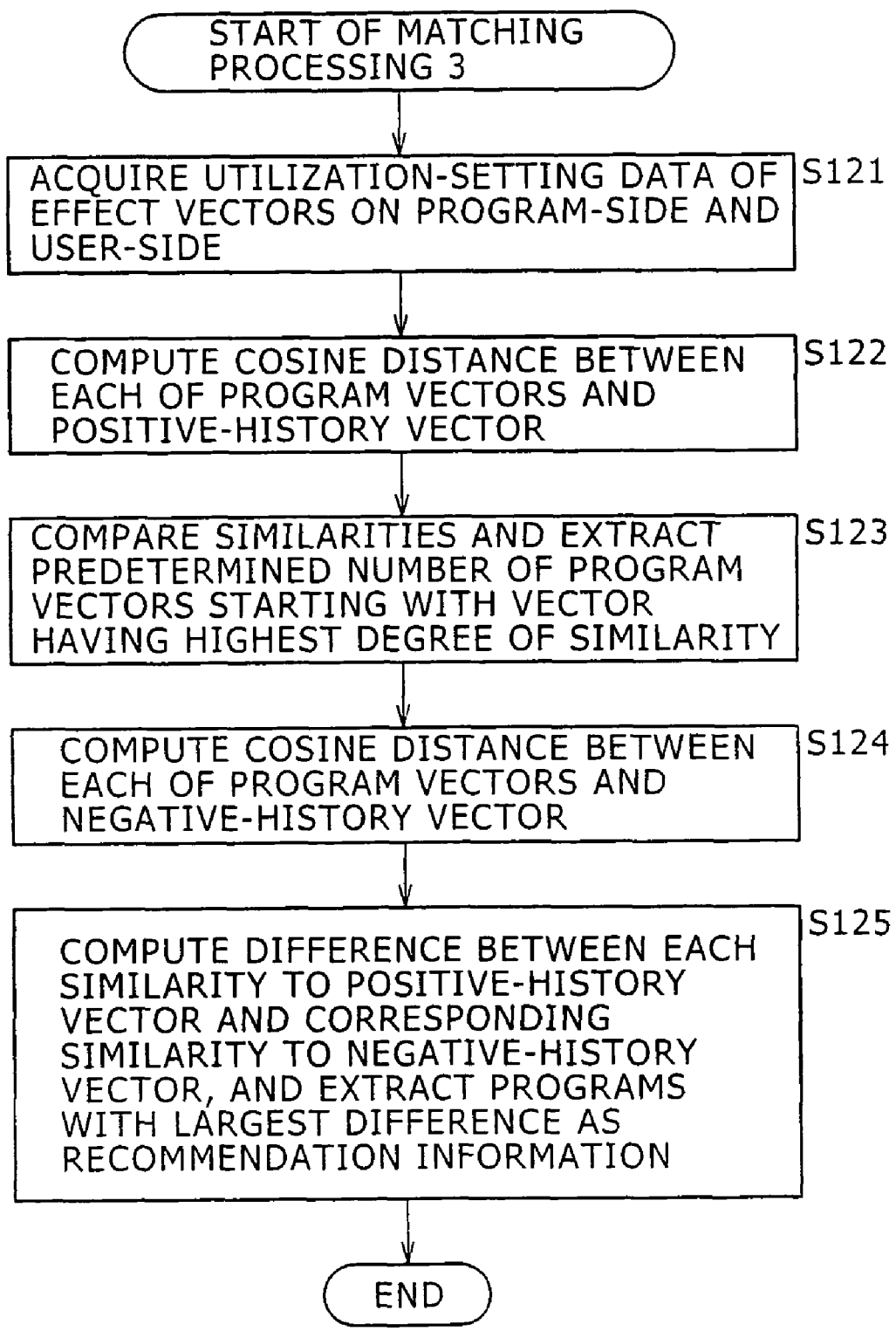
FIG. 19 shows a flowchart referred to in explanation of matching processing 3.

By referring to a flowchart shown in FIG. 19, the following description explains matching processing 3 allowing the user to determine whether or not to use the program-side effect vector EfPP, the user-side effect vector EfUP for which the program vector PP, the positive-history vector UP and the negative-history vector MUP respectively are each a vector having a format including all detailed-item components aligned to form 1 array.

First of all, at a step S121, the vector-operation section 62 acquires utilization-setting data of the program-side effect vector EfPP, the user-side effect vector EfUP or the user-side negative-vector EfMUP from the initial-catalog storage section 45. The user has entered the utilization-setting data to the initial-catalog storage section 45 by operating the operation input section 44. The utilization-setting data is information indicating whether or not to apply weights by using the program-side effect vector EfPP, the user-side effect vector EfUP or the user-side negative-vector EfMUP in the matching processing.

Then, at the next step S122, the vector-operation section 62 reads out the user-side effect vector EfUP from the user-information-cataloging section 63 if necessary, and computes a cosine distance between each program vector PP and a positive-history vector UP in accordance with Eq. (5) given below to find the degree of similarity SimUP.

$$SimUP = \frac{epd_1 eud_1 p_1 u_1 + epd_2 eud_2 p_2 u_2 + \ldots}{|PP||UP|} \quad (5)$$

It is to be noted that, in Eq. (5), program vector PP=$(p_1, p_2, \ldots)$, positive-history vector UP=$(u_1, u_2, \ldots)$, program-side effect vector EfPP=$(epd_1, epd_2, \ldots)$ and user-side effect vector EfUP=$(eud_1, eud_2, \ldots)$ are assumed to represent the program vector PP, the positive-history vector UP, the program-side effect vector EfPP and the user-side effect vector EfUP respectively. In addition, in Eq. (5), it is also assumed that the program-side effect vector EfPP and the user-side effect vector EfUP are used. However, any of the program-side effect vector EfPP and the user-side effect vector EfUP may not be used. In this case, the value of 1 is substituted for the unused program-side effect vector EfPP or the user-side effect vector EfUP.

On the top of that, the user-side effect vector EfUP can be a vector settable by the user, a vector set on the basis of initial setting given by the user or a vector generated in the user-information-cataloging section 63. The generation of the user-side effect vector EfUP will be described later in detail by referring to flowcharts shown in FIGS. 22 to 25.

Then, at the next step S123, the vector-operation section 62 examines the degrees of similarity SimUP found in the process carried out at the step S122 by comparing the degrees of similarity SimUP with each other. Each of the degrees of similarity SimUP represents a cosine distance between a program vector PP and a positive-history vector UP. The vector-operation section 62 then extracts a predetermined number of short-distance program vectors PP starting with a vector having the highest degree of similarity SimUP. The predetermined number of extracted program vectors PP is typically 10.

Subsequently, at the next S124, the vector-operation section 62 reads out the user-side negative-effect vector EfMUP from the user-information-cataloging section 63 if necessary, and computes a cosine distance between each of the program vectors PP extracted in the process carried out at the step S123 and a negative-history vector MUP in accordance with Eq. (6) given below to find the degree of similarity SimMUP.

$$SimMUP = \frac{epd_1 emd_1 p_1 m_1 + epd_2 \cdot emd_2 p_2 m_2 + \ldots}{|PP||MUP|} \quad (6)$$

It is to be noted that, in Eq. (6), program vector PP=$(p_1, p_2, \ldots)$, negative-history vector MUP=$(m_1, m_2, \ldots)$, program-side effect vector EfPP=$(epd_1, epd_2, \ldots)$ and user-side negative-effect vector EfMUP=$(emd_1, emd_2, \ldots)$ are assumed to represent the program vector PP, the negative-history vector MUP, the program-side effect vector EfPP and the user-side negative-effect vector EfMUP respectively. In addition, in Eq. (6), it is also assumed that the program-side effect vector EfPP and the user-side negative-effect vector EfMUP are used. However, any of the program-side effect vector EfPP and the user-side negative-effect vector EfMUP may not be used. In this case, the value of 1 is substituted for the unused program-side effect vector EfPP or the user-side negative-effect vector EfMUP.

On the top of that, the user-side negative-effect vector EfMUP can be a vector settable by the user, a vector set on the basis of initial setting given by the user or a vector generated in the user-information-cataloging section 63. The generation of the user-side negative-effect vector EfMUP will be described later in detail by referring to flowcharts shown in FIG. 26 or 27.

Then, at the next step S125 the vector-operation section 62 computes a difference between the degree of similarity SimUP and the corresponding degree of similarity SimMUP, extracting program vectors PP (or EPG data) for a predetermined number of most similar programs starting with a program having the largest difference as recommendation information, and supplies the recommendation information to the recommendation information output section 49. As described earlier, the degree of similarity SimUP is a cosine distance between a program vector PP and a positive-history vector UP. By the same token, the degree of similarity SimMUP is a cosine distance between a program vector PP and a negative-history vector MUP. For example, the vector-operation section 62 extracts the program vectors PP (or the EPG data) of 3 programs having largest differences. The recommendation information is then cataloged in the recommended-program list 50 as well as output to the television display apparatus 11 and the recording/reproduction apparatus 12. Finally, the execution of the processing represented by this flowchart is ended.

By carrying out the processing described above, in accordance with setting data, the program-side effect vector EfPP, the user-side effect vector EfUP or the user-side negative-effect vector EfMUP is used to extract recommendation information. Thus, it is possible to recommend information that correctly reflects a favorite of the user.

In the processing explained above by referring to the flowchart shown in FIG. 19, the program vector PP, the positive-history vector UP and the negative-history vector MUP are each a vector having a format including all detailed-item components aligned to form 1 array. However, the program vector PP, the positive-history vector UP and the negative-history vector MUP can each be processed for each large item.

Figure 20:
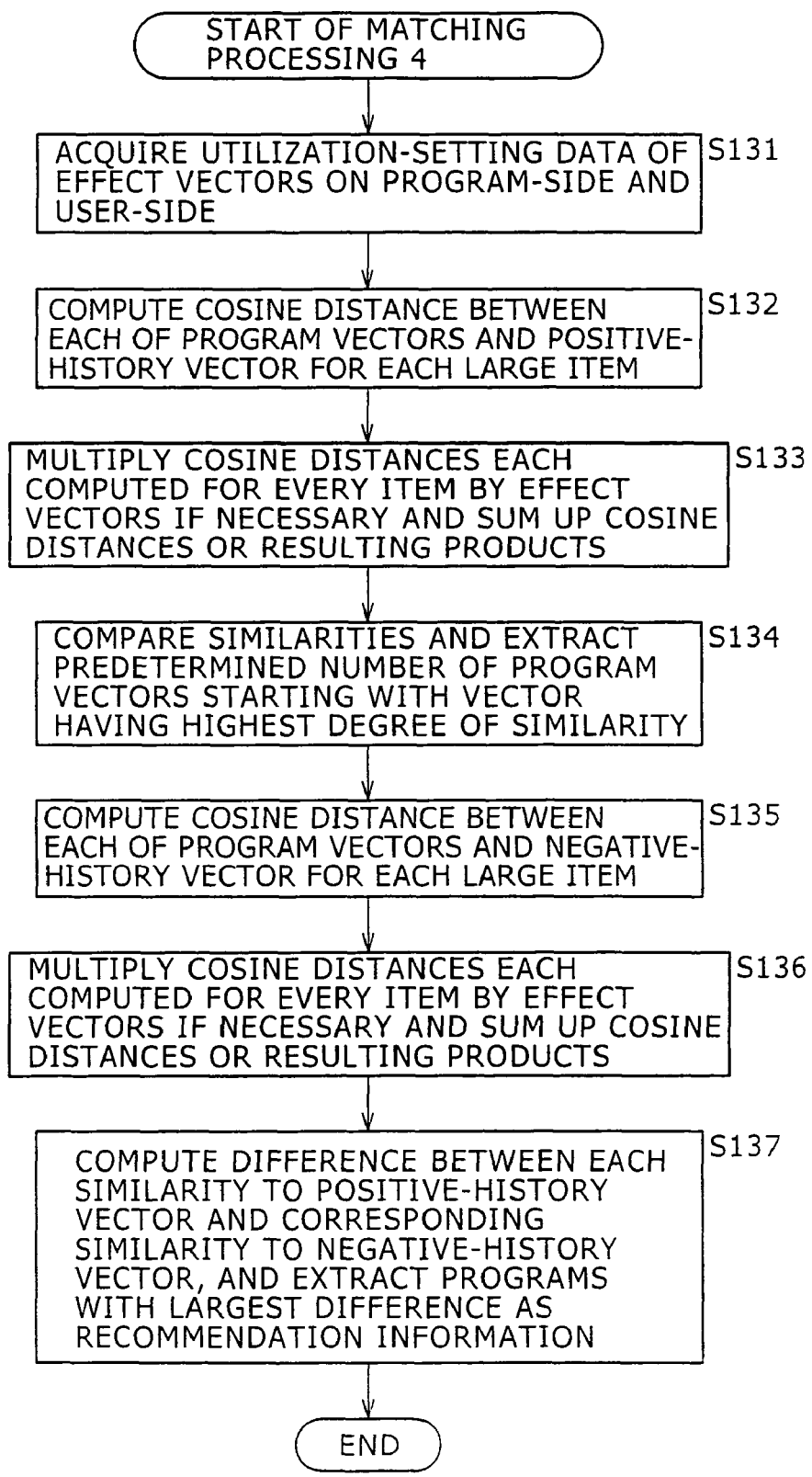
FIG. 20 shows a flowchart referred to in explanation of matching processing 4.

By referring to a flowchart shown in FIG. 20, the following description explains matching processing 4 allowing the program-side effect vector EfPP, the user-side effect vector EfUP or the user-side negative-effect vector EfMUP to be reflected in a matching process for every large item.

First of all, at a step S131, the same process as the step S121 of the flowchart shown in FIG. 19 is carried out to acquire utilization-setting data of effect vectors on the program-side and the user-side.

Then, at the next step S132, the vector-operation section 62 computes a cosine distance between each of input program vectors PP and a positive-history vector UP read out from the positive-history-saving section 47 for each of large items composing the compound positive-history vector UP. In this computation, no effect vectors are used.

Then, at the next step S133, in accordance with Eq. (7) given below, the vector-operation section 62 multiplies cosine distances each computed for every item by an effect vector if necessary and computes a sum of cosine distances for every item or resulting products to find the degree of similarity SimUP.

$$SimUP = epd_t eud_i \cos\theta u_t + epd_g eud_g \cos\theta u_g + \\ epd_p eud_p \cos\theta u_p + epd_a eud_a \cos\theta u_a + epd_k eud_k \cos\theta u_k \quad (7)$$

It is to be noted that, in above Eq. (7), cosine distances between program vectors PP=($p_t$, $p_g$, $p_p$, $p_a$, $p_k$) and the positive-history vectors UP=($u_t$, $u_g$, $u_p$, $u_a$, $u_k$) are expressed by ($\cos\theta u_t$, $\cos\theta u_g$, $\cos\theta u_p$, $\cos\theta u_a$, $\cos\theta u_k$) the program-side effect vectors EfPP are expressed by EfPP=($epd_t$, $epd_g$, $epd_p$, $epd_a$, $epd_k$) whereas the user-side effect vectors EfUP are expressed by EfUP=($eud_t$, $eud_g$, $eud_p$, $eud_a$, $eud_k$). In addition, in Eq. (7), it is also assumed that the program-side effect vector EfPP and the user-side effect vector EfUP are used. However, any of the program-side effect vector EfPP and the user-side effect vector EfUP may not be used. In this case, the value of 1 is substituted for the unused program-side effect vector EfPP or the user-side effect vector EfUP.

Then, at the next step S134, the vector-operation section 62 examines the degrees of similarity SimUP, which have each been found in the process carried out at the step S133 as a sum of cosine distances between a program vector PP and positive-history vectors UP, by comparing the degrees of similarity SimUP with each other. The vector-operation section 62 then extracts a predetermined number of short-distance program vectors PP starting with a vector having the highest degree of similarity SimUP. The predetermined number of extracted program vectors PP is typically 10.

Subsequently, at the next step S135, the vector-operation section 62 computes a cosine distance between each of the program vectors PP extracted in the process carried out at the step S134 and a negative-history vector MUP read out from the negative-history-saving section 48 for each large item. In this case, no effect vector is used.

Then, at the next step S136, by using Eq. (8) given below, the vector-operation section 62 multiplies the cosine distances each computed for every item by effect vectors if necessary and computes a sum of the cosine distances or the resulting products to find the degree of similarity SimMUP.

$$SimMUP = epd_t emd_i \cos\theta m_t + epd_g emd_g \cos\theta m_g + \\ epd_p emd_p \cos\theta m_p + epd_a emd_a \cos\theta m_a + epd_k emd_k \cos\theta m_k \quad (8)$$

It is to be noted that, in above Eq. (8), cosine distances between program vectors PP=($p_t$, $p_g$, $p_p$, $p_a$, $p_k$) and negative-history vectors UP=($m_t$, $m_g$, $m_p$, $m_a$, $m_k$) are expressed by ($\cos\theta m_t$, $\cos\theta m_g$, $\cos\theta m_p$, $\cos\theta m_a$, $\cos\theta m_k$), the program-side effect vectors EfPP are expressed by EfPP=($epd_t$, $epd_g$, $epd_p$, $epd_a$, $epd_k$) whereas the user-side negative-effect vectors EfMUP are expressed by EfMUP=($emd_t$, $emd_g$, $emd_p$, $emd_a$, $emd_k$). In addition, in Eq. (8), it is also assumed that the program-side effect vector EfPP and the user-side negative-effect vector EfMUP are used. However, any of the program-side effect vector EfPP and the user-side negative-effect vector EfMUP may not be used. In this case, the value of 1 is substituted for the unused program-side effect vector EfPP or the user-side negative-effect vector EfMUP.

Then, at the next S137, the vector-operation section 62 computes a difference between the degree of similarity SimUP and the corresponding degree of similarity SimMUP, extracting program vectors PP (or EPG data) for a predetermined number of most similar programs starting with a program having the largest difference as recommendation information, and supplies the recommendation information to the recommendation information output section 49. As described earlier, the degree of similarity SimUP is a cosine distance between a program vector PP and a positive-history vector UP. By the same token, the degree of similarity SimMUP is a cosine distance between a program vector PP and a negative-history vector MUP. For example, the vector-operation section 62 extracts the program vectors PP (or the EPG data) of 3 most similar programs having largest differences. The recommendation information is then cataloged in the recommended-program list 50 as well as output to the television display apparatus 11 and the recording/reproduction apparatus 12. Finally, the execution of the processing represented by this flowchart is ended.

In the processing described above, for every large item, effect vectors are each used as a weight. Thus, it is possible to generate recommendation information matching details of a favorite of the user.

Figure 21:
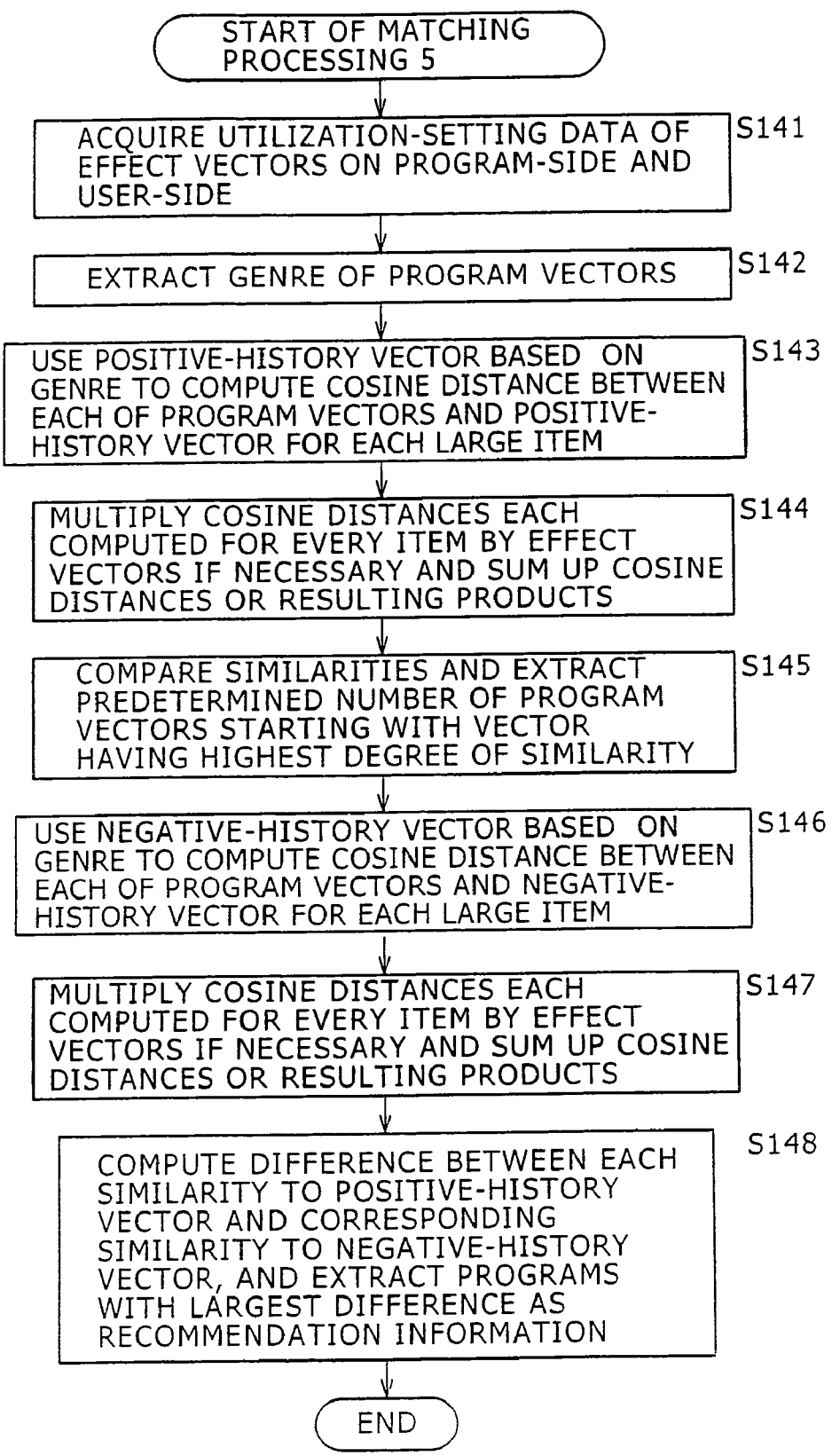
FIG. 21 shows a flowchart referred to in explanation of matching processing 5.

By referring to a flowchart shown in FIG. 21, the following description explains matching processing 5 carried out to identify matching programs by using a positive-history vector UP and a negative-history vector MUP, which are generated for every genre by positive-history vector and negative-history vector generation processing 2 explained earlier by referring to the flowchart shown in FIG. 16, and by using a user-side effect vector EfUP and a user-side negative-effect vector EfMUP, which are provided for each genre.

First of all, at a step S141, the same process as the step S121 of the flowchart shown in FIG. 19 is carried out to acquire setting data of effect vectors.

Then, at the next step S142, the vector-operation section 62 extracts the genre of input program vectors PP. In the following explanation, the genre of the input program vectors PP is a drama for example.

Subsequently, at the next step S143, the vector-operation section 62 reads out a positive-history vector UP based on the drama genre from the positive-history-saving section 47 and computes a cosine distance between each of the input program vectors PP and the positive-history vector UP for each of large items composing the compound positive-history vector UP. In this case, no effect vectors are used.

Then, at the next step S144, in accordance with Eq. (9) given below, the vector-operation section 62 multiplies the cosine distances each computed for every item by user-side effect vectors for the drama genre if necessary and finds a sum of the cosine distances or the resulting products to find the degree of similarity SimUP.

$$SimUP = epd_t eud_{td} \cos\theta u_{td} + epd_g eud_{gd} \cos\theta u_{gd} + \\ epd_p eud_{pd} \cos\theta u_{pd} + epd_a eud_{ad} \cos\theta u_{ad} + epd_k eud_{kd} \cos\theta u_{kd} \quad (9)$$

It is to be noted that, in above Eq. (9), cosine distances between program vectors PP=($p_t$, $p_g$, $p_p$, $p_a$, $p_k$) and positive-history vectors UP=($u_t$, $u_g$, $u_p$, $u_a$, $u_k$) are expressed by ($\cos\theta u_{td}$, $\cos\theta u_{gd}$, $\cos\theta u_{pd}$, $\cos\theta u_{ad}$, $\cos\theta u_{kd}$), the program-side effect vectors EfPP are expressed by EfPP=($epd_t$, $epd_g$, $epd_p$, $epd_a$, $epd_k$) whereas the user-side effect vectors EfUP are expressed by EfUP=($eud_{td}$, $eud_{gd}$, $eud_{pd}$, $eud_{ad}$, $eud_{kd}$). In addition, in Eq. (9), it is also assumed that the program-side effect vector EfPP and the user-side effect vector EfUP are used. However, any of the program-side effect vector EfPP and the user-side effect vector EfUP may not be used. In this case, the value of 1 is substituted for the unused program-side effect vector EfPP or the user-side effect vector EfUP.

Then, at the next step S145, the vector-operation section 62 examines the degrees of similarity SimUP, which have each been found in the process carried out at the step S144 as a sum of cosine distances between a program vector PP and positive-history vectors UP, by comparing the degrees of similarity SimUP with each other. The vector-operation section 62 then extracts a predetermined number of short-distance program vectors PP starting with a vector having the highest degree of similarity SimUP. The predetermined number of extracted program vectors PP is typically 10.

Subsequently, at the next step S146, the vector-operation section 62 computes a cosine distance between each of the program vectors PP extracted in the process carried out at the step S145 and a negative-history vector MUP read out for the drama genre from the negative-history-saving section 48 for each large item. In this case, no effect vector is used.

Then, at the next S147, by using Eq. (10) given below, the vector-operation section 62 multiplies the cosine distances each computed for every item by effect vectors for the drama genre if necessary and computes a sum of the cosine distances or the resulting products to find the degree of similarity SimMUP.

$$SimMUP = epd_t emd_{td} \cos\theta m_{td} + epd_g emd_{gd} \cos\theta m_{gd} + \\ epd_p emd_{pd} \cos\theta m_{pd} + epd_a emd_{ad} \cos\theta m_{ad} + epd_k emd_{kd} \cos\theta m_{kd}$$ (10)

It is to be noted that, in above Eq. (10), cosine distances between program vectors PP=$(p_t, p_g, p_p, p_a, p_k)$ and negative-history vectors MUP=$(m_t, m_g, m_p, m_a, m_k)$ are expressed by $(\cos\theta m_{td}, \cos\theta m_{gd}, \cos\theta m_{pd}, \cos\theta m_{ad}, \cos\theta m_{kd})$, the program-side effect vectors EfPP are expressed by EfPP= $(epd_t, epd_g, epd_p, epd_a, epd_k)$ whereas the user-side negative-effect vectors EfMUP are expressed by EfMUP=$(emd_{td}, emd_{gd}, emd_{pd}, emd_{ad}, emd_{kd})$. In addition, in Eq. (10), it is also assumed that the program-side effect vector EfPP and the user-side negative-effect vector EfMUP are used. However, any of the program-side effect vector EfPP and the user-side negative-effect vector EfMUP may not be used. In this case, the value of 1 is substituted for the unused program-side effect vector EfPP or the user-side negative-effect vector EfMUP.

Then, at the next S148, the vector-operation section 62 computes a difference between the degree of similarity SimUP and the corresponding degree of similarity SimMUP, extracting program vectors PP (or EPG data) for a predetermined number of most similar programs starting with a program having the largest difference as recommendation information, and supplies the recommendation information to the recommendation information output section 49. As described earlier, the degree of similarity SimUP is a cosine distance between a program vector PP and a positive-history vector UP. By the same token, the degree of similarity SimMUP is a cosine distance between a program vector PP and a negative-history vector MUP. For example, the vector-operation section 62 extracts the program vectors PP (or the EPG data) of 3 programs having largest differences. The recommendation information is then cataloged in the recommended-program list 50 as well as output to the television display apparatus 11 and the recording/reproduction apparatus 12. Finally, the execution of the processing represented by this flowchart is ended.

In the processing described above, for each large item, a cosine distance between each program vector PP and a positive-history vector UP for a genre as well as a cosine distance between each program vector PP and a negative-history vector MUP for the genre are computed and the degree of similarity is found by applying effect vectors for the genre as weights. It is thus possible to generate recommendation information matching details of a favorite of the user.

In addition, the user-side effect vector EfUP and the user-side negative-effect vector EfMUP are generated on the basis of data initially cataloged by the user in the initial-catalog storage section 45. As an alternative, a user-side effect vector EfUP and a user-side negative-effect vector EfMUP, which are unique to the user, are generated on the basis of a positive-history vector UP or a negative-history vector MUP or by counting the number of programs viewed by the user in a predetermined period of time.

Figure 22:
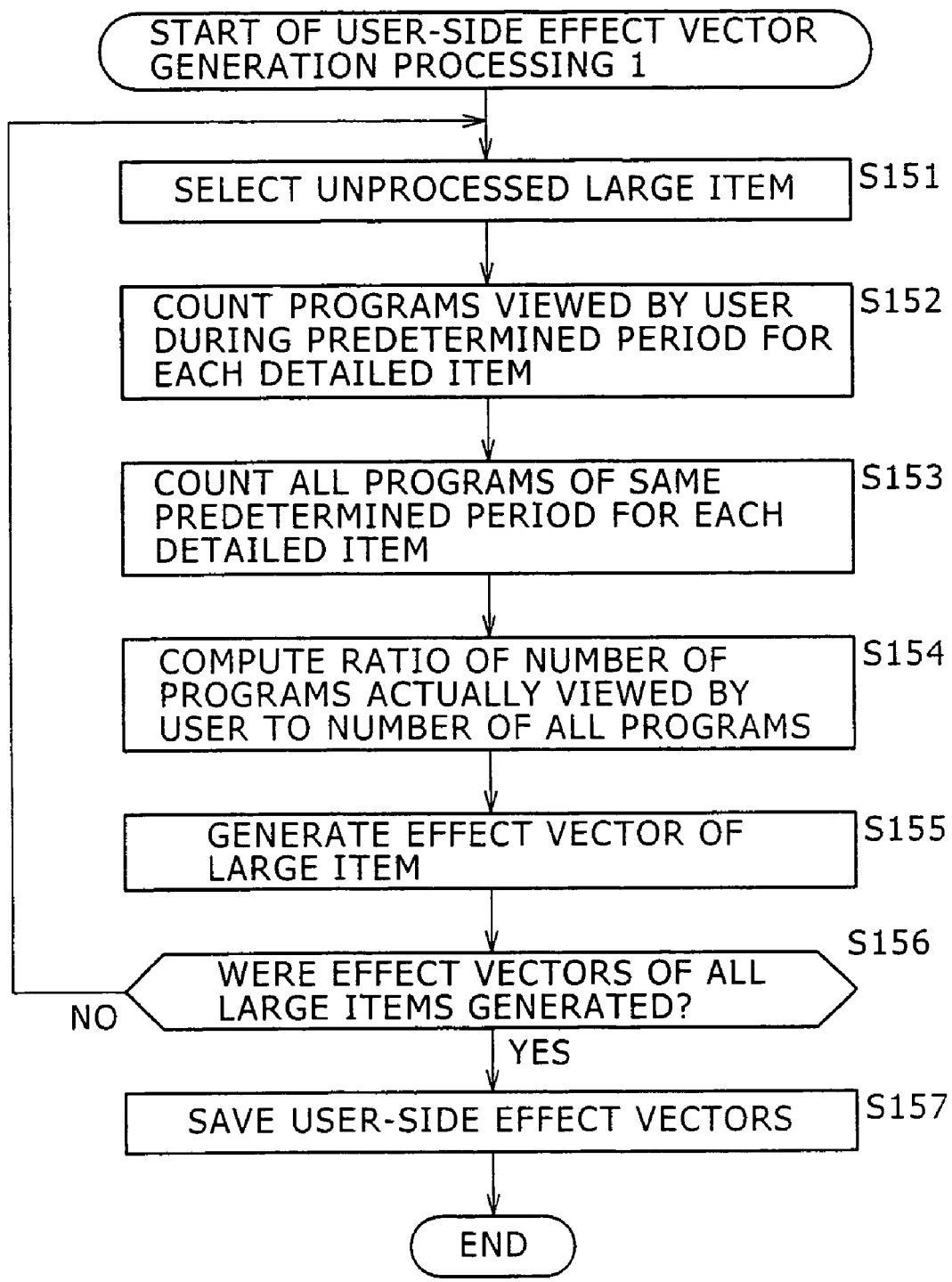
FIG. 22 shows a flowchart referred to in explanation of user-side effect vector generation processing 1.

By referring to a flowchart shown in FIG. 22, the following description explains user-side effect vector generation processing 1 carried out to generate a user-side effect vector EfUP by counting the number of programs viewed by the user during a fixed period of time.

First of all, at a step S151, the user-information-cataloging section 63 employed in the matching-process section 43 selects an unprocessed large item.

Then, at the next step S152, the user-information-cataloging section 63 detects programs viewed by the user during a predetermined period of time such as 1 week, 1 month or 3 months by referring to a positive history stored in the positive-history-saving section 47, requests the program-vector extraction section 42 to extract program vectors PP for the programs viewed by the user during the predetermined period of time from the data acquisition section 41 and counts the number of programs for each of detailed items composing the large item selected in the process carried out at the step S151.

To put it concretely, let us assume for example that the large item selected in the process carried out at the step S151 is genre Gm={Drama, Variety, Sport, Movie, Music, Child program/Education, General culture/Documentary, News/Report, Others}. In this case, the user-information-cataloging section 63 counts the number of programs viewed by the user during the predetermined period of time by classifying components of program vectors PP corresponding to the programs into items composing the large item. Let us assume for example that the number of programs viewed by the user during the predetermined period of time is 50. In this case, the result of counting the number of programs viewed by the user during the predetermined period of time is for example Gm={10, 18, 5, 2, 8, 1, 0, 1, 5}.

Then, at the next step S153, the user-information-cataloging section 63 requests the program-vector extraction section 42 to extract program vectors PP for all programs broadcasted during the same predetermined period of time from the data acquisition section 41 and counts the number of programs for each of detailed items composing the large item selected in the process carried out at the step S151.

To put it concretely, let us assume for example that the large item selected in the process carried out at the step S151 is genre Gm={Drama, Variety, Sport, Movie, Music, Child program/Education, General culture/Documentary, News/Report, Others}. In this case, the user-information-cataloging section 63 counts the number of all programs broadcasted during the same predetermined period of time by classifying components of program vectors PP corresponding to the programs into items composing the large item. Let us assume for example that the number of all programs broadcasted during the same predetermined period of time is 1,000. In this case, the result of counting the number of all programs broadcasted during the same predetermined period of time is for example Gm={104, 239, 68, 25, 78, 91, 60, 254, 81}.

Then, at the next step S154, the user-information-cataloging section 63 computes the ratio of the number of programs actually viewed by the user to the number of all programs. As described above, the number of programs actually viewed by the user and the number of all programs have been obtained in the processes carried out at the steps S152 and S153 respectively.

Effects of the viewing-rate competition make the organization of programs considered as an organization reflecting favorites of the public in general. That is to say, the process to compute the ratio of the number of programs actually viewed by the user to the number of all programs is in other words equivalent a process to normalize the number of programs actually viewed by the user by using the number of all programs as a standard model. A normalized vector found in the process carried out at the step S154 is referred to as a normalized vector D.

Let us assume for example that the large item selected in the process carried out at the step S151 is genre Gm={Drama, Variety, Sport, Movie, Music, Child program/Education, General culture/Documentary, News/Report, Others}. Let us also assume for example that the number of all programs broadcasted in 1 week is (8, 12, 3, 7, 6, 4, 2, 8, 10) and the number of programs actually viewed by the user is (4, 0, 1, 2, 3, 4, 1, 2, 2). In this case, the normalized vector is D=(4/8, 0/12, 1/3, 2/7, 3/6, 4/4, 1/2, 2/8, 2/10)=(0.5, 0, 0.33, 0.28, 0.5, 1.0, 0.5, 0.25, 0.2). Thus, a component of the normalized vector D equal to 1.0 means that all the programs broadcasted in the predetermined period of time for the component have been viewed by the user. On the other hand, a component of the normalized vector D equal to 0 means that none of the programs broadcasted in the predetermined period of time for the component have been viewed by the user.

Then, at the next step S155, the user-information-cataloging section 63 generates an effect vector of the large item on the basis of a computation result obtained in the process carried out at the step S154.

In order to generate an effect vector, an item of large-item genre Gm={Drama, Variety, Sport, Movie, Music, Child program/Education, General culture/Documentary, News/Report, Others} is used to set a standard value. Let us assume for example that a general user views about 20% of drama programs broadcasted in a week. In this case, the standard value is set at 0.2. Since an effect vector for a large item is computed as relative values, the effect vector may have values in the range 0 to 1. The user-side effect vector thus has relative values computed from the normalized vector D obtained as a result of the process carried out at the step S154 with the set value used as a reference.

Thus, the effect vector E of the large-item genre Gm showing a favorite genre of the user is computed to be E=(0.3, −0.2, 0.13, 0.08, 0.3, 0.8, 0.3, −0.07, 0.0), which leads to a determination result indicating that the user likes the Child program/Education genre but dislikes the variety genre.

Then, at the next step S156, the user-information-cataloging section 63 determines whether or not effect vectors of all large items have been generated. If the determination result produced in the process carried out at the step S156 indicates that effect vectors of all large items have not been generated, the flow of the processing goes back to the step S151 to again perform the processes of the step and the subsequent steps.

If the determination result produced in the process carried out at the step S156 indicates that effect vectors of all large items have been generated, on the other hand, the flow of the processing goes on to a step S157 at which the user-information-cataloging section 63 saves the effect vectors for all the large items. Finally, the execution of the processing represented by this flowchart is ended.

By carrying out the processing described above, a difference between a favorite of the public in general and a favorite unique to the user can be found. In addition, by recalculating the user-side effect vector EfUP for every predetermined period of time such as 3 months or half a year, it is possible to recommend a program reflecting a favorite of the user in a real-time manner.

In addition, in the processing described above by referring to the flowchart shown in FIG. 22, the user-side effect vector EfUP is found on the basis of programs viewed by the user during a predetermined period of time such as 1 week, 1 month or 3 months. However, programs used as the basis for computing the user-side effect vector EfUP can be viewed during a plurality of periods of time such as short, intermediate and long periods of time. In this case, the user-side effect vector EfUP is found on the basis of programs viewed by the user during each of the periods of time and the user-side effect vectors EfUP are used for determining recommendation information.

In the processing described above, a favorite unique to the user is used as the user-side effect vector EfUP. However, the favorite unique to the user can also be used as the positive-history vector UP for the matching process.

On the top of that, in place of all broadcasted programs, only the number of programs broadcasted during a specific predetermined period of time in which the user most views programs is counted. An example of such a specific period of time is the so-called prime-time from 18:00 to 22:00. By setting such a specific predetermined period of time, the amount of computation processing to find a favorite of the public in general can be reduced substantially.

Figure 23:
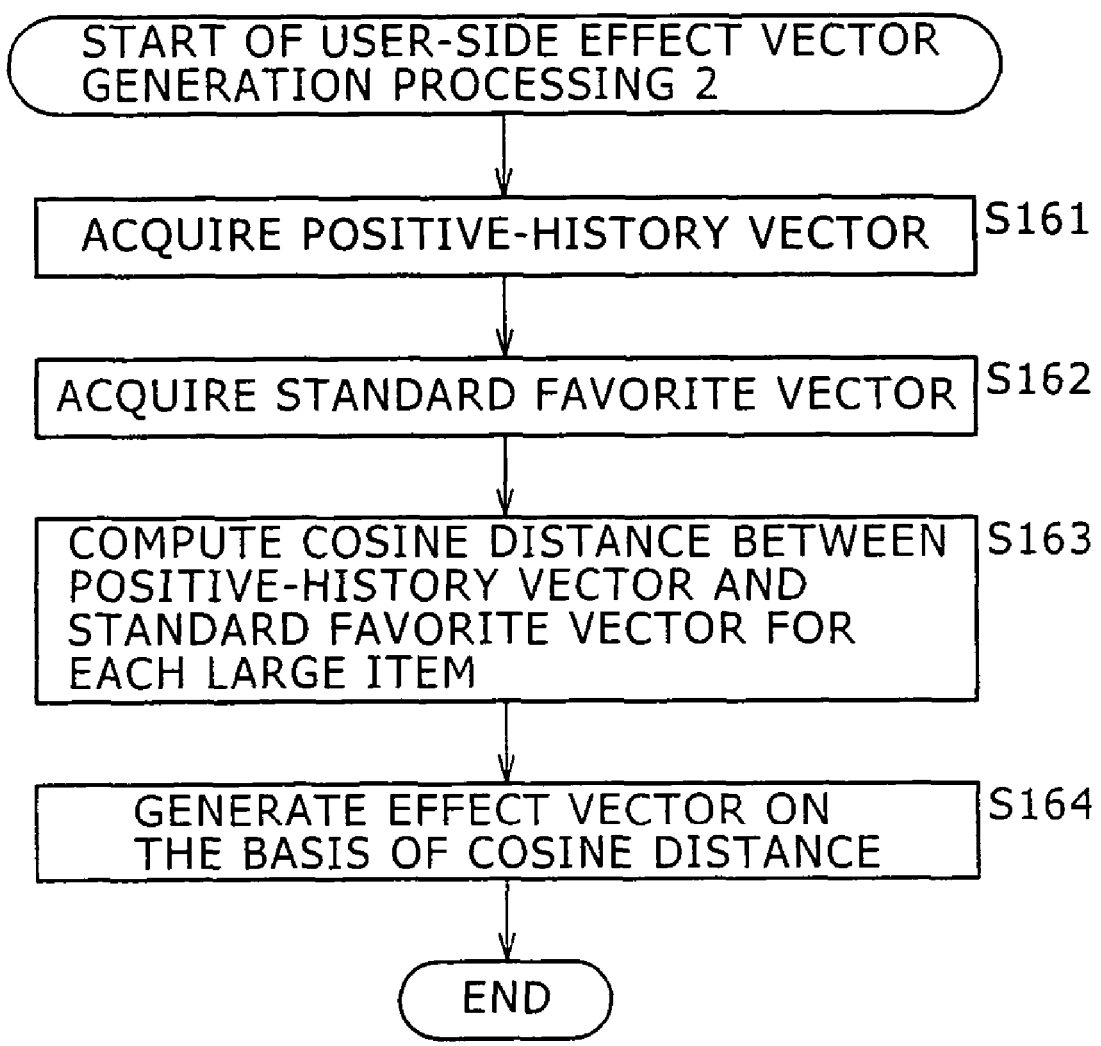
FIG. 23 shows a flowchart referred to in explanation of user-side effect vector generation processing 2.

By referring to a flowchart shown in FIG. 23, the following description explains user-side effect vector generation processing 2 carried out to find a user-side effect vector EfUP to be used in using a discrepancy between a favorite unique to the user and a favorite of the public in general in a matching process by computing cosine distances each showing the degree of similarity between a positive-history vector UP and the favorite of the public in general.

First of all, at a step S161, the user-information-cataloging section 63 employed in the matching-process section 43 acquires a positive-history vector UP stored in the positive-history-saving section 47.

Then, at the next step S162, the user-information-cataloging section 63 acquires a standard favorite vector APP showing a favorite of the public in general.

The standard favorite vector APP may be a vector received from the distribution server 5 or, since effects of the viewing-rate competition make the organization of programs considered as an organization reflecting favorites of the public in general, in the same way as user-side effect vector generation processing 1 explained above by referring to the flowchart shown in FIG. 22, the number of all programs broadcasted during a predetermined period of time may be counted and, if necessary, a normalization process may be carried out to find the standard favorite vector APP.

In the distribution server 5, a standard favorite vector APP may be generated, for example, by using results of a survey of general viewing rates or adopting another method.

Then, at the next S163, the user-information-cataloging section 63 computes a cosine distance between the positive-history vector UP and the standard favorite vector APP for each large item. The longer the cosine distance, the higher the degree of similarity between the positive-history vector UP and the standard favorite vector APP.

Subsequently, at the next step S164, the user-information-cataloging section 63 generates a user-side effect vector EfUP for each large item by finding the reciprocal of the cosine distance computed in the process carried out at the step S163. Finally, the execution of the processing represented by this flowchart is ended. The larger the reciprocal of the cosine distance, the lower the degree of similarity between the positive-history vector UP and the standard favorite vector APP.

By carrying out the processing described above, it is possible to find a user-side effect vector EfUP reflecting a difference between a favorite of the public in general and a favorite unique to the user. By carrying out program recommendation processing by using this user-side effect vector EfUP, it is possible to determine a recommended program emphasizing the difference between a favorite of the public in general and a favorite unique to the user.

In the above description, the program vector PP and the positive-history vector UP are each a vector provided for each large item. It is to be noted, however, that the program vector PP and the positive-history vector UP can also be each a vector having a format including all detailed-item components aligned to form 1 array. Also in this case, it is needless to say that the same processing can be carried out as well.

In addition, the degree of similarity between the positive-history vector UP and the standard favorite vector APP is not only used for computing the effect vector, but also an indicator showing the uniqueness of the user and such an indicator can be directly used in recommendation of a program. For a high degree of similarity between the positive-history vector UP and the standard favorite vector APP, for example, a new program of a fashion oriented for the public can be recommended at the first priority.

As described above by referring to the flowcharts shown in FIGS. 22 and 23, if the user-side effect vector EfUP is found appropriately on the basis of a history of operations carried out by the user in a learning process. However, the user-side effect vector EfUP may also be initially cataloged in advance. As another alternative, as the user-side effect vector EfUP, a value found from experiences may be set in advance.

It is to be noted that the user-side effect vector EfUP can be generated by paying attention not only to large items, but also to detailed items composing each of the large items. Let us assume for example that Performers Pm composing a large item are divided into principal-role and supporting-role performers. A user considering casting of supporting-role performers at a priority higher than casting of principal-role performers in dramas or movies can set a user-side effect vector EfUP for increasing the weights of the supporting-role performers. In another case, let us assume that people such as the director, the producer, the author and the cameraman, who compose the Scriptwriter/Author/Producer element serving as a large item, are distinguished from each other. In this case, a user appreciating the cameraman more highly than the director and the producer may set a use-side user-side effect vector EfUP for increasing the weight of the cameraman.

In addition, the user-side effect vector EfUP can be generated for each genre and used in matching processing to collate a positive-history vector UP for the genre, for which the user-side effect vector EfUP is generated, with program vectors PP as is the case with matching processing 5 explained earlier by referring to the flowchart shown in FIG. 21.

Figure 24:
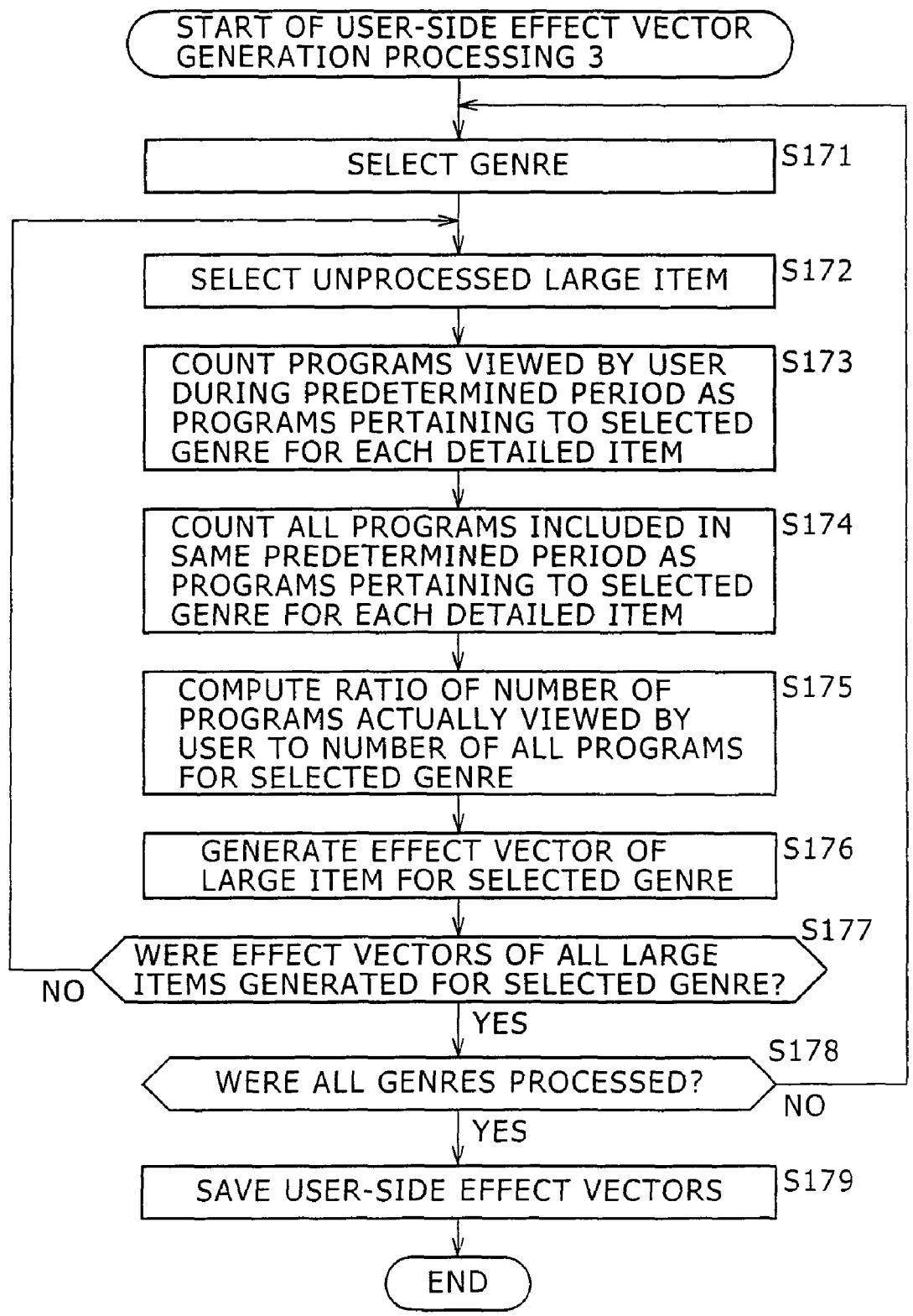
FIG. 24 shows a flowchart referred to in explanation of user-side effect vector generation processing 3.

By referring to a flowchart shown in FIG. 24, the following description explains user-side effect vector generation processing 3 carried out to generate a user-side effect vector EfUP by counting the number of programs viewed by the user in a predetermined period of time for each genre.

First of all, at a step S171, the user-information-cataloging section 63 employed in the matching-process section 43 selects a genre for which the number of programs viewed by the user in a predetermined period of time is to be counted.

Then, at the next step S172, the user-information-cataloging section 63 selects an unprocessed large item of the selected genre.

Subsequently, at the next step S173, by referring to a positive history stored in the positive-history-saving section 47, the user-information-cataloging section 63 detects programs of the selected genre among those viewed by the user in a predetermined period of time such as 1 week, 1 month or 3 months. Then, the user-information-cataloging section 63 requests the program-vector extraction section 42 to extract program vectors PP for the detected programs from the data acquisition section 41 and counts the number of detected programs for each of detailed items composing the genre large item selected in the process carried out at the step S172.

Then, at the next step S174, the user-information-cataloging section 63 requests the program-vector extraction section 42 to extract program vectors PP for all programs viewed by the user in a predetermined period of time as programs pertaining to the selected genre from the data acquisition section 41 and counts the number of such programs for each of detailed items composing the genre large item selected in the process carried out at the step S172.

Subsequently, at the next S175, the user-information-cataloging section 63 computes a ratio of the number of programs actually viewed by the user to the number of all programs for the selected genre by dividing the counting result obtained in the process carried out at the step S173 by the counting result obtained in the process carried out at the step S174.

As described above, effects of the viewing-rate competition make the organization of programs considered as an organization reflecting favorites of the public in general. That is to say, the process to compute the ratio of the number of programs actually viewed by the user to the number of all programs for a selected genre is in other words equivalent a process to normalize the number of programs actually viewed by the user by using the number of all programs as a standard model. A normalized vector found in the process carried out at the step S175 is referred to as a normalized vector D'.

Let us assume for example that the drama genre is selected from large-item genre Gm={Drama, Variety, Sport, Movie, Music, Child program/Education, General culture/Documentary, News/Report, Others}. Let us also assume for example that, for large-item time band Tm={morning, day-time, evening, prime-time, late-at-night} of the program vector PP corresponding to the selected drama genre, the number of all programs broadcasted in 1 week is (10, 35, 7, 53, 17) and the number of programs actually viewed by the user is (5, 0, 0, 8, 4). In this case, the normalized vector is D'=(5/10, 0/35, 0/7, 8/53, 4/17)=(0.5, 0, 0, 0.28, 0.15, 0.24). Thus, a component of the normalized vector D' equal to 1.0 means that all the programs broadcasted in the predetermined period of time for the component have been viewed by the user. On the other hand, a component of the normalized vector D' equal to 0 means that none of the programs broadcasted in the predetermined period of time for the component have been viewed by the user.

Then, at the next step S176, the user-information-cataloging section 63 generates an effect vector of the large item for the selected genre on the basis of the computation result obtained in the process carried out at the step S175.

In order to generate an effect vector, an item of large-item time band Tm={morning, day-time, evening, prime-time, late-at-night} is used to set a standard value. Let us assume for example that a general user views about 20% of drama programs broadcasted in a week during the prime-time band. In this case, the standard value is set at 0.2. Since an effect vector for a large item is computed as relative values, the effect vector may have values in the range 0 to 1. The user-side effect vector thus has relative values computed from the normalized vector D' obtained as a result of the process carried out at the step S175 with the set value used as a reference.

Thus, the effect vector E' of the large-item genre Gm showing a favorite genre of the user is computed to be E'=(0.3, −0.2, −0.2, −0.05, 0.04), which leads to a determination result indicating that the user likes a drama of the morning time band but dislikes a drama of the day-time and evening time bands.

Then, at the next step S177, the user-information-cataloging section 63 determines whether or not effect vectors of all large items have been generated for the selected genre. If the determination result produced in the process carried out at the step S177 indicates that effect vectors of all large items have not been generated for the selected genre, the flow of the processing goes back to the step S172 to again carry out the processes at the step and the subsequent steps.

If the determination result produced in the process carried out at the step S177 indicates that effect vectors of all large items have been generated for the selected genre, on the other hand, the flow of the processing goes on to a step S178 at which the user-information-cataloging section 63 determines whether or not all genres have been processed. If the determination result produced in the process carried out at the step S178 indicates that all genres have not been processed, the flow of the processing goes back to the step S171 to again carry out the processes at the step and the subsequent steps.

If the determination result produced in the process carried out at the step S178 indicates that all genres have been processed, on the other hand, the flow of the processing goes on to a step S179 at which the user-information-cataloging section 63 stores the effect vectors of all the large items and ends the execution of the processing.

By carrying out the processing described above, it is possible to find a difference between a favorite of the public in general and a favorite unique to the user for each genre. In addition, by recalculating the user-side effect vector EfUP for every predetermined period of time such as 3 months or half a year, it is possible to recommend a program reflecting a favorite of the user in a real-time manner as is the case with the processing explained earlier by referring to the flowchart shown in FIG. 22.

In addition, also in the processing described above by referring to the flowchart shown in FIG. 24, the user-side effect vector EfUP is found on the basis of programs viewed by the user during a predetermined period of time such as 1 week, 1 month or 3 months. However, programs used as the basis for computing the user-side effect vector EfUP can be viewed during a plurality of periods of time such as short, intermediate and long periods of time as is the case with the processing explained earlier by referring to the flowchart shown in FIG. 22. In this case, the user-side effect vector EfUP is found on the basis of programs viewed by the user during each of the periods of time and the user-side effect vectors EfUP are used for determining recommendation information.

On the top of that, also in the processing described above by referring to the flowchart shown in FIG. 24, in place of all broadcasted programs, only the number of programs broadcasted during a specific predetermined period of time in which the user most views programs is counted. An example of such a specific period of time is the so-called prime-time from 18:00 to 22:00.

Figure 25:
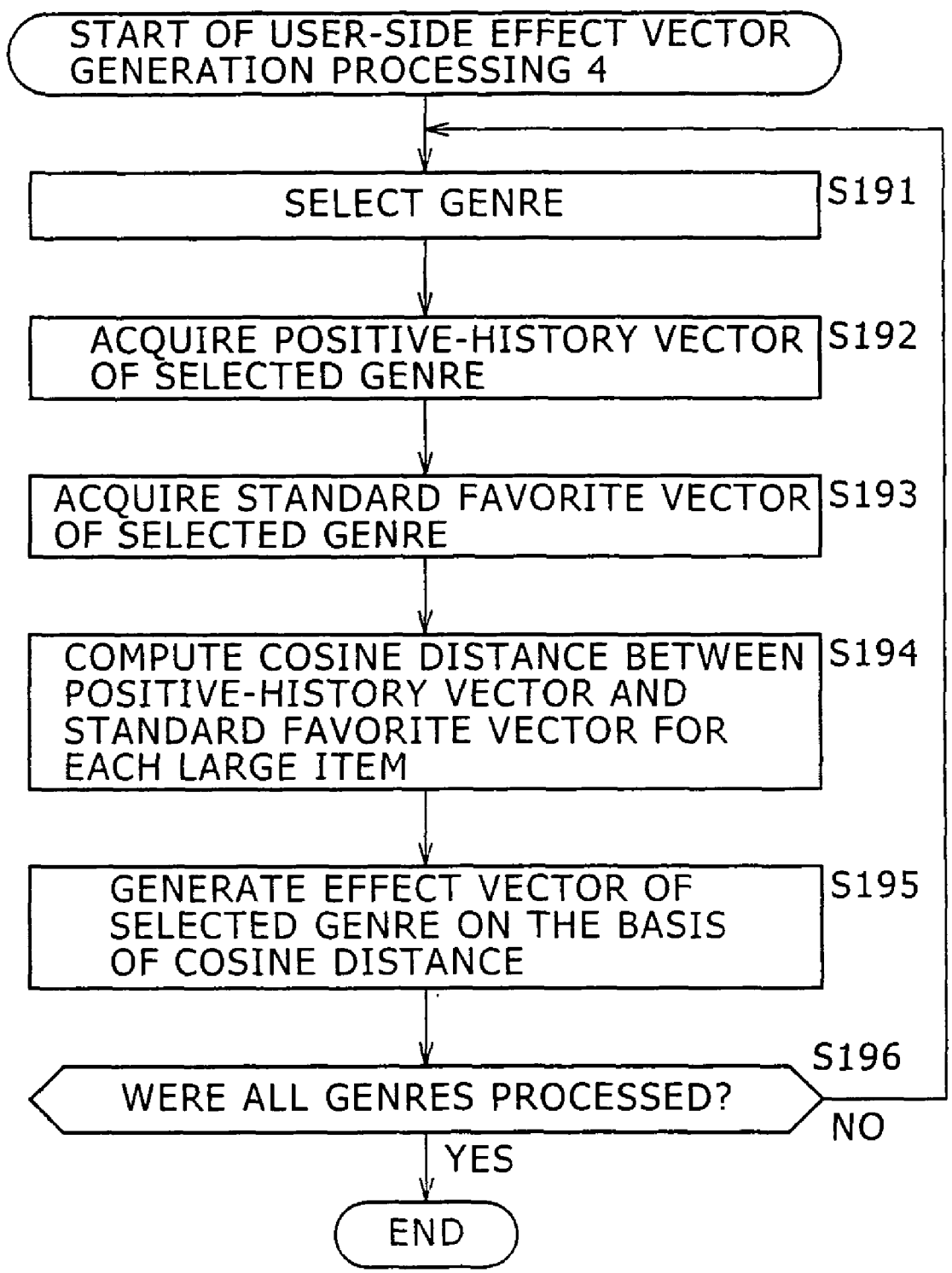
FIG. 25 shows a flowchart referred to in explanation of user-side effect vector generation processing 4.

By referring to a flowchart shown in FIG. 25, the following description explains user-side effect vector generation processing 4 carried out to find a user-side effect vector EfUP to be used in using a discrepancy between a favorite unique to the user and a favorite of the public in general in a matching process by computing cosine distances each showing the degree of similarity between a positive-history vector UP and the favorite of the public in general for each genre.

First of all, at a step S191, the user-information-cataloging section 63 employed in the matching-process section 43 selects a genre for which this processing is to be carried out.

Then, at the next step S192, the user-information-cataloging section 63 acquires a positive-history vector UP of the selected genre from positive-history vectors UP stored in the positive-history-saving section 47.

Subsequently, at the next step S193, the user-information-cataloging section 63 acquires a standard favorite vector APP of the selected genre from standard favorite vectors APP each showing a favorite of the public in general.

As described earlier, a standard favorite vector APP may be a vector received from the distribution server 5 or, since effects of the viewing-rate competition make the organization of programs considered as an organization reflecting favorites of the public in general, in the same way as user-side effect vector generation processing 3 explained above by referring to the flowchart shown in FIG. 24, the number of all programs broadcasted during a predetermined period of time for each genre may be counted and, if necessary, a normalization process may be carried out to find the standard favorite vector APP.

In the distribution server 5, a standard favorite vector APP may be generated, for example, by using results of a survey of general viewing rates or by adoption of another method.

Then, at the next step S194, the user-information-cataloging section 63 computes a cosine distance between the positive-history vector UP of the selected genre and the standard favorite vector APP of the selected genre for each large item by using the positive-history vector UP and the standard favorite vector APP for each large item. The longer the cosine distance, the higher the degree of similarity between the positive-history vector UP and the standard favorite vector APP.

Subsequently, at the next step S195, the user-information-cataloging section 63 generates a user-side effect vector EfUP for each large item by finding the reciprocal of the cosine distance computed in the process carried out at the step S194. The larger the reciprocal of the cosine distance, the lower the degree of similarity between the positive-history vector UP and the standard favorite vector APP.

Then, at the next step S196, the user-information-cataloging section 63 determines whether or not all genres have been processed. If the determination result produced in the process carried out at the step S196 indicates that all genres have not been processed, the flow of the processing goes back to the step S191 to again carry out the processes at the step and the subsequent steps. If the determination result produced in the process carried out at the step S196 indicates that all genres have been processed, on the other hand, the execution of the processing represented by this flowchart is ended.

By carrying out the processing described above, it is possible to find a user-side effect vector EfUP reflecting a difference between a favorite of the public in general and a favorite unique to the user for each genre.

In addition, in the same way as the processing explained earlier by referring to the flowchart shown in FIG. 23, the user-information-cataloging section 63 may generate a user-side negative-effect vector EfMUP for each large item by finding the reciprocal of a computed degree of similarity between the negative-history vector MUP and the standard favorite vector APP.

Figure 26:
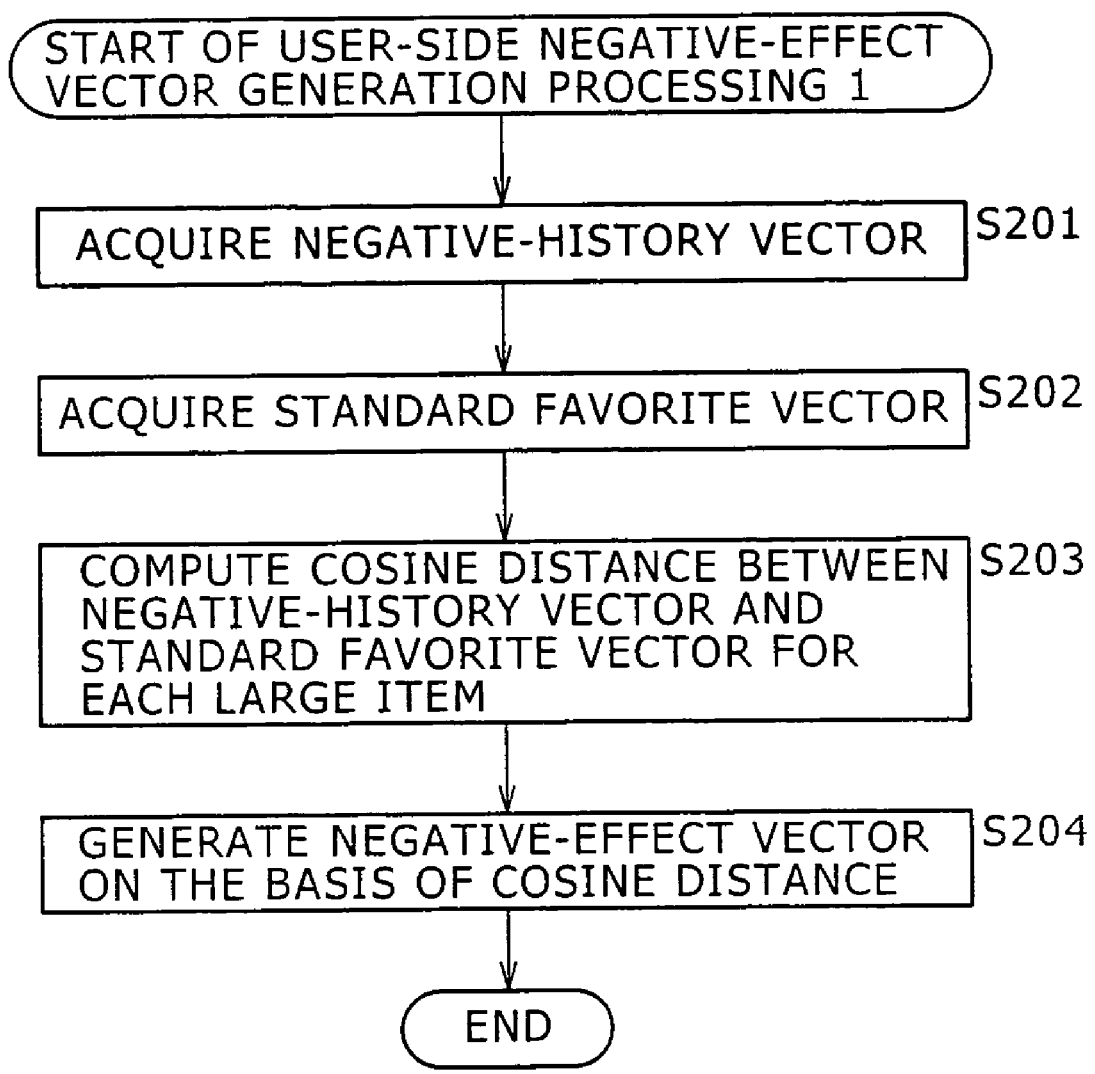
FIG. 26 shows a flowchart referred to in explanation of user-side negative-effect vector generation processing 1.

By referring to a flowchart shown in FIG. 26, the following description explains user-side negative-effect vector generation processing 1 carried out to find a user-side negative-effect vector EfMUP by comparison of a negative-history vector MUP with a favorite of the public in general.

First of all, at a step S201, the user-information-cataloging section 63 employed in the matching-process section 43 acquires a negative-history vector MUP stored in the negative-history-saving section 48.

Then, at the next step S202, the user-information-cataloging section 63 acquires a standard favorite vector APP showing a favorite of the public in general.

The standard favorite vector APP may be a vector received from the distribution server 5. As an alternative, since effects of the viewing-rate competition make the organization of programs considered as an organization reflecting favorites of the public in general, in the same way as user-side effect vector generation processing 1 explained above by referring to the flowchart shown in FIG. 22, the number of all programs broadcasted during a predetermined period of time may be counted and, if necessary, a normalization process may be carried out to find the standard favorite vector APP.

Subsequently, at the next step S203, the user-information-cataloging section 63 computes a cosine distance between the negative-history vector MUP and the standard favorite vector APP for each large item. The longer the cosine distance, the higher the degree of similarity between the negative-history vector MUP and the standard favorite vector APP.

Subsequently, at the next step S204, the user-information-cataloging section 63 generates a user-side negative-effect vector EfMUP for each large item by finding the reciprocal of the cosine distance computed in the process carried out at the step S203. Then, the execution of the processing represented by this flowchart is ended.

By carrying out the processing described above, a user-side negative-effect vector EfMUP can be generated. Thus, programs disliked by the user can be excluded effectively from a list of recommended programs.

Figure 27:
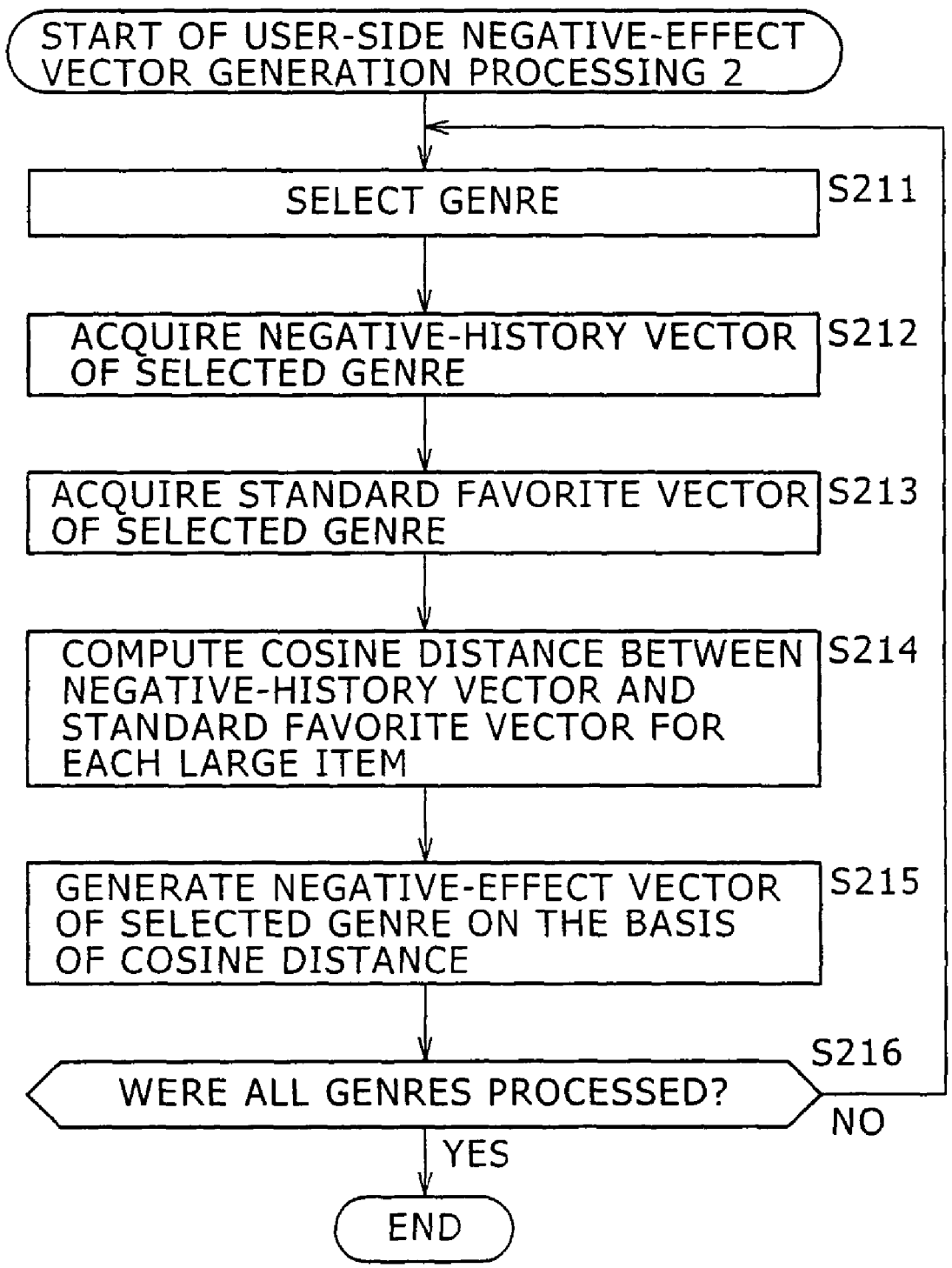
FIG. 27 shows a flowchart referred to in explanation of user-side negative-effect vector generation processing 2.

By referring to a flowchart shown in FIG. 27, the following description explains user-side negative-effect vector generation processing 2 carried out to find a user-side negative-effect vector EfMUP for each genre.

First of all, at a step S211, the user-information-cataloging section 63 employed in the matching-process section 43 selects a genre for which processes are to be carried out at the following steps.

Then, at the next step S212, the user-information-cataloging section 63 acquires one of negative-history vectors MUP from those stored in the negative-history-saving section 48 as a negative-history vector MUP for the selected genre.

Subsequently, at the next step S213, the user-information-cataloging section 63 acquires one of standard favorite vectors APP each showing a favorite of the public in general as a standard favorite vector APP for the selected genre.

Then, at the next step S214, the user-information-cataloging section 63 computes a cosine distance between the negative-history vector MUP for the selected genre and the standard favorite vector APP for the selected genre for each large item on the basis of the negative-history vector MUP and the standard favorite vector APP. The longer the cosine distance, the higher the degree of similarity between the negative-history vector MUP and the standard favorite vector APP.

Subsequently, at the next step S215, the user-information-cataloging section 63 generates a user-side negative-effect vector EfMUP for each large item by finding the reciprocal of the cosine distance computed in the process carried out at the step S214. The larger the reciprocal of the cosine distance, the lower the degree of similarity between the negative-history vector MUP and the standard favorite vector APP.

Then, at the next step S216, the user-information-cataloging section 63 determines whether or not all genres have been processed. If the determination result produced in the process carried out at the step S216 indicates that all genres have not been processed, the flow of the processing goes back to the step S211 to again carry out the processes at the step and the subsequent steps. If the determination result produced in the process carried out at the step S216 indicates that all genres have been processed, on the other hand, the execution of the processing represented by this flowchart is ended.

By carrying out the processing described above, a user-side negative-effect vector EfMUP can be generated for each genre. Thus, programs disliked by the user can be excluded effectively from a list of recommended programs.

It is to be noted that the user-side effect vector EfUP and the user-side negative-effect vector EfMUP can also be found as n times the cosine-distance reciprocals found for each large item in the pieces of processing explained earlier by referring to the flowcharts shown in FIGS. 23 and 25 to 27. As an alternative, a value obtained by truncation of a predetermined number of digits from the reciprocals of the cosine distances on the basis of the rounding-off technique can also be used as the user-side effect vector EfUP or the user-side negative-effect vector EfMUP. As another alternative, the user-side effect vector EfUP and the user-side negative-effect vector EfMUP can each be found as a result of subtracting the corresponding reciprocal of the cosine distance from 1. As a further alternative, the user-side effect vector EfUP and the user-side negative-effect vector EfMUP can each be found as n times the result of subtracting the corresponding reciprocal of the cosine distance from 1.

In the above description, the program vector PP and the negative-history vector MUP are each a vector for each large item. It is to be noted, however, that the program vector PP and the negative-history vector MUP can also be each a vector having a format including all detailed-item components aligned to form 1 array. Also in this case, it is needless to say that the same processing can be carried out as well.

In addition, a program vector PP extracted by the program-vector extraction section 42 may have a group ID or cluster code appended thereto as information showing a group to which a program corresponding to the program vector PP pertains. As described above, the group ID and the cluster code are generated by carrying out the pieces of processing represented by the flowcharts shown in FIGS. 7 and 8 respectively.

If programs that the user enjoys viewing form a serial drama and all the programs forming the serial drama are to be recommended, for example, the amount of processing to recommend the programs can be reduced. The amount of the recommendation processing can also be reduced by recommending a program in the same group at the first priority as a program liked very much by the user.

Figure 28:
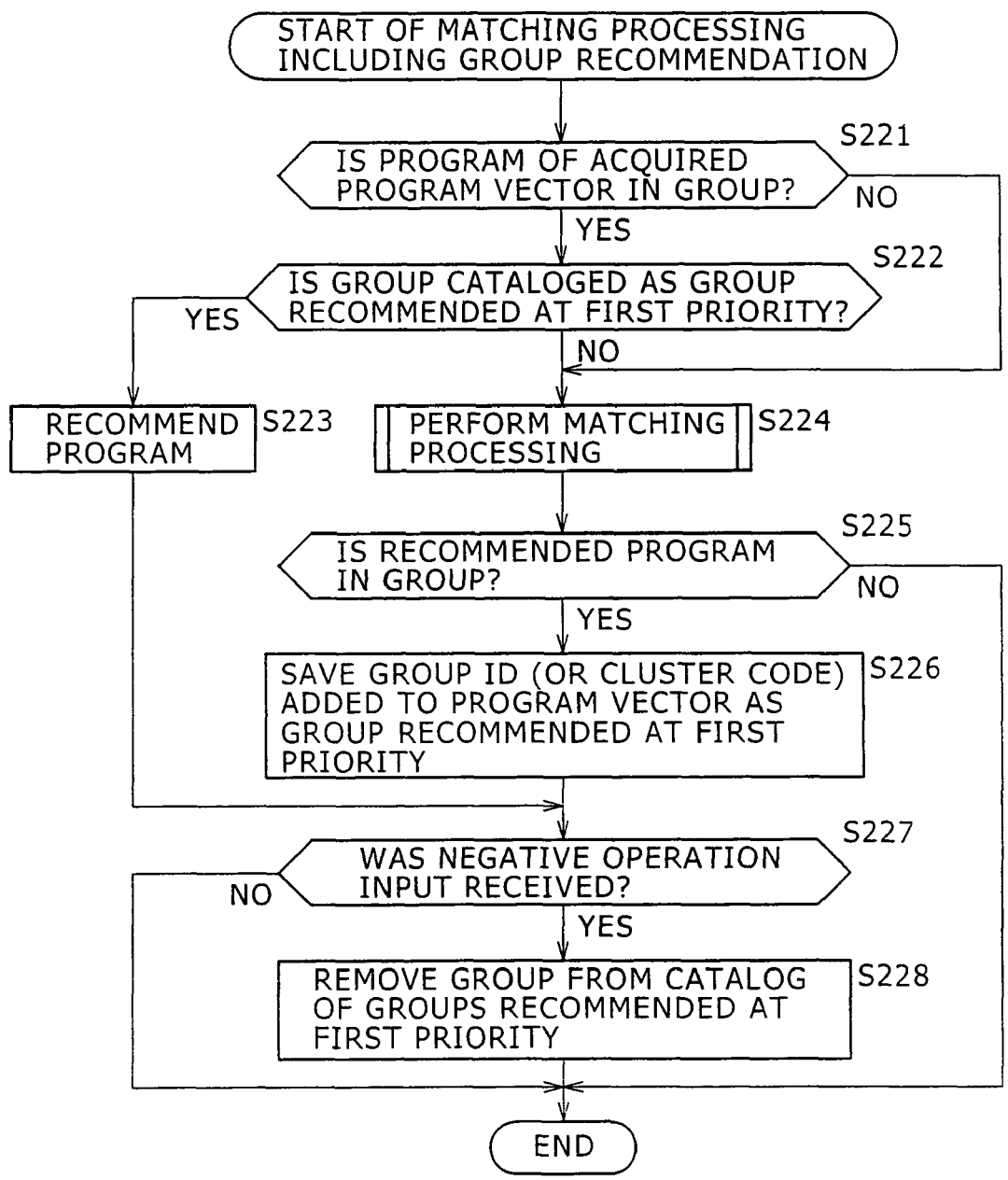
FIG. 28 shows a flowchart referred to in explanation of matching processing including group recommendation.

Next, matching processing including recommendation of a group is explained by referring to a flowchart shown in FIG. 28.

First of all, at a step S221, the vector-operation section 62 employed in the matching-process section 43 determines whether or not a program vector PP extracted by the program-vector extraction section 42 has information attached thereto to identify a group in order to determine whether or not a program associated with the program vector PP pertains to the group. As described earlier, examples of the information attached to a program vector PP to identify a group are a group ID and a cluster code.

If the determination result produced in the process carried out at the step S221 indicates that the program vector PP has information attached thereto to identify a group, the flow of the processing goes on to a step S222 at which the vector-operation section 62 determines whether or not the group indicated by the group ID or the cluster code has been cataloged in the user-information-cataloging section 63 as a group recommended at the first priority.

If the determination result produced in the process carried out at the step S222 indicates that the group indicated by the group ID or the cluster code has been cataloged in the user-information-cataloging section 63 as a group recommended at the first priority, the flow of the processing goes on to a step S223 at which the vector-operation section 62 supplies information on the program associated with the program vector PP to the recommendation-information output section 49 as recommendation information. The recommendation-information output section 49 catalogs a recommended program suggested by the recommendation information in the recommended-program list 50 and outputs information on the recommended program to the television display apparatus 11 or the recording/reproduction apparatus 12. Then, the flow of the processing goes on to a step S227 to be described later.

If the determination result produced in the process carried out at the step S221 indicates that the program vector PP does not have information attached thereto to identify a group or the determination result produced in the process carried out at the step S222 indicates that the group indicated by the group ID or the cluster code has not been cataloged in the user-information-cataloging section 63 as a group recommended at the first priority, on the other hand, the flow of the processing goes on to a step S224 to carry out any one of matching processing 1 to matching processing 5 explained earlier by referring to the flowcharts shown in FIGS. 17 to 21 respectively.

Then, at the next step S225, the vector-operation section 62 determines whether or not a program recommended in any one of matching processing 1 to matching processing 5, which has been carried out at the step S224, pertains to a group by determining whether or not a program vector PP of the recommended program has information attached thereto to identify the group. As described earlier, examples of the information attached to a program vector PP to identify a group are a group ID and a cluster code. If the determination result produced in the process carried out at the step S225 indicates that the recommended program does not pertain to a group, the execution of the processing represented by this flowchart is ended.

If the determination result produced in the process carried out at the step S225 indicates that the recommended program pertains to a group, on the other hand, the flow of the processing goes on to a step S226 at which the vector-operation section 62 saves the group ID (or the cluster code) added to the program vector PP as a group recommended at the first priority in the user-information-cataloging section 63.

After the process carried out at the step S223 or S226 is ended, the flow of the processing goes on to a step S227 at which the vector-operation section 62 refers to a log of operations stored in the negative-history-saving section 48 as operations treated as a negative history to determine whether or not an operation input regarded as a negative history has been received. The operation input examined in the process carried out at the step S227 is an operation input entered for a program recommended in the process carried out at the step S223 or a program cataloged in the process carried out at the step S226 as a group recommended at the first priority. This is because the program cataloged in the process carried out at the step S226 is a grouped one among programs recommended in the process carried out at the step S224. Examples of the operation input regarded as a negative history are a command entered by the user to make a request for viewing of another program or recording of another program because the user does not like the recommended program or a request to erase a recorded program prior to reproduction of the recorded program.

If the determination result produced in the process carried out at the step S227 indicates that an operation input regarded as a negative history has not been received, the execution of the processing represented by this flowchart is ended.

If the determination result produced in the process carried out at the step S227 indicates that an operation input regarded as a negative history has been received, on the other hand, the flow of the processing goes on to a step S228 at which the vector-operation section 62 removes the group including the target program from a catalog stored in the user-information-cataloging section 63 as a catalog of groups recommended at the first priority.

It is to be noted that, by carrying out title-grouping processing 1 explained earlier by referring to the flowchart shown in FIG. 9, a plurality of group IDs may be assigned to one program vector PP in some cases. Specially, in such cases, in the process carried out at the step S228, all the group IDs may be removed from a catalog stored in the user-information-cataloging section 63 as a catalog of groups recommended at the first priority in accordance with an operation input regarded as a negative history. As an alternative, operation inputs each regarded as a negative history are accumulated and, when as many operation inputs each regarded as a negative history as a predetermined number has been entered by the user, all the group IDs may be removed from a catalog stored in the user-information-cataloging section 63 as a catalog of groups recommended at the first priority. In addition, this feature can be adopted for a case in which a program vector PP is associated with a group ID on a one-with-one basis.

By carrying out the processing described above, it is possible to recommend all programs of a serial drama which the user enjoys viewing and recommend a program pertaining to the same group as a program the user likes very much, so that the operation processing for the recommendation can be reduced.

In the matching processing including recommendation of a group as described above, a positive-history vector UP and a negative-history vector MUP can also be generated for a corresponding group on the basis of a user operation history acquired from the television display apparatus 11 or the recording/reproduction apparatus 12.

In addition, on the basis of positive histories detected among user operation histories acquired from the television display apparatus 11 or the recording/reproduction apparatus 12, the number of operations to view the same serial drama or to make a reservation for recording of the serial drama can be counted and, as the resulting count exceeds a predetermined value, the serial drama can be recommended at the first priority without specially carrying out the matching processing.

On the top of that, instead of carrying out the processing to recommend a program on the basis of a user history, a user model may be set on the basis of a topic set in advance by the user and, on the basis of the user model, the processing to recommend a program may be performed.

A user model is obtained by extracting a program corresponding to a topic set by the user in advance through a filtering process using a topic. The initial-catalog storage section 45 is a section used for storing a topic entered by the user. A plurality of topics may be stored in the initial-catalog storage section 45. In addition, the user may properly update a topic by carrying out an operation. The vector-operation section 62 extracts program vectors PP each including a topic stored in the initial-catalog storage section 45 from program vectors PP supplied by the program-vector extraction section 42 as program vectors PP for programs each used for creation of a user model. Then, the vector-operation section 62 finds a sum of the extracted program vectors PP and, if necessary, normalizes the sum in order to generate a user-model vector. Finally, the vector-operation section 62 stores the user-model vector in the user-information-cataloging section 63.

Let us assume for example that, as a topic, the user specifies time band Hm="after 11 PM" and genre Gm="variety". In this case, a filtering process is carried out by using the topic to generate a user model of "a variety of late at night". The user model of "a variety of late at night" includes comedians performing in variety programs broadcasted in a late-at-night time frame after 23:00 as configuration elements. Thus, for example, a program showing the performers is extracted as a recommended program in matching processing from programs of a genre different from the variety genre. An example of a genre different from the variety genre is a drama genre. As a result, in comparison with the matching processing carried out for each item, as a favorite of the user, a program far beyond consideration of the genre can be determined.

It is to be noted that programs each used for creation of a user model can be typically all programs broadcasted in a predetermined period of time or a set of programs broadcasted in a predetermined time band such as the so-called prime-time.

In addition, for example, under the same filtering condition, a filtering process is carried out on different sets of programs in order to generate a user-model vector corresponding in detail to each of different program organizations such as program organizations of different times of year and program organizations of different time bands.

To put it concretely, even for the same condition such as "genre Gm=music", the program organization at the present day has broadcasting times and performer, which are different from those of the program organization of 10 years ago. Thus, a user model of "music fans at the present day" can be generated as a user model different from a user model of "music fans of 10 years ago". As a result, it is possible to recommend a drama or a movie starring a pops singer, whom "the music fans of 10 years ago" enjoyed listening to, as an actor. In addition, it is also possible to recommend a program in which a singer at the present day sings a song, which "the music fans of 10 years ago" enjoyed listening to.

In addition, even for the same condition such as "genre Gm=music", a filtering process can be carried out to obtain different sets of programs for a time band in which mainly full members of society view programs and a time band in which mainly children view programs. Thus, different user models can be generated. Typically, the time band for full members of society is from 20:00 to 24:00 while the time band for mainly children is from 15:00 to 20:00.

Then, the vector-operation section 62 computes a degree of similarity between a program vector PP supplied by the program-vector extraction section 42 and a user-model vector cataloged in the user-information-cataloging section 63. Subsequently, on the basis of the computation result, the vector-operation section 62 generates recommendation information and supplies the information to the recommendation-information output section 49. The recommendation-information output section 49 catalogs the recommendation information in the recommended-program list 50 and supplies the information to the television display apparatus 11 or the recording/reproduction apparatus 12.

Figure 29:
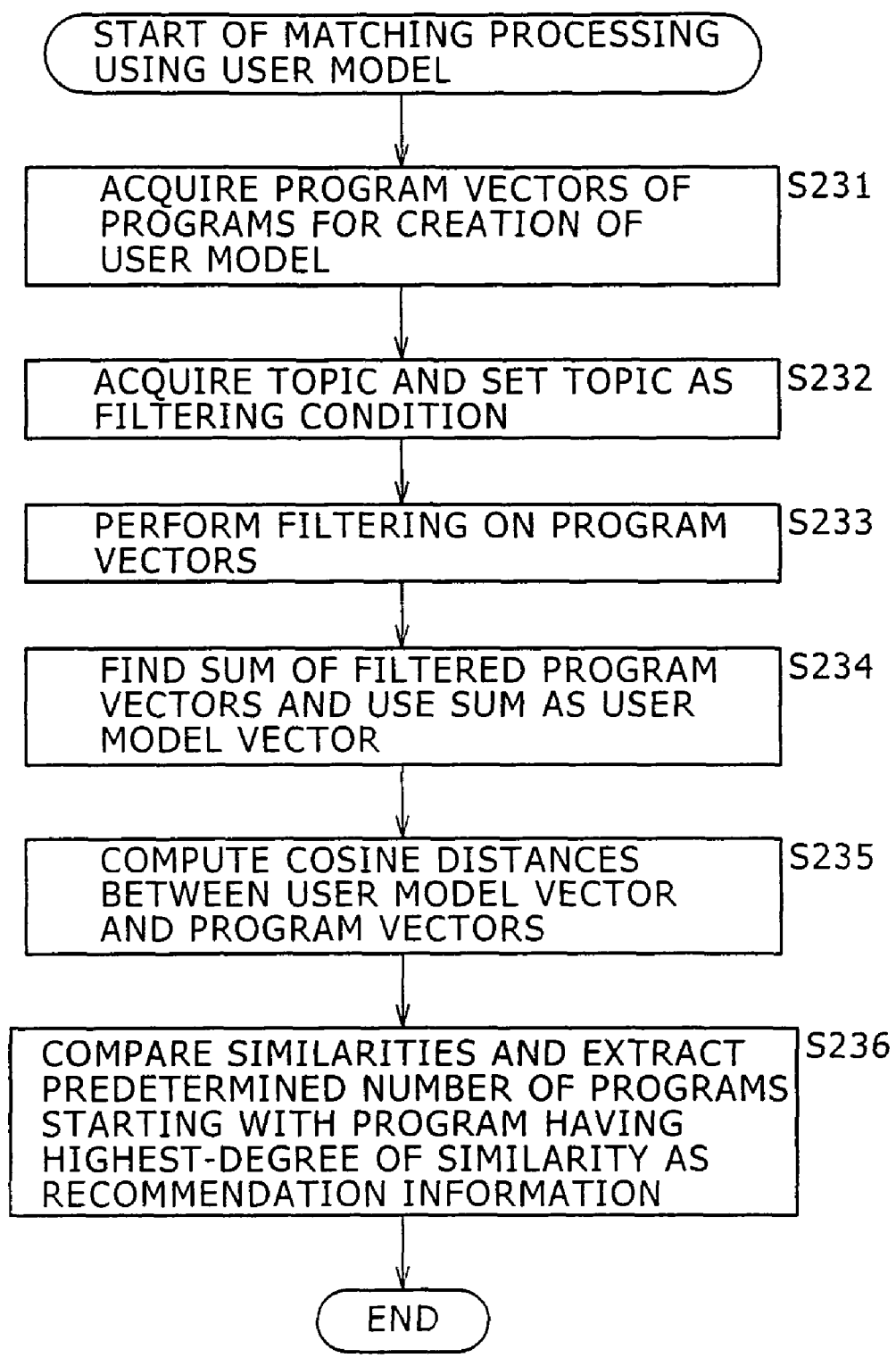
FIG. 29 shows a flowchart referred to in explanation of matching processing using a user model.

Next, matching processing using a user model is explained by referring to a flowchart shown in FIG. 29.

First of all, at a step S231, the vector-operation section 62 employed in the matching-process section 43 acquires program vectors PP of programs for creation of a user model from the program-vector extraction section 42, which has extracted the program vectors PP. The programs for creation of a user model can be programs broadcasted during a predetermined period of time such as a period having a length of 1 month or 3 months. As an alternative, the programs for creation of a user model can be programs broadcasted during predetermined time bands such as prime-times in the predetermined period of time. As another alternative, the programs for creation of a user model can be programs broadcasted during a predetermined period of time in the past such as 10 or 20 years ago.

Then, at the next step S232, the initial-catalog storage section 45 acquires a topic entered by the user by operating the operation input section 44, and saves the topic. The vector-operation section 62 reads out the topic from the initial-catalog storage section 45 and sets the topic as a filtering condition. For example, a filtering condition may be described as a hash table.

Subsequently, at the next step S233, the vector-operation section 62 carries out a filtering process on the program vectors PP acquired in the process carried out at the step S231 on the basis of the filtering condition set in the process carried out at the step S232 in order to extract program vectors PP matching the filtering condition. For example, programs each used for creation of a user model are all programs broadcasted in the past period of 3 months. In this case, the vector-operation section 62 carries out a filtering process on the program vectors PP for the past period of 3 months on the basis of a filtering condition of "title Tm or genre Gm=soccer".

Then, at the next step S234, the vector-operation section 62 finds a sum of program vectors PP output by the filtering process carried out at the step S233, and use the sum as a user-model vector. For example, the vector-operation section 62 carries out a filtering process on the program vectors PP on the basis of a filtering condition of "title Tm or genre Gm=soccer". In this case, a user-model vector of a user model "soccer fans" is generated.

Subsequently, at the next step S235, the vector-operation section 62 computes cosine distances between the user-model vector generated in the process carried out at the step S234 and the program vectors PP extracted by the program-vector extraction section 42. The program vectors PP are program vectors PP of programs each serving as a candidate for recommendation information, that is, programs to be broadcasted later.

Then, at the next step S236, the vector-operation section 62 examines the degrees of similarity, which have each been found in the process carried out at the step S235 as a cosine distance between the program vector PP of a program serving as a candidate for recommendation information and the user-model vector, by comparing the degrees of similarity with each other. On the basis of results of the examination, the vector-operation section 62 then extracts a predetermined number of short-distance program vectors PP starting with a vector having the highest degree of similarity as pieces of recommendation information and supplies the pieces of recommendation information to the recommendation-information output section 49. The recommendation-information output section 49 catalogs the pieces of recommendation information in the recommended-program list 50 and supplies the information to the television display apparatus 11 or the recording/reproduction apparatus 12, and the processing is ended.

By carrying out the processing described above, a program matching a topic set by the user can be recommended even if a history of operations carried out by the user does not exist. In addition, in the past, in a filtering process carried out on the basis of a filtering condition of "title Tm or genre Gm=soccer", for example, a variety program or drama starring a soccer player could not be extracted. In the processing explained earlier by referring to the flowchart shown in FIG. 29, on the other hand, by setting a user model based on a topic of "title Tm or genre Gm=soccer", a variety program or drama starring a soccer player can be extracted as recommendation information even if the program does not match the condition of "title Tm or genre Gm=soccer". This is because contents and performers, which are items composing a user-model vector, include a large number of soccer players.

In the processing described above, a cosine distance between a user-model vector and a program vector PP is found as a degree of similarity. However, a degree of similarity can also be found as a sum of cosine distances each computed for a large item.

It is to be noted that the processing to generate a user-model vector can also be carried out in the distribution server 5. In this case, the processes of the steps S231 to S234 of the flowchart shown in FIG. 29 are carried out by using program vectors PP generated typically by the program-vector generation section 23 explained earlier by referring to FIG. 2.

In addition, besides recommendation of a program matching a favorite of the user, by selecting a program having a low degree of similarity between the program vector PP and the positive-history vector UP as well as a low degree of similarity between the program vector PP and the negative-history vector MUP, the probability that a program neither liked nor disliked by the user is recommended becomes higher. That is to say, the probability that a program having a characteristic not viewed before by the user is recommended becomes higher. In other words, the probability that a program rejected by the user without even having tried the program is recommended becomes higher. In order to carry forward a learning process by extracting a favorite of the user, it is important to evaluate a program having a characteristic not viewed before by the user.

Thus, an unpredictable quality is given to a recommendation result presented to the user. As a result, it is possible not only to lead to enrichment of interests of the user, but also to obtain history information of very much importance to recommendation of a program better matching a favorite of the user.

Figure 30:
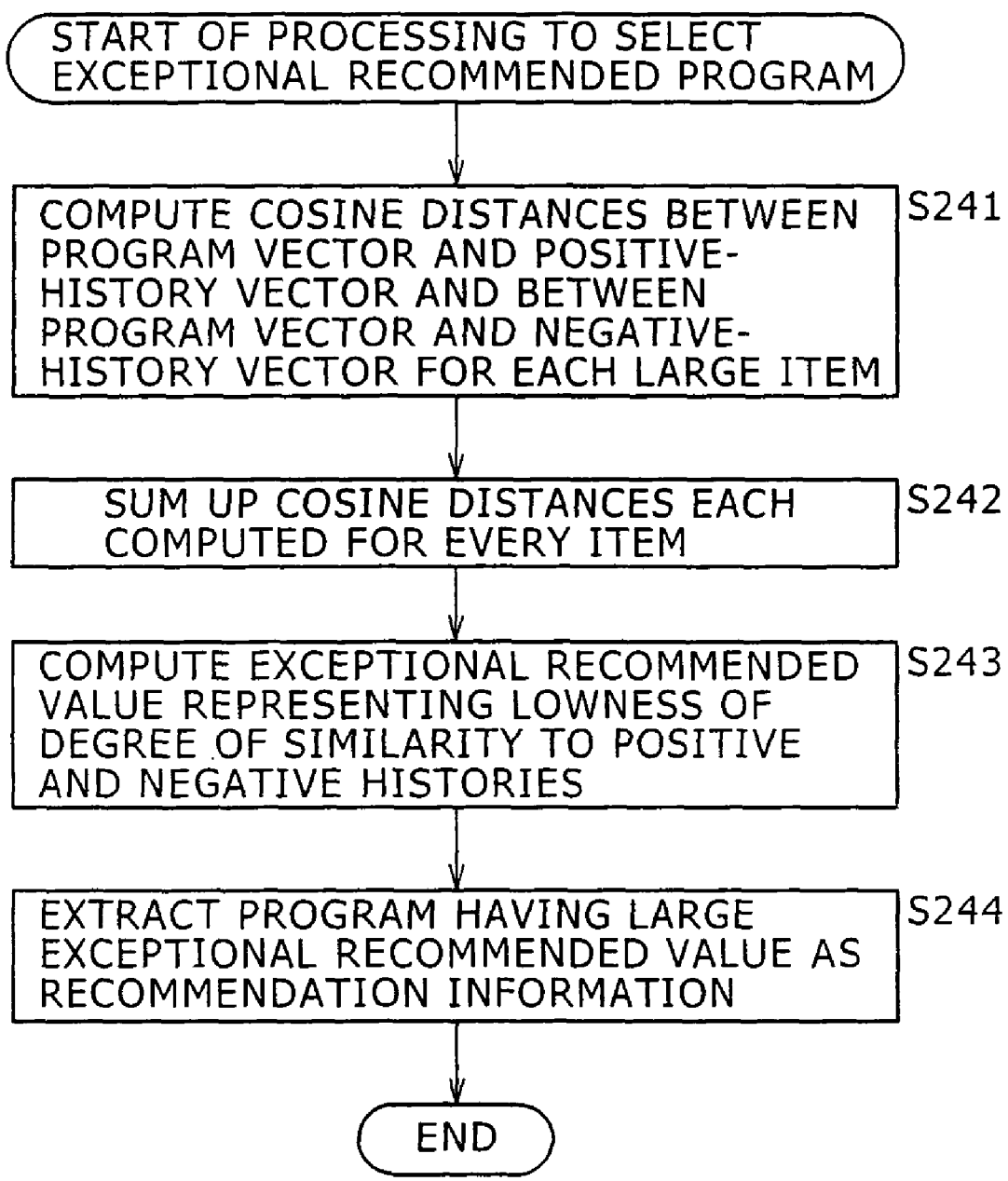
FIG. 30 shows a flowchart referred to in explanation of exceptional recommendation processing.

Next, exceptional recommended program selection processing carried out to identify exceptional recommended programs is explained by referring to a flowchart shown in FIG. 30.

First of all, at a step S241, the vector-operation section 62 employed in the matching-process section 43 uses program vectors PP supplied by the program-vector extraction section 42, a positive-history vector UP stored in the positive-history-saving section 47 and a negative-history vector MUP stored in the negative-history-saving section 48 to compute cosine distances between the program vectors PP and the positive-history vector UP as well as between the program vectors PP and the negative-history vector MUP for each large item.

Then, at the next step S242, the vector-operation section 62 finds a sum of the cosine distances each computed for every item on the positive-history side and a sum of the cosine distances each computed for every item on the negative-history side. That is to say, the processes carried out at the steps S241 and S242 produce a degree of similarity SimUP between the program vectors PP and the positive-history vector UP as well as a degree of similarity SimMUP between the program vectors PP and the negative-history vector MUP for each large item.

Subsequently, at the next step S243, the vector-operation section 62 computes an exceptional recommended value representing the lowness of the degree of similarity between the program vectors PP and the positive-history vector UP as well as the lowness of the degree of similarity between the program vectors PP and the negative-history vector MUP.

To put it concretely, the exceptional recommended value can be expressed by an expression of $(1-\text{SimUp}) \times (1-\text{SimMUP})$ or $(1/\text{SimUp}) \times (1/\text{SimMUP})$.

Then, at the next step S244, the vector-operation section 62 extracts programs each having a large exceptional recommended value as recommendation information on the basis of computation results produced by the process carried out at the step S243. Finally, the execution of the processing represented by this flowchart is ended.

By carrying out the processing described above, a program having characteristics not viewed by the user so far can be extracted as a recommended program. Thus, an unpredictable quality is given to selection of a program to be recommended to the user. As a result, it is possible not only to lead to enrichment of interests of the user, but also to obtain history information of very much importance to recommendation of a program better matching a favorite of the user.

By carrying out the pieces of processing explained so far by referring to FIGS. 13 to 30, the program-recommendation process apparatus 10 is capable of generating recommendation information to be supplied to the television display apparatus 11 or the recording/reproduction apparatus 12.

The television display apparatus 11 or the recording/reproduction apparatus 12 also receives a broadcast signal, which is captured as a satellite wave or a ground wave and decoded by the television reception apparatus 4.

In accordance with an operation carried out by the user, the television display apparatus 11 displays a broadcast signal received from the television reception apparatus 4 or reproduced data received from the recording/reproduction apparatus 12. In addition, on the basis of recommendation information received from the program-recommendation process apparatus 10, the television display apparatus 11 displays information on a recommended program and carries out a process to automatically set a channel. On the top of that, the television display apparatus 11 supplies an operation log to the program-recommendation process apparatus 10.

On the other hand, in accordance with an operation carried out by the user, the recording/reproduction apparatus 12 records a broadcast signal received from the television reception apparatus 4 or makes a reservation for recording and, on the basis of recommendation information received from the program-recommendation process apparatus 10, the recording/reproduction apparatus 12 automatically records a recommended program. In addition, the recording/reproduction apparatus 12 reproduces a program from a mounted or embedded recording medium and displays the reproduced program on the television display apparatus 11. On the top of that, the recording/reproduction apparatus 12 supplies an operation log to the program-recommendation process apparatus 10.

Figure 31:
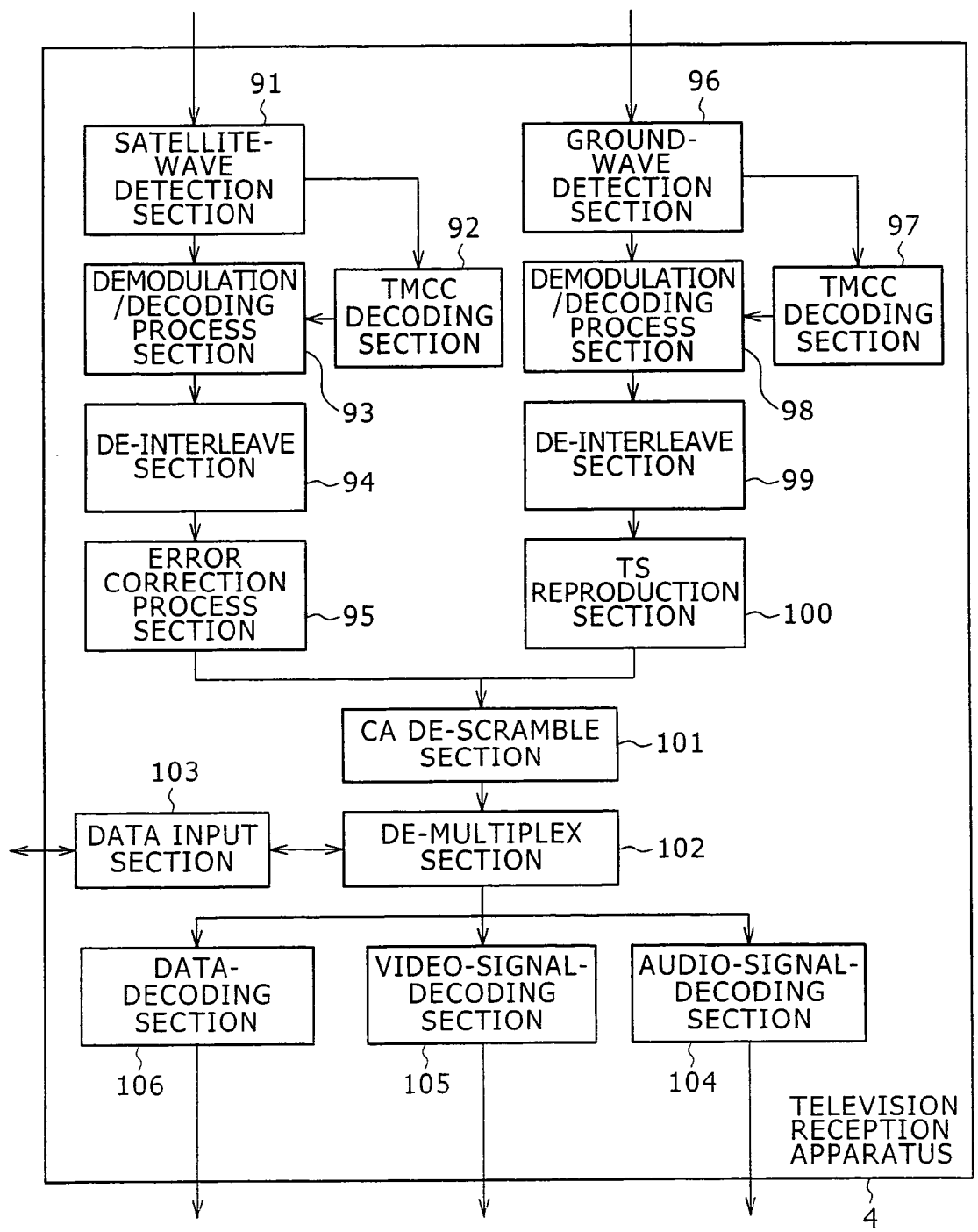
FIG. 31 is a block diagram showing the configuration of a television reception apparatus shown in FIG. 1.

FIG. 31 is a block diagram showing the configuration of the television reception apparatus 4. In the following description, the television reception apparatus 4 is explained as an ordinary receiving apparatus conforming to standard specifications of a digital-broadcast reception apparatus.

A satellite-wave detection section 91 is a component for selectively detecting and receiving a satellite wave, which is transmitted by a broadcasting station through the satellite 2 and received by the antenna 3, on the basis of a signal received from the television display apparatus 11 or the recording/reproduction apparatus 12 as a signal for selecting a channel. The satellite-wave detection section 91 also supplies a transmission and multiplexing control signal describing a transmission mode to a TMCC (Transmission and Multiplexing Configuration Control) decoding section 92 and supplies a broadcast signal conceived by the satellite wave to a demodulation/decoding process section 93.

The TMCC decoding section 92 is a component for receiving information included in the transmission and multiplexing control signal and decoding the information. The information includes slots and a transmission mode indicating a modulation method and a coded rate. The TMCC decoding section 92 supplies the decoded information to the demodulation/decoding process section 93.

The demodulation/decoding process section 93 is a component for demodulating and decoding the broadcast signal received from the satellite-wave detection section 91 by adoption of a method suggested by information received from the TMCC decoding section 92 as information on the transmission mode. The demodulation/decoding process section 93 supplies the result of the demodulation and the decoding to a de-interleave section 94. Examples of the method are a QPSK (quadri-phase shift keying) method and an 8-phase PSK (phase shift keying) method. The QPSK method is also referred to as a 4-phase modulation method or a 4-phase PSK method.

The de-interleave section 94 is a component for de-interleaving the input signal and supplying the result of the de-interleaving process to an error correction process section 95. In addition, the de-interleave section 94 may further carry out a frame separation process and a de-scramble process on the de-interleaved result.

The error correction process section 95 is a component for carrying out an error correction process adopting typically a Reed-Solomon method on the input signal and supplying the result of the error correction process to a CA (conditional access) de-scramble section 101.

A ground-wave detection section 96 is a component for selectively detecting and receiving a ground wave, which is caught by the antenna 3, on the basis of a signal received from the television display apparatus 11 or the recording/reproduction apparatus 12 as a signal for selecting a channel. The ground-wave detection section 96 also supplies a transmission and multiplexing control signal describing a transmission mode to a TMCC (Transmission and Multiplexing Configuration Control) decoding section 97 and supplies a broadcast signal conceived by the ground wave to a demodulation/decoding process section 98.

The TMCC decoding section 97 is a component for receiving information included in the transmission and multiplexing control signal and decoding the information. The information includes timestamps TS, slots and a transmission mode indicating a modulation method and a coded rate. The TMCC decoding section 97 then supplies the decoded information to the demodulation/decoding process section 98.

The demodulation/decoding process section 98 is a component for demodulating and decoding the broadcast signal received from the ground-wave detection section 96 by adoption of a method suggested by the information received from the TMCC decoding section 97 as information on the transmission mode. The demodulation/decoding process section 98 supplies the result of the demodulation and the decoding to a de-interleave section 99. An example of the method is a QAM (quadrature-amplitude modulation) method.

The de-interleave section 99 is a component for de-interleaving the input signal and supplying the result of the de-interleaving process to a TS (transport stream) reproduction section 100. In addition, the de-interleave section 99 may further carry out a frame separation process and a de-scramble process on the de-interleaved result.

The TS reproduction section 100 is a component for generating a transport stream on the basis of the input signal and supplying the transport stream to the CA de-scramble section 101.

The CA de-scramble section 101 is a component for de-scrambling the conditionally accessed signal received from the error correction process section 95 or the TS reproduction section 100 and supplying the de-scrambled signal to a de-multiplex section 102.

A data input section 103 is a component for receiving EPG data from the EPG reception apparatus 9 and streaming data transmitted by the distribution server 5 by way of the network 8. The data input section 103 passes on the EPG data and the streaming data to the de-multiplex section 102.

The de-multiplex section 102 is a component for de-multiplexing the signal received from the CA de-scramble section 101 or the data input section 103 to generate an audio signal to be supplied to an audio-signal-decoding section 104, a video signal to be supplied to a video-signal-decoding section 105 and data to be supplied to a data-decoding section 106. The data supplied to the data-decoding section 106 includes a control signal and an EPG.

The audio-signal-decoding section 104 is a component for decoding the input audio signal and supplying the decoded audio signal to the television display apparatus 11 or the recording/reproduction apparatus 12. By the same token, the video-signal-decoding section 105 is a component for decoding the input video signal and supplying the decoded video signal to the television display apparatus 11 or the recording/reproduction apparatus 12. The data-decoding section 106 is a component for decoding the input data such as the control signal and the EPG. The data-decoding section 106 supplies the decoded data to the television display apparatus 11 or the recording/reproduction apparatus 12.

In the processing carried out by the television reception apparatus 4, a received satellite wave, a received ground wave or distributed streaming data is demodulated and decoded by adoption of a predetermined method, and a result of the demodulation and the decoding is supplied to the television display apparatus 11 or the recording/reproduction apparatus 12.

Figure 32:
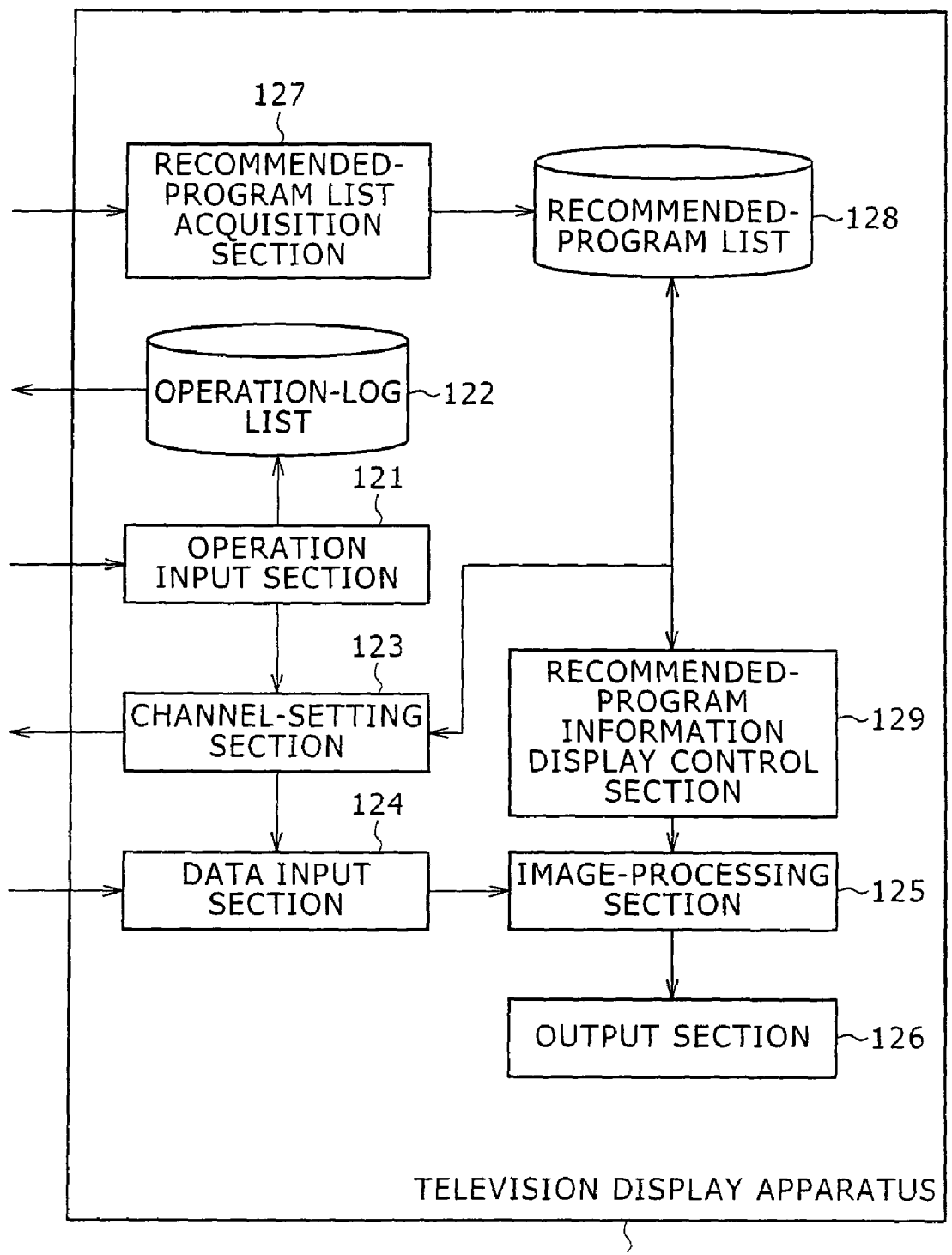
FIG. 32 is a block diagram showing the configuration of a television display apparatus shown in FIG. 1.

FIG. 32 is a block diagram showing the configuration of the television display apparatus 11.

An operation input section 121 is a component for receiving an operation input from the user and supplying a signal representing the operation input received from the user to some components employed in the television display apparatus 11. In addition, the operation input section 121 supplies the substance of the operation input received from the user to an operation-log list 122 used for storing the substance. The operation-log acquisition section 46 employed in the program-recommendation process apparatus 10 explained earlier by referring to FIG. 13 reads out an operation log stored on the operation-log list 122 as a log of operations carried out by the user. If the operation input received from the user is an operation to select a channel, the operation input section 121 supplies the operation input to a channel-setting section 123.

The channel-setting section 123 is a component for generating a control signal indicating a selected channel on the basis of a signal received from the operation input section 121 as a signal representing the operation input entered by the user. The channel-setting section 123 supplies the control signal to the television reception apparatus 4. In addition, on the basis of recommendation information stored on the recommended-program list 128 to be described later, the channel-setting section 123 generates a control signal indicating a selected channel and supplies the control signal to the television reception apparatus 4 as a control signal used by the television reception apparatus 4 to automatically setting a channel. The television reception apparatus 4 receives a broadcast signal of a channel specified by the control signal.

A data input section 124 is a component for receiving a broadcast signal from the television reception apparatus 4 and passing on the signal to an image-processing section 125. The image-processing section 125 is a component for carrying out image processing on the input broadcast signal on the basis of an image display method adopted by an output section 126. The image-processing section 125 supplies the result of the image processing to the output section 126. The output section 126 comprises a display device and an audio output device such as a speaker. Examples of the display device are a CRT (cathode ray tube) and an LCD (liquid crystal display). The output section 126 is a component for displaying an image signal of the input broadcast signal completing the image processing and outputting an audio signal from the audio output device.

A recommended-program list acquisition section 127 is a component for acquiring recommendation information from the program-recommendation process apparatus 10 and passing on the acquired information to the recommended-program list 128. The recommended-program list 128 catalogs the supplied recommendation information. The channel-setting section 123 and a recommended-program information display control section 129 read out recommendation information from the recommended-program list 128.

The recommended-program information display control section 129 is a component for supplying recommendation information read out from the recommended-program list 128 to the image-processing section 125 to be used for displaying information on a recommended program to the user. The image-processing section 125 passes on the recommendation information received from the recommended-program information display control section 129 to the output section 126 as standalone information or as information superposed on an image represented by a broadcast signal received from the data input section 124. The output section 126 displays the recommendation information on the display device.

It is to be noted that the user may be allowed to determine whether information on a recommended program is to be displayed on the output section 126 on the basis of recommendation information received from the program-recommendation process apparatus 10 or a channel is to be set automatically.

Figure 33:
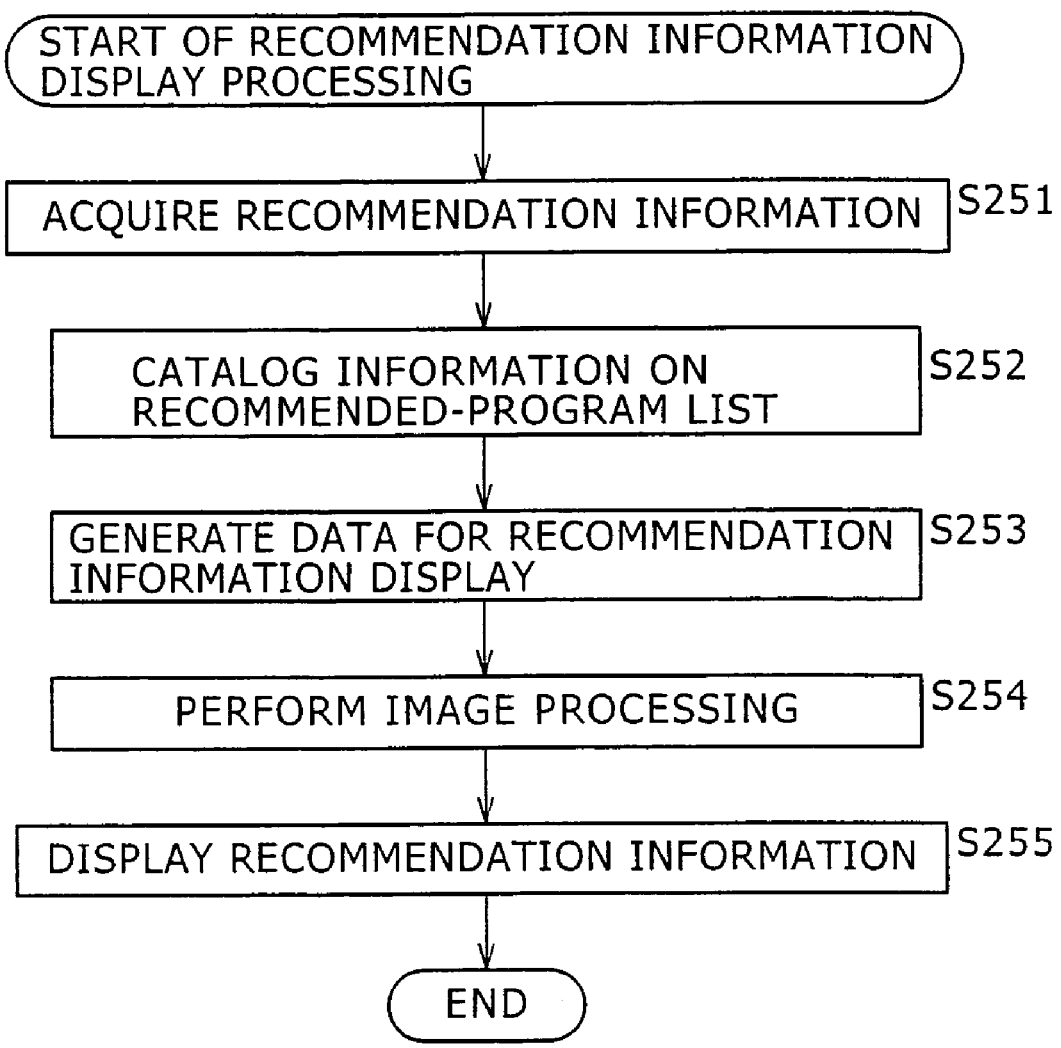
FIG. 33 shows a flowchart referred to in explanation of recommendation-information display processing.

By referring to a flowchart shown in FIG. 33, the following description explains recommendation information display processing carried out to display information on a recommended program to a user on the basis of recommendation information received from the program-recommendation process apparatus 10.

First of all, at a step S251, the recommended-program list acquisition section 127 acquires recommendation information output by the recommendation-information output section 49 employed in the program-recommendation process apparatus 10.

Then, at the next step S252, the recommended-program list acquisition section 127 catalogs the acquired recommendation information on the recommended-program list 128.

Subsequently, at the next step S253, the recommended-program information display control section 129 reads out information on recommended programs to be broadcasted in a predetermined period of time relative to the present time from the recommended-program list 128 to generate data for displaying the information on the recommended programs. The length of the period of time is typically 3 hours or 1 day. The information on the recommended programs includes the title, contents, broadcasting time and broadcasting channel of each of the recommended programs. The recommended-program information display control section 129 then supplies the data to the image-processing section 125.

Then, at the next step S254, the image-processing section 125 carries out image processing to display the input data for displaying the information on the recommended programs on the output section 126 and outputs the result of the image processing to the output section 126. The recommended information represented by the data can be subjected to the image processing as standalone information or as information superposed on an image represented by a broadcast signal received from the data input section 124.

Subsequently, at the next step S255, the output section 126 displays the recommendation information received from the image-processing section 125. Finally, the execution of the processing represented by this flowchart is ended.

By carrying out the processing described above, recommendation information is displayed on the output section 126. Thus, by referring to the displayed recommendation information, the user is capable of selecting a program the user wants to view.

Figure 34:
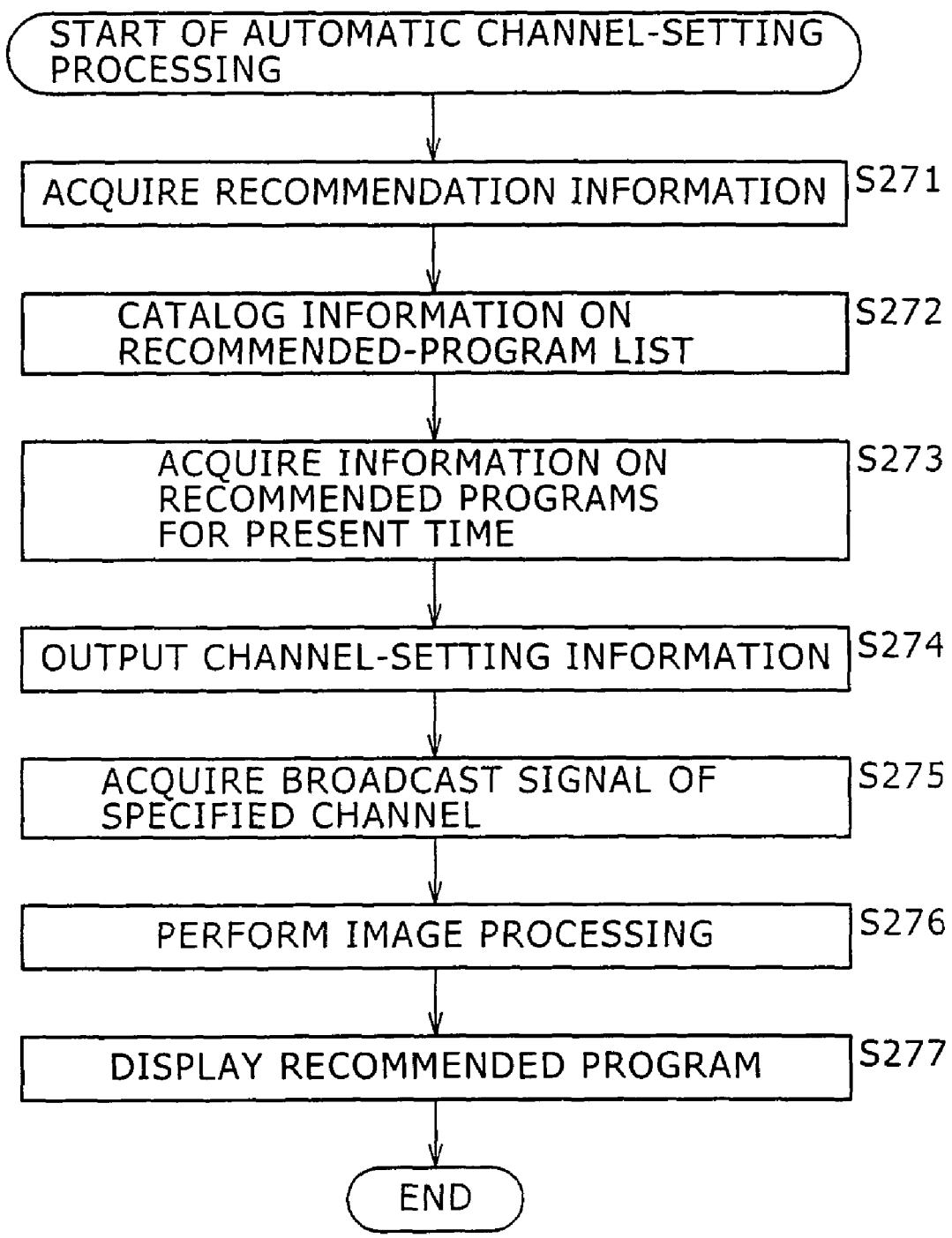
FIG. 34 shows a flowchart referred to in explanation of automatic channel-setting processing.

By referring to a flowchart shown in FIG. 34, the following description explains automatic channel-setting processing carried out to automatically set a channel, through which a program matching a favorite of the user is broadcasted, on the basis of recommendation information received from the program-recommendation process apparatus 10.

Processes carried out at steps S271 and S272 are the same as those carried out at respectively the steps S251 and S252 of the flowchart explained earlier by referring to FIG. 33. That is to say, the recommended-program list acquisition section 127 acquires recommendation-information output by the recommendation-information output section 49 employed in the program-recommendation process apparatus 10. Then, the recommended-program list acquisition section 127 catalogs the acquired recommendation information on the recommended-program list 128.

Subsequently, at the next step S273, the channel-setting section 123 acquires information on recommended programs for the present time from the recommended-program list 98. Then, at the next step S274, on the basis of the information on recommended programs, the channel-setting section 123 generates channel-setting information and outputs the channel-setting information to the television reception apparatus 4 as a control signal. On the basis of the control signal, the television reception apparatus 4 receives a broadcast signal broadcasted through a channel specified in the control signal.

Then, at the next step S275, the data input section 124 acquires the broadcast signal of the specified channel from the television reception apparatus 4 and supplies the signal to the image-processing section 125.

Subsequently, at the next step S276, the image-processing section 125 carries out image processing for displaying an image on the input broadcast signal and supplies the result of the processing to the output section 126.

Then, at the next step S277, the output section 126 displays an image of information on recommended programs received from the image-processing section 125 as an image obtained as result of the image processing and outputs sounds. Finally, the execution of the processing represented by this flowchart is ended.

By carrying out the processing described above, a channel through which a program matching a favorite of the user is broadcasted is set automatically. The automatic channel-setting processing explained above by referring to the flowchart shown in FIG. 34 can be carried out for example when the user issues a command for the processing. Thus, when the user has a problem of determining which program is to be viewed, a channel through which a proper program is broadcasted can be set automatically.

In addition, the automatic channel-setting processing explained above by referring to the flowchart shown in FIG. 34 can be carried out for example when the user does not carry out an input operation for each predetermined period of time considered to be a neglected period of time or upon the lapse of the predetermined period of time considered to be a neglected period of time, typically 2 hours. The predetermined period of time considered to be a neglected period of time is a period of time during which the user is specially aware of the fact that the user has not set a channel.

It is to be noted that the user can also be allowed to enter a command to set a mode in which the automatic channel-setting processing cannot be carried out. By disabling the automatic channel-setting processing in this way, a channel cannot be changed automatically to another while the user is intentionally viewing a program broadcasted through the channel.

Figure 35:
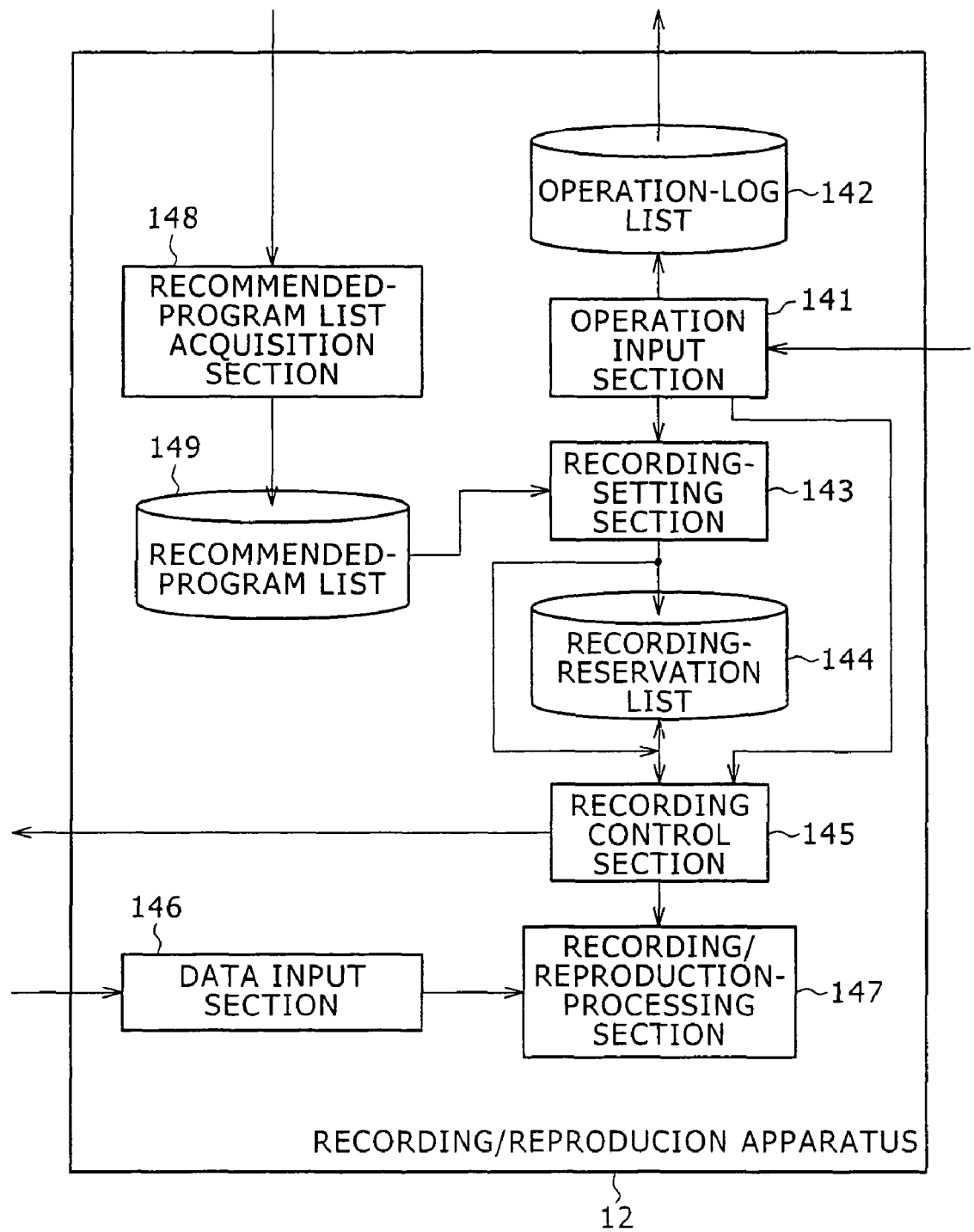
FIG. 35 is a block diagram showing the configuration of a recording/reproduction apparatus shown in FIG. 1.

FIG. 35 is a block diagram showing the recording/reproduction apparatus 12.

An operation-input section 141 is a component for receiving an operation input from the user and supplying control signals representing the operation input received from the user to other components composing the recording/reproduction apparatus 12. In addition, the operation-input section 141 supplies the substance of the operation input received from the user to an operation-log list 142 used for storing the substance. The operation-log acquisition section 46 employed in the program-recommendation process apparatus 10 explained earlier by referring to FIG. 13 reads out an operation log stored on the operation-log list 142 as a log of operations carried out by the user.

A recording-setting section 143 is a component for extracting information, which is necessary for carrying out recording processing, on the basis of a signal received from the operation-input section 141 as a signal representing an operation input entered by the user or extracting the information from recommendation information stored on a recommended-program list 149 to be described later. The information necessary for carrying out recording processing includes broadcasting start as well as broadcasting end times of a program to be recorded and a channel through which the program is broadcasted. If the control signal received from the operation-input section 141 indicates that the operation input received from the user is an operation to make a reservation for recording, the recording-setting section 143 catalogs the information necessary for carrying out recording processing on a recording reservation list 144. If the control signal received from the operation-input section 141 indicates that the operation input received from the user is a request for recording of a currently broadcasted program or when automatic recording is to be carried out by using recommendation information stored on the recommended-program list 149 to be described later, the recording-setting section 143 supplies the information necessary for carrying out recording processing to a recording control section 145.

The recording control section 145 is a component for generating a control signal indicating a broadcasting channel through which a program to be recorded is broadcasted on the basis of the information received from the recording-setting section 143 as information necessary for carrying out recording processing on the program or generating the control signal by extraction of recording reservation information for the present time from pieces of recording reservation information cataloged on the recording reservation list 144. The recording control section 145 supplies the control signal to the television reception apparatus 4. The recording control section 145 is also a component for generating a control signal for carrying out recording and supplying the control signal to a recording/reproduction-processing section 147. On the basis of the control signal received from the recording control section 145, the television reception apparatus 4 receives a broadcast signal broadcasted through the specified channel.

A data input section 146 is a component for receiving a broadcast signal from the television reception apparatus 4 and passing on the signal to the recording/reproduction-processing section 147. The recording/reproduction-processing section 147 typically has a configuration allowing a removable recording medium to be mounted on the recording/reproduction-processing section 147 or includes an internally embedded recording medium. Examples of the removable recording medium are a magnetic tape, an optical disk, a magnetic disk, a magneto-optical disk and a semiconductor memory whereas examples of the internally embedded recording medium are a hard disk and a semiconductor memory. The recording/reproduction-processing section 147 is capable of recording information onto the recording medium and reproducing information from the removable or embedded recording medium. To put it concretely, let us assume that the removable recording medium mountable on the recording/reproduction-processing section 147 is a magnetic tape. In this case, the recording/reproduction-processing section 147 is provided with a magnetic head for recording a broadcast signal received from the data input section 146 onto the magnetic tape in a recording process and reproducing information from the magnetic tape. The recording/reproduction-processing section 147 supplies the reproduced information to an apparatus such as the television display apparatus 11 for displaying the information.

A recommended-program list acquisition section 148 is a component for acquiring recommendation information from the program-recommendation process apparatus 10 and passing on the information to the recommended-program list 149. The recommended-program list 149 is a component used for cataloging the supplied recommendation information. The recording-setting section 143 reads out recommendation information from the recommended-program list 149 to be used in automatic recording.

Figure 36:
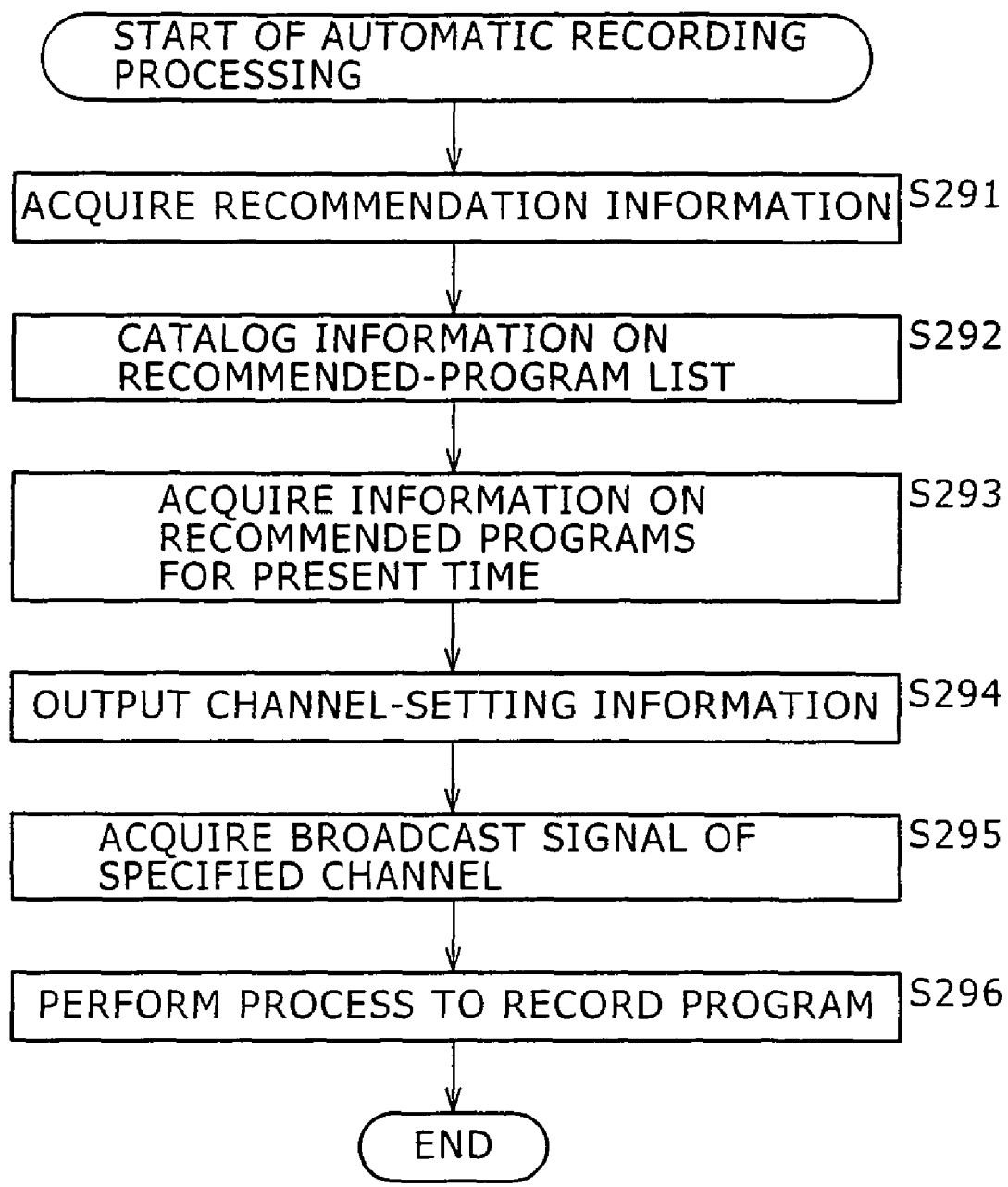
FIG. 36 shows a flowchart referred to in explanation of automatic recording processing.

Next, the automatic recording is explained by referring to a flowchart shown in FIG. 36.

First of all, as a step S291, the recommended-program list acquisition section 148 acquires recommendation information from the recommendation-information output section 49 employed in the program-recommendation process apparatus 10.

Then, at the next step S292, the recommended-program list acquisition section 148 catalogs the acquired recommendation information on the recommended-program list 149.

Subsequently, at the next step S293, the recording-setting section 143 extracts information on a recommended program for the present time from the recommended-program list 109. The recording-setting section 143 then acquires information required for recording from the extracted information and supplies the acquired information to the recording control section 145. The acquired information required for recording includes broadcasting start as well as broadcasting end times of a program to be recorded and a channel through which the program is broadcasted.

Then, at the next step S294, the recording control section 145 generates channel-setting information used for receiving the broadcast signal of the program to be recorded and outputs the channel-setting information to the television reception apparatus 4 as a control signal. On the basis of the control signal, the television reception apparatus 4 receives the broadcast signal of the program broadcasted through the specified channel.

Subsequently, at the next step S295, the data input section 146 acquires the broadcast signal of the specified channel from the television reception apparatus 4 and passes on the signal to the recording/reproduction-processing section 147.

Then, at the next step S296, the recording/reproduction-processing section 147 records the broadcast signal received from the television reception apparatus 4 onto a mounted or internally embedded recording medium. Finally, the execution of the processing represented by this flowchart is ended.

By carrying out the processing described above, a program matching a favorite of the user can be recorded automatically. The automatic recording processing explained above by referring to the flowchart shown in FIG. 36 is not carried out while recording processing requested by the user is being performed or already started recording processing such as reserved recording processing is going on.

The above description has explained automatic recording processing carried out on the basis of a program recommended for the present time. It is needless to say, however, that the automatic recording processing can also be carried out on the basis of recommendation information acquired for a point of time lagging behind the present time by a predetermined period of time in the same way. In this way, a reservation for recording can be made automatically.

In the pieces of processing explained earlier by referring to FIGS. 1 to 36, a program vector PP is generated in the distribution server 5. Instead of generating a program vector PP in the distribution server 5, however, the distribution server 5 may supply EPG data to the program-recommendation process apparatus by way of the network 8 to be used in the program-recommendation process apparatus to generate a program vector PP.

Figure 37:
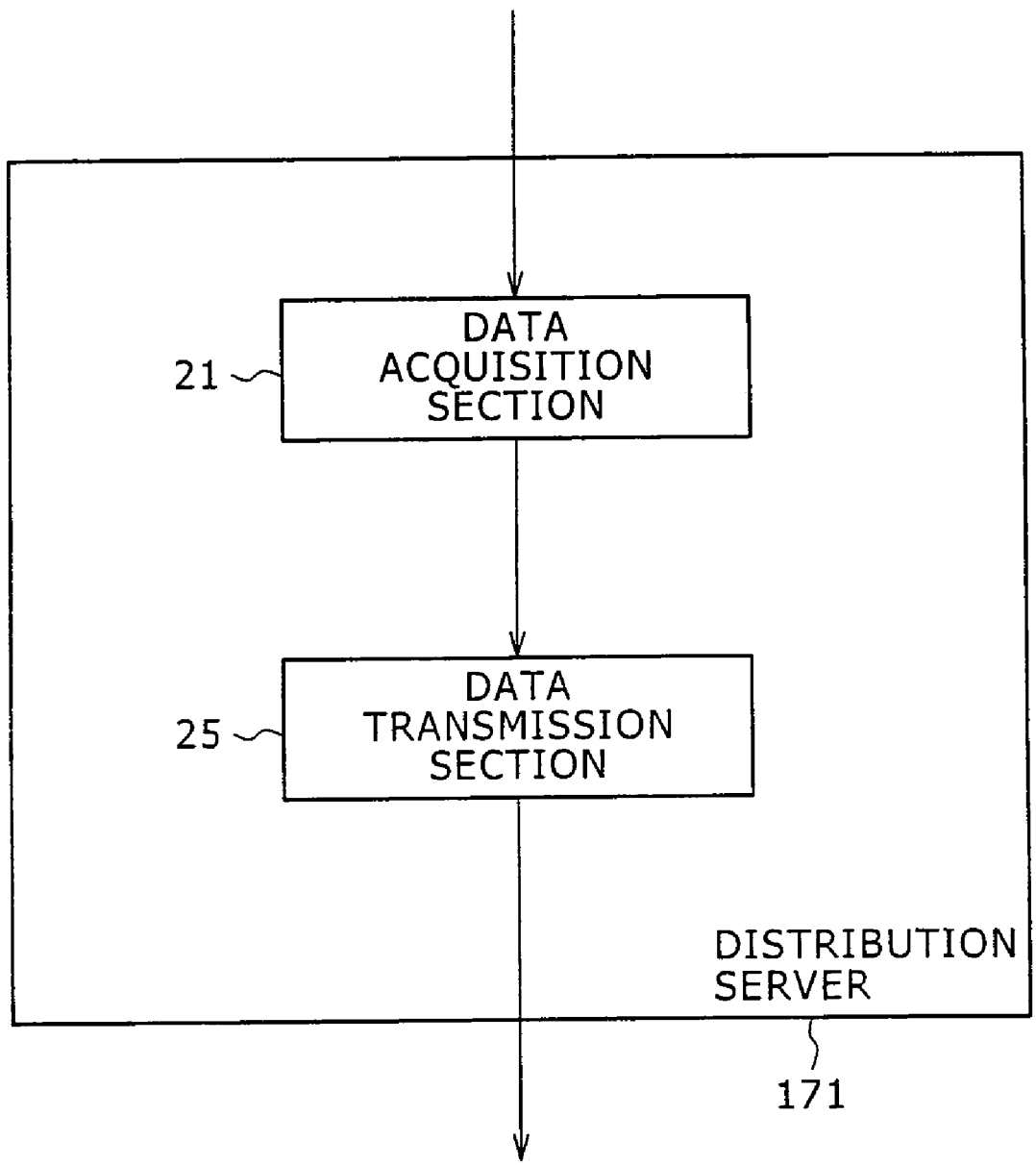
FIG. 37 is a block diagram showing another typical configuration of the distribution server.
Figure 38:
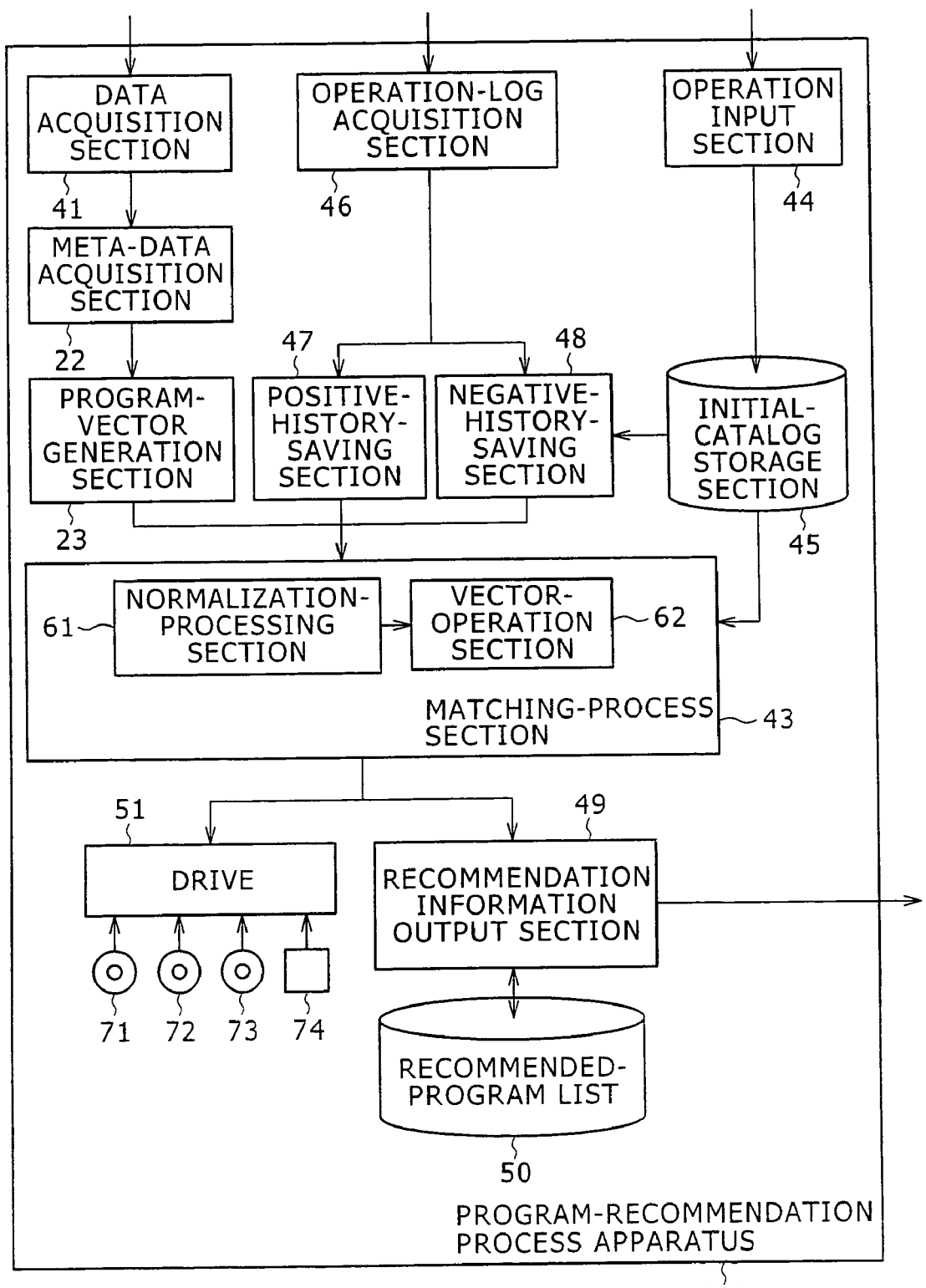
FIG. 38 is a block diagram showing another typical configuration of the program-recommendation process apparatus.

FIG. 37 is a block diagram showing the configuration of a distribution server 171 for a case in which a program vector PP is not generated in the distribution server 171, but generated in a program-recommendation process apparatus 191 on the basis of EPG data supplied from the distribution server 171 to the program-recommendation process apparatus 191 by way of the network 8. In this case, the configuration of the program-recommendation process apparatus 191 also for generating a program vector PP is shown in FIG. 38.

It is to be noted that sections identical with their respective counterparts employed in the distribution server 5 shown in FIG. 2 and the program-recommendation process apparatus 10 shown in FIG. 13 are denoted by the same reference numerals as their respective counterparts, and their explanation is not repeated to avoid duplications properly.

That is to say, the distribution server 171 comprises the data acquisition section 21 and the data transmission section 25, which are also employed in the distribution server 5 as explained before by referring to FIG. 2. The distribution server 171 reads out streaming data from the streaming-data database 6 or meta data from the meta-data database 7 or EPG data including meta data, and transmits the streaming data or the meta data to the EPG reception apparatus 9 or the television reception apparatus 4 by way of the network 8.

The program-recommendation process apparatus 191 has a configuration identical with that of the program-recommendation process apparatus 10 explained earlier by referring to FIG. 13 except that the program-recommendation process apparatus 191 also includes the meta-data extraction section 22 and the program-vector generation section 23, which are employed in the distribution server 5 shown in FIG. 2. In addition to the processing carried out by the program-recommendation process apparatus 10, the program-recommendation process apparatus 191 also performs program-vector generation processing 1 explained earlier by referring to the flowchart shown in FIG. 3, program-vector generation processing 2 explained earlier by referring to the flowchart shown in FIG. 6, grouping processing 1 explained earlier by referring to the flowchart shown in FIG. 7 and grouping processing 2 explained earlier by referring to the flowchart shown in FIG. 8.

Instead of generating a program vector PP, the distribution server 171 may supply EPG data to the program-recommendation process apparatus 191 by way of the network 8 to be used for generating a program vector PP. In spite of this difference, the same results as those explained earlier by referring to FIGS. 1 to 36 can be obtained.

In addition, it is also possible to implement a system configuration in which the EPG reception apparatus 9 collects information on operations carried out by the user and setting information from the television display apparatus 11 and the recording/reproduction apparatus 12, supplying the collected information to a distribution server 201, whereas the distribution server 201 not only generates a program vector PP but also carries out the matching processing, supplying results of the matching processing to the EPG reception apparatus 9 by way of the network 8. In the case of this system configuration, the network has a configuration shown in FIG. 39 and the distribution server 201 has a configuration shown in a block diagram of FIG. 40.

It is to be noted that system-configuration components identical with their respective counterparts shown in FIGS. 1, 37 and 38 are denoted by the same reference numerals as their respective counterparts and their explanation is omitted to avoid duplications properly.

That is to say, the distribution server 201 has the functions of the program-recommendation process apparatus 191 explained earlier by referring to FIG. 38 in addition to the functions of the distribution server 171 explained earlier by referring to FIG. 37. Thus, the user does not need to own a program-recommendation process apparatus.

Figure 39:
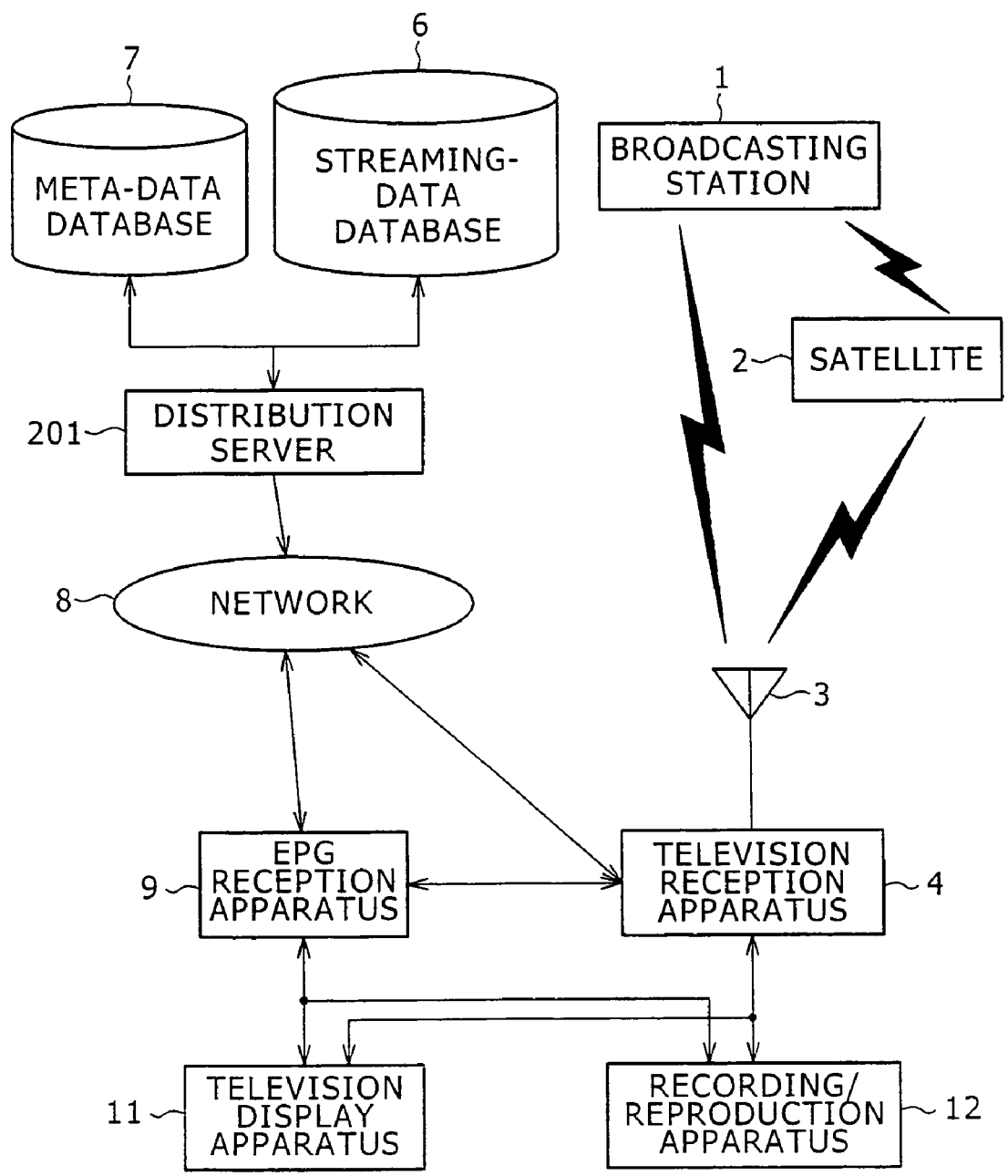
FIG. 39 is an explanatory diagram referred to in describing another typical network for distribution of television program broadcasts and stream data.
Figure 40:
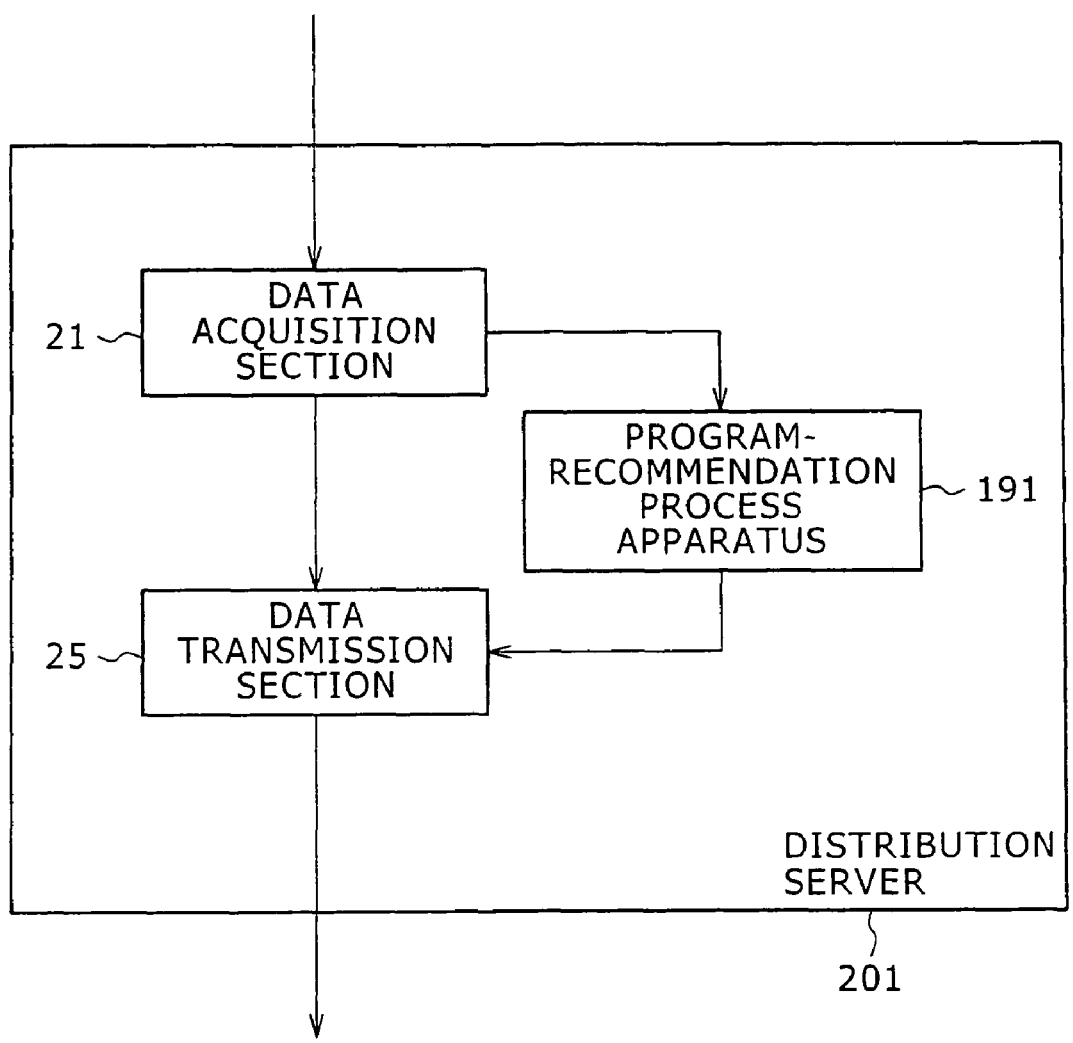
FIG. 40 is a block diagram showing a further typical configuration of the distribution server.

In the configurations shown in FIGS. 39 and 40, the distribution server 201 carries out all the pieces of processing explained earlier by referring to FIGS. 3 to 12 and FIGS. 14 to 30. These pieces of processing include the processing to generate vectors such as a program vector PP, a program-side effect vector EfPP, a positive-history vector UP, a negative-history vector MUP and a standard favorite vector APP, the processing to group program vectors PP, the matching processing and the processing to select an exceptional recommended program.

It is to be noted that, at that time, a history of operations carried out by the user and setting information have typically a user ID attached thereto for identifying the history and the information, which vary from user to user. The EPG reception apparatus 9 collects the history of operations and the setting information from the television display apparatus 11 and the recording/reproduction apparatus 12, transmitting the history and the information to the distribution server 201 by way of the network 8. The program-recommendation process apparatus 191 employed in the distribution server 201 saves the history of operations and the setting information, which are received from the EPG reception apparatus 9, in sections such as the initial-catalog storage section 45, the positive-history-saving section 47 and the negative-history-saving section 48 by classifying the history and the information on the basis of the user ID attached to the history and the information.

The above descriptions explain a case in which a program matching a favorite of the user is recommended by using EPG data of a television broadcast signal. However, the present invention can also be applied to a case in which a program matching a favorite of the user is recommended by adding attribute information to a radio broadcast and a variety of digital contents such as streaming data.

Each series of processes described previously can also be carried out by execution of software. If each of the series of processes described above is carried out by execution of software, programs composing the software can be installed into a computer embedded in dedicated hardware, a general-purpose personal computer or the like from typically a network or a program-recording medium. By installing a variety of programs into the general-purpose personal computer, the personal computer is capable of carrying out a variety of functions.

The aforementioned program-recording medium for recording the programs to be installed into a computer or a general-purpose personal computer as programs to be executed by the computer or the general-purpose personal computer respectively is a package medium distributed and provided to the user separately from the computer or the general-purpose personal computer. As explained earlier by referring to FIG. 2, 13 or 38, examples of the package medium include a magnetic disk 31 or 71 such as a flexible disk, an optical disk 32 or 72 such as a CD-ROM (Compact Disk-Read Only Memory) or a DVD (Digital Versatile Disk), a magneto-optical disk 33 or 73 such as an MD (MiniDisc) (trademark) as well as a semiconductor memory 34 or 74.

In addition, in this specification, steps of every program stored in a recording medium is carried out in a pre-prescribed order along the time axis. However, the steps do not have to be carried out in a pre-prescribed order along the time axis. For example, the steps of every program stored in a recording medium can also be carried out concurrently or individually.

It is also to be noted that, the technical term "system" used in this specification implies the configuration of a confluence comprising a plurality of apparatus.

INDUSTRIAL APPLICABILITY

As described above, in accordance with an invention, attribute information of a content can be generated. In particular, the attribute information of a content can be associated with weights each prescribing the degree of contribution by each of a plurality of items to computation of the degree of similarity between the attribute information and favorite information of a predetermined user.

In addition, in accordance with another invention, not only can a content matching a favorite of the user be selected, but it is also possible to select a content by using weight information prescribing the degree of contribution by each of a plurality of items to computation of the degree of similarity between the attribute information and favorite information of a predetermined user. Thus, a content correctly matching a favorite of the user can be selected.

In addition, in accordance with a further invention, a favorite of the user can be found. In particular, by comparing a favorite of the user with a favorite of the public in general, a bias of the favorite of the user can be identified so that a favorite unique to the user can be determined.

What is claimed is:

1. An information-processing apparatus for generating attribute information of a content on the basis of information on said content, comprising:
    acquisition means for acquiring said information on said content, said information on said content including electronic program guide (EPG) information, which includes textual information about said content expressed as words;
    attribute-information generation means for extracting metadata from said EPG information and generating said attribute information from said extracted metadata, said attribute information expressed as a program vector (PP) including a plurality of items corresponding to said textual information;
    first storage means for storing first weight information for items of attribute information generated by said attribute-information generation means, said first weight information prescribing a degree of contribution given by each of said items of said PP for computing a degree of similarity between said PP and predetermined favorite information of a user, each first weight information expressed as a program-side effect vector (EfPP) and associated with a different genre of content so as to prescribe a different degree of contribution given by each of said items of said PP based on said genre; and
    transmission means for transmitting said PP generated by said attribute-information generation means, extracting said EfPP matching a genre of said content from said first storage means, and transmitting said extracted EfPP by associating said extracted EfPP with said PP generated by said attribute-information generation means.

2. The information-processing apparatus according to claim 1, further comprising:
    extraction means for extracting predetermined title information expressed in words from said EPG information, wherein said attribute-information generation means converts said predetermined title information extracted by said extraction means into a vector for each plurality of said items in order to generate said attribute information by appending numerical values each representing a frequency or a weight to said title information expressed in terms of words.

3. The information-processing apparatus according to claim 1, wherein said attribute-information generation means selects information expressed in terms of words from said information on said content as an object of an analysis and generates said attribute information on the basis of a result of said analysis.

4. The information-processing apparatus according to claim 1, further comprising:
second storage means for storing information comprising a plurality of said items as said predetermined favorite information of said user; and
recommendation-information generation means for generating recommendation information revealing a content matching a favorite of said user by computing a degree of similarity between said predetermined favorite information stored in said second storage means and said attribute information generated by said attribute-information generation means for each of said items.

5. The information-processing apparatus according to claim 4, wherein said recommendation-information generation means generates recommendation information through comparison of said attribute information with said favorite information by using said first weight information stored in said first storage means.

6. The information-processing apparatus according to claim 4, further comprising:
operation-history acquisition means for acquiring a history of operations carried out by said user;
favorite-information generation means for generating favorite information of said user on the basis of a history acquired by said operation-history acquisition means as said history of operations carried out by said user; and
weight-information generation means for generating second weight information on the basis of said favorite information generated by said favorite-information generation means, wherein:
said second weight information prescribes a degree of contribution given by each of a plurality of said items to computation of a degree of similarity between said attribute information and said favorite information of said user;
said recommendation-information generation means generates recommendation information through comparison of said attribute information with said favorite information by using said second weight information generated by said weight-information generation means.

7. An information-processing method for an information-processing apparatus which generates attribute information of a content on the basis of information on said content, said information-processing method comprising:
an acquisition step of acquiring said information on said content, said information on said content including electronic program guide (EPG) information, which includes textual information about said content expressed as words;
an attribute-information generation step of extracting metadata from said EPG information and generating said attribute information from said extracted metadata, said attribute information expressed as a program vector (PP) including a plurality of items corresponding to said textual information;
an extraction step of extracting weight information prescribing a degree of contribution given by each of said items of said PP for computing a degree of similarity between said PP and predetermined favorite information of a user, each weight information expressed as a program-side effect vector (EfPP) and associated with a different genre of content so as to prescribe a different degree of contribution given by each of said items of said PP based on said genre; and
an association step of associating said EfPP extracted in a process carried out at said extraction step with said PP generated in a process carried out at said attribute-information generation step.

8. A non-transitory computer-readable medium encoded with a computer-program to be executed by a computer to carry out processing for generating attribute information of a content on the basis of information on said content, said processing comprising:
an acquisition step of acquiring said information on said content, said information on said content including electronic program guide (EPG) information, which includes textual information about said content expressed as words;
an attribute-information generation step of extracting metadata from said EPG information and generating said attribute information from said extracted metadata, said attribute information expressed as a program vector (PP) including a plurality of items corresponding to said textual information;
an extraction step of extracting weight information prescribing a degree of contribution given by each of said items of said PP for computing a degree of similarity between said PP and predetermined favorite information of a user, each weight information expressed as a program-side effect vector (EfPP) and associated with a different genre of content so as to prescribe a different degree of contribution given by each of said items of said PP based on said genre; and an association step of associating said EfPP extracted in a process carried out at said extraction step with said PP generated in a process carried out at said attribute-information generation step.

9. An information-processing apparatus for carrying out processing to select a content matching a favorite of a user, comprising:
acquisition means for acquiring information including a plurality of items to serve as attribute information of said content, said information on said content including electronic program guide (EPG) information, which includes textual information about said content expressed as words, said attribute information expressed as a program vector (PP) including a plurality of items corresponding to said textual information;
storage means for storing information including a plurality of said items to serve as favorite information of said user; and
recommendation-information generation means for generating recommendation information revealing a content matching a favorite of said user by computing a degree of similarity between information stored in said storage means as said favorite information of said user and said attribute information acquired by said acquisition means through application of predetermined weight information, wherein
said weight information prescribes a degree of contribution given by each of said items for computation of said degree of similarity between said attribute information and said favorite information of said user, and
each weight information is expressed as a program-side effect vector (EIPP) associated with a different genre of content so as to prescribe a different degree of contribution given by each of said items of said PP based on said genre.

10. The information-processing apparatus according to claim 9, wherein said acquisition means acquires also said weight information besides said attribute information of said content and said recommendation-information generation means generates said recommendation information by comparison of said attribute information of said content with said favorite information by using said weight information.

11. The information-processing apparatus according to claim 9, further comprising:
   operation-history acquisition means for acquiring a history of operations carried out by said user;
   favorite-information generation means for generating favorite information of said user on the basis of an operation history acquired by said operation-history acquisition means as said history of operations carried out by said user; and
   weight-information generation means for generating said weight information on the basis of said favorite information generated by said favorite-information generation means, wherein said recommendation-information generation means generates said recommendation information through comparison of said favorite information with said attribute information by using said weight information generated by said weight-information generation means.

12. The information-processing apparatus according to claim 9, wherein said weight information is information revealing a favorite preferred by said user as a characteristic favorite, which is used for selecting a specific piece among pieces of said attribute information of said content, rather than a generally preferred favorite.

13. The information-processing apparatus according to claim 9, wherein said weight information is information revealing an item of importance to said user among items composing said attribute information of said content.

14. The information-processing apparatus according to claim 9, wherein said weight information is information revealing an item indicating a content liked by said user among items composing said attribute information of said content.

15. The information-processing apparatus according to claim 9, wherein said weight information is information revealing an item indicating a content disliked by said user among items composing said attribute information of said content.

16. The information-processing apparatus according to claim 9, further comprising operation input means for receiving an operation input from said user, wherein said weight information is set in accordance with an operation input entered by said user to said operation input means.

17. An information-processing method for an information-processing apparatus which carries out processing to select a content matching a favorite of a user, said information-processing method comprising:
   an acquisition step of acquiring weight information prescribing a degree of contribution based on a genre of said content for computing a degree of similarity between information composed of a plurality of items to serve as attribute information associated with said content and information composed of a plurality of items to serve as predetermined favorite information associated with said user where said contribution is contribution given by each of said items;
   a computation step of computing a degree of similarity between said attribute information and said favorite information on the basis of said weight information; and
   a recommendation-information generation step of generating recommendation information revealing a content matching a favorite of said user through use of a computation result obtained in a process carried out at said computation step, wherein
   said attribute information associated with said content includes electronic program guide (EPG) information, which includes textual information about said content expressed as words, said attribute information is expressed as a program vector (PP) including a plurality of items corresponding to said textual information, and
   each weight information is expressed as a program-side effect vector (EfPP) associated with a different genre of content so as to prescribe a different degree of contribution given by each of said items of said PP based on said genre.

18. A non-transitory computer-readable medium encoded with a computer-program to be executed by a computer to carry out processing to select a content matching a favorite of the user, said processing comprising:
   an acquisition step of acquiring weight information prescribing a degree of contribution based on a genre of said content for computing a degree of similarity between information composed of a plurality of items to serve as attribute information associated with said content and information composed of a plurality of items to serve as predetermined favorite information associated with said user where said contribution is contribution given by each of said items;
   a computation step of computing a degree of similarity between said attribute information and said favorite information on the basis of said weight information; and
   a recommendation-information generation step of generating recommendation information revealing a content matching a favorite of said user through use of a computation result obtained in a process carried out at said computation step, wherein
   said attribute information associated with said content includes electronic program guide (EPG) information, which includes textual information about said content expressed as words, said attribute information is expressed as a program vector (PP) including a plurality of items corresponding to said textual information, and
   each weight information is expressed as a program-side effect vector (EfPP) associated with a different genre of content so as to prescribe a different degree of contribution given by each of said items of said PP based on said genre.

19. An information-processing system comprising a first information-processing apparatus for generating attribute information of content on the basis of information on said content and a second information-processing apparatus for carrying out processing to select content matching a favorite of a user on the basis of information received from said first information-processing apparatus as said attribute information of said content,
   said first information-processing apparatus comprising:
      first acquisition means for acquiring said information on said content, said information on said content including electronic program guide (EPG) information, which includes textual information about said content expressed as words;
      attribute-information generation means for extracting metadata from said EPG information and generating said attribute information from said extracted metadata, said attribute information expressed as a program vector (PP) including a plurality of items corresponding to said textual information;
      first storage means for storing first weight information for items of attribute information generated by said attribute-information generation means, said first weight information prescribing a degree of contribution given by each of said items of said PP for computing a degree of similarity between said PP and predetermined favorite information of a user, each first weight information expressed as a program-side effect vector (EfPP) and associated with a different genre of content so as to prescribe a different degree of contribution given by each of said items of said PP based on said genre; and transmission means for extracting EfPP matching a genre of said content from said first storage means, associating said extracted EfPP with said PP generated by said attribute-information generation means, and transmitting said EfPP and said PP, said second information-processing apparatus comprising:

second acquisition means for acquiring information including a plurality of items as said attribute information of said content and said first weight information;

second storage means for storing information including a plurality of said items to serve as favorite information of said user; and recommendation-information generation means for generating recommendation information revealing a content matching said favorite of said user by computing a degree of similarity between information stored in said second storage means as said favorite information of said user and said attribute information acquired by said second acquisition means through application of at least either second weight information different from said first weight information or said first weight information, wherein said first weight information and said second weight information each prescribe a degree of contribution given by each of said items for computing said degree of similarity between said attribute information and said favorite information of said user.

* * * * *